United States Patent [19]

King et al.

[11] 3,831,174

[45] Aug. 20, 1974

[54] AUTOMATIC TARGET ACQUISITION IN MTI RADAR SYSTEM

[75] Inventors: Donald L. King, La Mirada; Gerald M. Goldberg, Chatsworth; Donald P. Parke, Anaheim; Willis M. Priester, Garden Grove; Richard A. Gebhardt, Orange, all of Calif.

[73] Assignee: Hughes Aircraft Company, Culver City, Calif.

[22] Filed: Feb. 5, 1973

[21] Appl. No.: 329,762

[52] U.S. Cl.................. 343/7 A, 343/5 DP, 343/7.7
[51] Int. Cl............................................. G01s 9/06
[58] Field of Search.................. 343/5 DP, 7 A, 7.7

[56] References Cited
UNITED STATES PATENTS

| | | | |
|---|---|---|---|
| 3,503,068 | 3/1970 | Yamauchi..................... | 343/5 DP X |
| 3,646,554 | 2/1972 | Fierston et al.................. | 343/5 DP |
| 3,731,304 | 5/1973 | Caspers et al.................. | 343/5 DP |

*Primary Examiner*—T. H. Tubbesing
*Attorney, Agent, or Firm*—W. H. MacAllister; Walter J. Adam

[57] ABSTRACT

An airborne MTI radar system is disclosed for searching and tracking airborne targets over large bodies of water. In the search mode, returns from staggered PRF's are used to resolve range ambiguity of targets, and first and second multipath returns are used to more positively identify an airborne target for automatic acquisition. The number of target returns counted (1, 2 or 3) at each PRF combined with the numbers at the other two PRF's yields a plot combination count which serves to indicate the "quality" of a target in selecting new targets for tracking, but first each target is correlated with targets already being tracked. Uncorrelated targets are then checked as to quality by reordering the combination of target return counts in descending order and checking the resulting combination number, $Q_p$, against a predetermined minimum acceptable plot quality, $Q_M$, for the range of the target and the sea state. If this check is passed by a particular target, it is entered into a table for automatic acquisition, provided the track store is not full to capacity; otherwise, the target is set up for display only for possible manual acquisition of track. Once acquired, the target is tracked automatically.

9 Claims, 26 Drawing Figures

Elevation Beamwidth: 13.5°
Operating Freq. 1300 MHz
Beam Center: -2°
Range (Nautical Miles)

Elevation Beamwidth: 13.9°
Operating Freq. 900 MHz
Beam Center: -2°
Range (Nautical Miles)

PRIMARY RADAR SUBSYSTEM

SIGNAL PROCESOR AND RADAR CONTROL UNIT

COHERENT INTEGRATOR AND NON-COHERENT INTEGRATOR

RADAR DATA BUFFER

Fig. 9b.

| | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| 0 | | ID | | M | | | ± | | | | Az | | | | | | | |
| 1 | | F | | | | | ± | | | | EL | | | | | | | |
| 2 | | T | | | | | ± | | | | $\Delta F_G$ | | | | | | | |
| 3 | | | | | B | | R start | | | | | | | | | | | |
| 4 | | | | | | | R stop | | | | | | | | | | | |
| 5 | | FP | | | | | PRF | | | | | | | | | | | |

| | | | | Bits |
|---|---|---|---|---|
| ID | (array ID) | 00 = Fore<br>01 = Strbd | 10 = Aft<br>11 = Port | 2 |
| M | (mode) | 0 = Search<br>1 = Verify<br>2 = Track | 4 = Test<br>5 = Sea State<br>3, 6 and 7 not defined | 3 |
| Az | (sine of Az angle) | sin .088° | ± sin 55° | 12 |
| EL | (sine of EL angle) | sin .088° | ± sin 9.8° | 12 |
| T | (threshold) | .5 db | 7 - 20 db | 6 |
| F | (frequency) | | 0 - 31 | 5 |
| $\Delta F_G$ | (gnd doppler offset) | 3 Hz | ± 4000 Hz | 12 |
| PRF | (pulse repetition freq) | IPPS | 1562-3125 | 12 |
| FP | (fill pulses) | 1 pulse | 8 - 13 | 4 |
| B | (no. of bursts) | 1 burst | 0 - 3 (N-1) | 2 |
| R start | (range cell start) | 1 RC | 0 - 5000 | 13 |
| R stop | (range cell stop) | 1 RC | 0 - 5000 | 13 |

RADAR CONTROL COMMAND FORMAT

Fig. 9c.

|   | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|----|----|----|----|----|----|----|----|
| 0 | // | F |   |   |   |   | ± |   | Az |   |    |    |    |    |    |    |    |    |
| 1 | // | CL |   |   |   |   | ± |   | EL |   |    |    |    |    |    |    |    |    |
| 2 | //////// | ID |   |   | $S_{RCT}$ |   |   |   |   |   | M  |    |    |    |    |    |    |    |
| 3 | $J_{F0}$ |   |   | $J_{F1}$ |   |   | . |   | . |   | . |    | . |    |    |    |    |    |
| 4 |   |   |   |   |   |   | . |   | . |   | . |    | . |    |    |    |    |    |
| 5 |   |   |   |   |   |   | . |   | . |   | . |    | . |    |    |    |    |    |
| 6 |   |   |   |   |   |   | . |   | . |   | . |    | . |    |    |    |    |    |
| 7 |   |   |   |   |   |   | . |   | . |   | . |    | . |    |    |    |    |    |
| 8 | $J_{F30}$ |   |   | $J_{F31}$ |   |   | PRF |   |   |   |    |    |    |    |    |    |    |    |
| 0 | //////// | R |   |   |   |   |   |   |   |   |    |    |    |    |    |    |    |    |
| 1 | // | S |   |   |   |   | A |   |   |   |    |    | $F_L$ |    |    |    |    |    |

Rows 0–8: Header
Rows 0–1 (bottom): Report

Header (one per dwell)

| | | | | |
|---|---|---|---|---|
| F | (frequency) |  | 0 - 31 | 5 |
| Az | (sine of Az angle) | sin .088° | ± sin 55° | 12 |
| EL | (sine of EL angle) | sin .088° | ± sin 9.8° | 12 |
| CL | (clutter level) |  | 0 - 31 | 5 |
| ID | (array ID) 00 = Fore  10 = Aft<br>01 = Strbd  11 = Port |  |  | 2 |
| SRCT | (sub-report count) |  | 0 - 63 | 6 |
| M | (mode) 0 = Search   4 = Test<br>1 = Verify   5 = Sea State<br>2 = Track    3, 6 and 7 not defined |  |  | 3 |
| $J_{F0-31}$ | (jam level/frequency) |  | 0 - 7 | 3 |
| PRF | (pulse repetition frequency) | IPPS | 1562-3125 | 12 |

Report ("N" per dwell)

| | | | | |
|---|---|---|---|---|
| R | (ambiguous range) | IRC | 0 - 5000 | 13 |
| S | (signal/clutter + noise) | 2 db | 8 - 40 db | 4 |
| A | (amplitude) | 3/8 db | 0 - db | 9 |
| $F_L$ | (filter number) |  | 0 - 15 | 4 |

BEAM RETURN REPORT FORMAT

AUTOMATIC TARGET ACQUISITION IN MTI RADAR SYSTEM

BACKGROUND OF THE INVENTION

This invention relates to a radar tracking system for automatically initiating the tracking of airborne targets by MTI radar, and more particularly to a system for increasing the probability that only radar reports from airborne targets will be used for automatically initiating the tracking of targets.

Clutter resulting from radar signals back scattered by the surface of a large body of water, commonly called sea echo, or sea clutter, imposes a serious limitation on the ability of radar to detect targets. Experimental measurements show that the intensity of sea echo increases as the sea becomes rougher. The echo intensity is also a function of the surface wind being perhaps 5 to 10 db less downwind than when the radar is looking into the wind. With a sea state that is calm to moderate, the sea clutter will be at a low level, thus permitting substantial forward scatter, i.e., substantial reflection from the surface of the sea in a forward direction. Consequently, a radar system may receive surface reflected returns from a target, and the radar signal processor will process such target returns as independent targets. However, once a true target has been identified, it can be tracked by range gating only the primary radar returns that are direct from the radar antenna to the target and back to the radar antenna, and not reflections from the sea.

The problem is to identify targets during search when range gating is not used, particularly if targets are to be acquired automatically. Quite obviously it would be necessary to recognize those radar returns which involve one or two reflections from the sea during a search mode. However, instead of simply eliminating multipath returns, it would be desirable to use such multipath returns to effectively confirm the presence of a true target. Once a target has been found, its presence can be verified by a range gated beam and thereafter tracked.

The first multipath return from a target involves one reflection from the sea, usually in the return path, although a reflection from the sea to the target in the forward path is possible. The second multipath return involves two reflections, one in the forward path and one in the return path.

If the range of the target and the height of the radar platform above the sea is known, it is possible to predetermine the maximum time delay, $\Delta R_{M1}$, between the primary return and the first multipath return for a maximum target height. That delay time can then be used to look for the first multipath return of the target. The actual time delay of the first multipath return can then be determined. Once that time delay is determined, the time delay between the primary return and the second multipath return of the same target is known to be twice the time delay between the primary return and the first multipath return. Consequently, if a primary return can be recognized as the first return of a series of two or three returns received from a given doppler filter in a radar signal processor, the subsequent returns of the series may then be identified as first and second multipath returns according to the time delays from the first return of the series. If one or two multipath returns are received for a given target, the probability that a target is indeed present is increased significantly.

It has been discovered that by taking advantage of these multipath returns in this manner, an airborne MTI radar system is able to determine the existence of multipath returns associated with a primary return and, based on the state of the sea and range of the apparent target (i.e., a track candidate), decide whether or not to automatically acquire the apparent target (i.e., to initiate tracking of the target). This discovery makes it possible to avoid overloading the track store with false targets and automatically acquire only highly probable targets.

SUMMARY OF THE INVENTION

In an airborne moving-target-indication (MTI) radar system, multipath returns from airborne targets over a large body of water (sea) are used to increase the probability of automatically initiating the tracking of only true airborne targets. After all target reports from a plurality of dwells at staggered PRF's have been correlated to resolve ambiguity in range, the ambiguous or unambiguous range, of each target report is used to determine the maximum delay time, $\Delta R_{M1}$, of the first multipath return to be received from the target, where the first multipath includes one reflection from the surface of the body of water. For each return at range $R_i$, a search is made for the first multipath return, $R_{iM1}$, from a return of a target at the same radial velocity (i.e., from the same doppler filter) which satisfies the condition $R_{iM2} - R_i < \Delta R_{M1}$, and for each first multipath return, $R_{iM1}$, a search is made for a second multipath return, $R_{iM2}$, from a return of a target at the same radial velocity which satisfies the condition $R_{iM2} - R_i = 2(R_{iM1} - R_i) \pm tol$, where $tol$ is a predetermined tolerance. Each target is correlated with targets in a track store to avoid further processing of potential targets already being tracked. The multipath return count for a given target in each dwell may thus be 1, 2 or 3, depending upon whether there was no multipath return, a first multipath return only, or a first and second multipath return. If not even a direct (primary) return is received in a given swell, the count is 0. These multipath counts are used to establish a plot quality, $Q_p$, consisting of the combination of multipath count numbers from the different dwells arranged in descending order of magnitude. A minimum plot quality, $Q_M$, for the sea state and the range of the target is determined from a stored table. The plot quality, $Q_p$, is then checked to determine whether it is equal to or greater than the minimum, $Q_M$. If so, an entry is set up of the target data into an automatic acquisition track candidate table. That table may then be used to routinely acquire targets automatically in the order of the plot quality, $Q_p$. A target of ambiguous range may have a plot quality, $Q_p$, greater than the minimum, $Q_M$, for the particular combination of range and sea state, but a negative sign will indicate that range is ambiguous. In that case, the PRF at which the target was seen may be staggered with a slightly offset PRF and the ambiguity in range resolved before actually attempting to acquire the target. Each target plot not set up to be entered in the automatic acquisition track candidate table is instead set up to be displayed for possible manual acquisition.

BRIEF DESCRIPTION OF THE DRAWINGS

In the following brief description of the drawings, descriptive words which may be used hereinafter as section headings later in the text are italicized.

FIG. 6 is a block diagram of the *signal processor and radar control unit* utilized in the primary radar system of FIG. 5a.

FIG. 9b illustrates the format of a typical *radar control command* showing the field assignments of the information items listed in FIG. 9a.

FIG. 9c illustrates the format of a typical *beam return report format* showing the field assignments of the information items listed in FIG. 9a.

DESCRIPTION OF THE PREFERRED EMBODIMENTS

The present invention is directed to an airborne early warning system and more particularly to a radar system for use therein. Although the preferred embodiment of the invention will be disclosed with reference to particularly identified equipment, such as the Hughes Aircraft Company general purpose digital computer Model HM-4118, it will be recognized that the specific equipments are exemplary only and that most of what will be said herein is applicable to other alternative equipments.

The aircraft, disclosed herein as the airborne platform in the preferred embodiment of the invention, is a turbo jet cargo type aircraft of high wing, high tail design, capable of cruising at 430 knots at an altitude of 30,000. Significantly, the aircraft contains a large space volume inside the aircraft suitable for comfortably housing the equipment required for the early warning system.

Basically, the objective of an airborne early warning system is to extend surveillance coverage beyond that available from a land based radar system and more specifically to extend the capability of detecting low altitude targets. In accordance with the present invention, a system is provided which yields radar surveillance coverage of 360° in azimuth and a detection range greater than 180 nautical miles with respect to a five meter square target. Moreover, a system in accordance with the present invention has the ability of recognizing a moving airborne target even in the presence of relatively high land and sea clutter.

Figure 1:
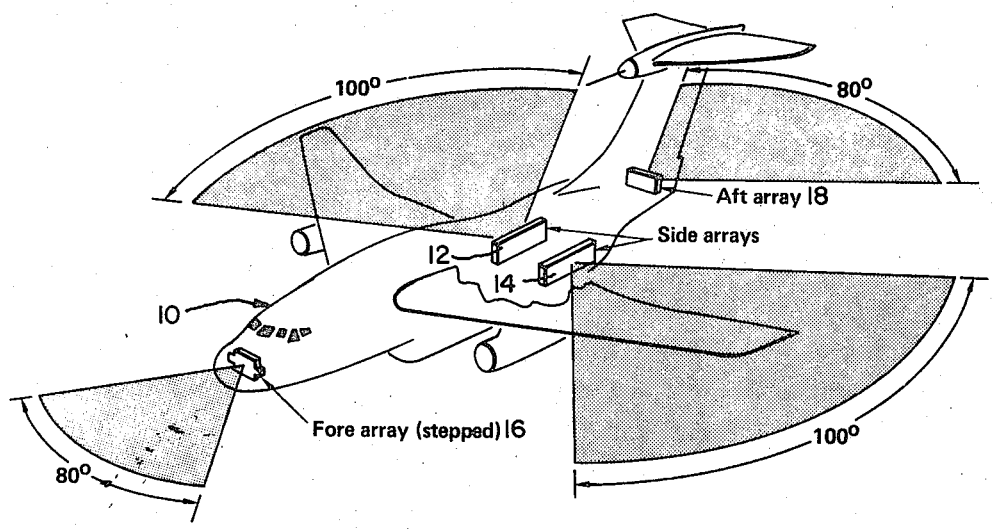
FIG. 1 is a perspective view illustrating the *antenna layout in aircraft* in accordance with the present invention.

FIG. 1 — Antenna Layout in Aircraft

Attention is now called to FIG. 1 which depicts an aircraft 10 and illustrates, in accordance with a preferred embodiment of the invention, the preferred installation of radar antennas within the aircraft. In order to provide 360° surveillance coverage, maintain optimum track and search rates and avoid aerodynamic modification of the aircraft, multiple array antennas are utilized and placed at different locations on and within the periphery of the aircraft. More particularly, the antenna arrays include a pair of side arrays 12, 14 respectively identified as the starboard array and the port array, a fore array 16 and an aft array 18. The side arrays 12, 14 are preferably identically dimensioned, each having a height of about 3 feet and a width of about 12 feet. The fore array 16 and the aft array 18 are respectively mounted in the nose and tail sections of the aircraft. The fore and aft arrays measure approximately three feet in height and eight feet in width.

As depicted in FIG. 1, each of the arrays is intended to operate within a specific azimuth sector relative to the aircraft. Each of the side arrays is illustrated as operating within a 100° sector and each of the fore and aft arrays within an 80° sector to achieve 360° surveillance coverage. In actual practice, each array should be constructed to operate in at least a 5° wider sector than depicted in FIG. 1 in order that the array sectors overlap slightly, but for simplicity of illustration, no overlap is here contemplated.

As will be seen hereinafter, each array is able to fire a beam at any azimuth angle within its sector of operation. The firing angle measured from broadside of an array can be controlled by appropriately selecting the relative phase of signals fed to the dipole elements of the array. This is referred to as beam steering and has been widely discussed in the literature; see for example *Introduction to Radar Systems*, by M. I. Skolnik, McGraw Hill (1962) at page 298. In the preferred embodiment of the invention, the radar system will cause the arrays to cover a full 360°; e.g., ninety-four beams at different azimuth positions spaced 4° apart (94 beams may be utilized with a 4° overlap for each array). Interleaved in time with the "search" beams are beams fired for other purposes, such as "verify" or "track." The digital computer operates in accordance with a stored program to determine priorities and compute the parameters of each beam to be fired. Alternatively, a fixed pattern of searching, verifying targets found and tracking targets previously found and selected for tracking can be established, but for maximum flexibility and use of radar time or energy, an adaptive pattern under a stored program is preferred.

Figure 2:
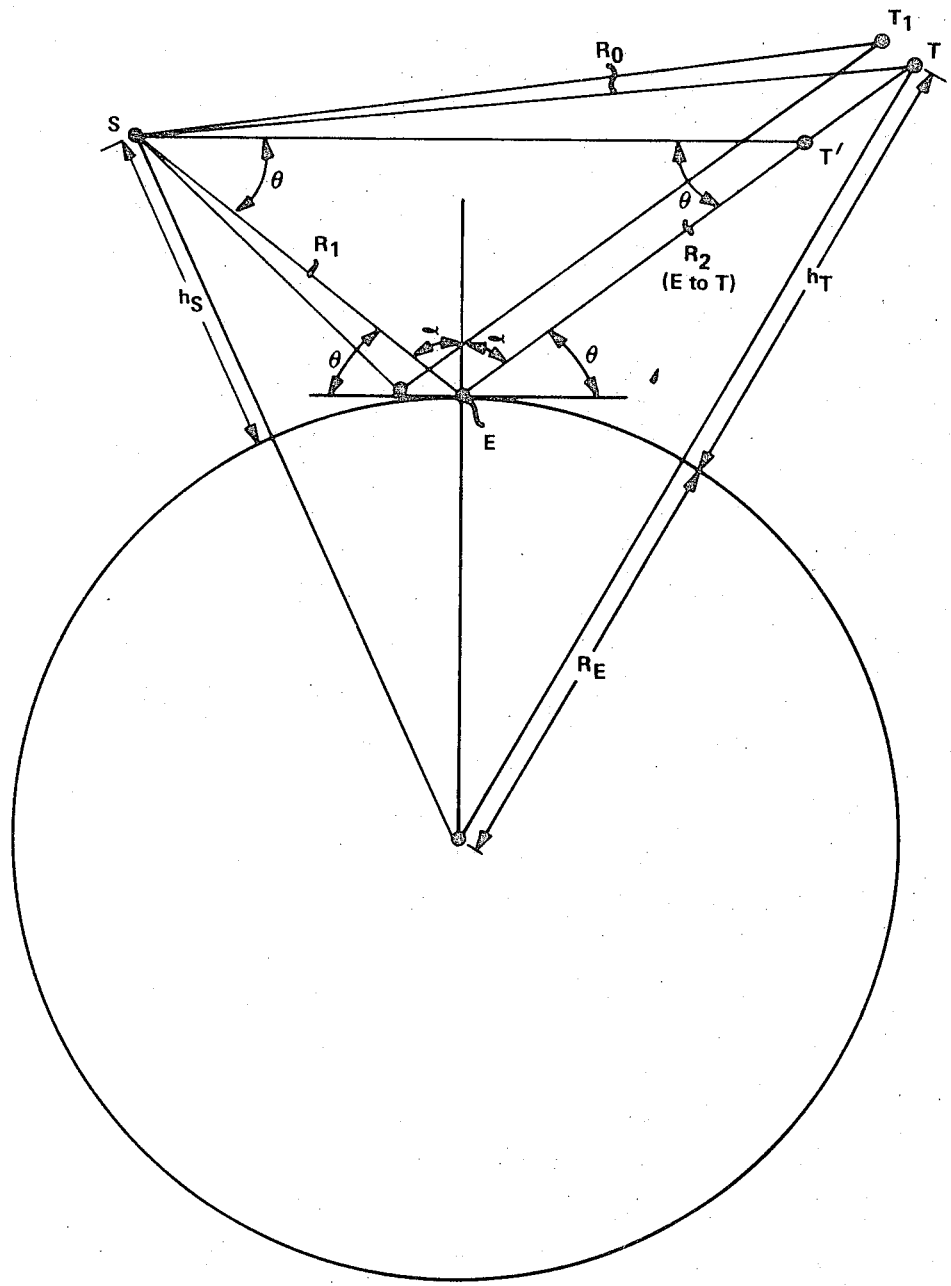
FIG. 2 illustrates the *multipath geometry of an airborne MTI radar system* with both a direct and a multipath transmission path for radar pulses.

FIG. 2 — Multipath Geometry of an Airborne MTI Radar System

As will be described more fully hereinafter, the airborne early warning system will, in the search mode, receive more than one radar report for each target. By utilizing combinations of these returns, a target quality plot can be generated to permit automatic acquisition of targets for tracking with a high degree of confidence.

FIG. 2 illustrates the multipath geometry which produces more than one radar report for each target. A first report follows a path directly from the radar sensor (S) to the target (T) and from there directly back to the radar sensor (i.e., antenna). A second report follows a path from the radar sensor to the sea, from the sea to the target, and from the target back to the radar sensor, or the same path in reverse. A third report follows a path from the radar sensor to the sea, from the sea to the target, and back to the radar sensor via the sea.

A second cause of multiple radar report for each target is the use of three staggered PRF's at one azimuth angle of radar transmission to provide overlapping visibility in target radial velocity (doppler) and range. Therefore, at one azimuth angle, one target can produce three radar reports in each of the three paths. For example, if a target has only the one multipath report, in addition to a primary (direct) report, and is visible with two of the three staggered PRF's, six radar reports are generated from the one target.

The staggered PRF's are 77 pulses at 3125, 74 pulses at 2232 and 72 pulses at 1562 pulses per second. These groups of pulses, each referred to as a dwell, are transmitted in sequence, and each group consists of four subgroups of sixteen data pulses preceeded by thirteen, ten and eight fill pulses. Fill pulses are fired prior to the data pulses in order to assure that the same clutter pattern is seen for each data pulse by the MTI signal processor. For convenience the three dwells at 3125, 2232 and 1562 pulses per second will be referred to as dwells 1, 2 and 3 or dwells X, Y and Z, and radar returns of a particular dwell will be identified by a subscript, e.g., $R_x$ for a radar return of dwell X.

In accordance with the present invention, these multiple reports are processed to increase the probability of identifying a true target. The first step in the process is to compare reports in the three dwells to identify the returns at different PRF's from one target, and to resolve range ambiguity in the process, as will be described more fully hereinafter.

The next step is to determine for each primary (direct) return $R_i$, where $i = x, y$ or $z$, the maximum delay $\Delta R_{M1}$, between the primary return and a first multipath return. Then using that value of $\Delta R_{M1}$, the next step is to look for a first multipath return $R_{iM1}$ received which satisfies the condition $R_{iM1} - R_i < \Delta R_{M1}$ where R in each instance is in terms of time. Once a first multipath return is found which satisfies that condition, the next step is to determine whether the primary and first multipath returns have the same doppler frequency. If so, the return $R_{iM1}$ is effectively set aside as "processed" and a multipath count for dwell $i$ is set equal to 2 thus indicating a greater probability that the primary return seen in that dwell $i$ is a target.

If a first multipath return $R_{iM1}$ is found for a primary return $R_i$ of the same doppler frequency, the process continues, searching next for a second multipath return $R_{iM2}$ which satisfies the condition $R_{iM2} - R_i = 2(R_{iM1} - R_i) \pm tol$, where each R is again in terms of time and tol is a tolerance value. Once a second multipath return $R_{iM2}$ is found which satisfies that condition, the next step is to determine whether the primary and second multipath returns have the same doppler frequency. If so, the return $R_{iM2}$ is effectively set aside as processed and a multipath count for dwell $i$ is set equal to 3, thus indicating an even greater probability that the primary return seen in that dwell $i$ is a true target.

For each of the three dwells, these primary, first multipath and second multipath returns yield a count which are used to calculate a target plot quality. For example, if there is no primary return for a dwell, the count is 0. If there is a primary return for a dwell but both multipaths are missing, the count is 1. If there is a primary return for a dwell and the second multipath is missing, the count is 2. The counts from the three dwells are ultimately arranged in descending order to form the plot quality. For example, if dwell 1 had a count of 2, dwell 2 a count of 0 and dwell 3 a count of 3, the plot quality would be 320.

Before determining a plot quality for a target report, the returns of a target that is a candidate for track acquisition is first cross correlated to determine if it is already being tracked by comparing its plot coordinates (range and azimuth converted to Cartesian coordinates) with the plot coordinates of targets already in a track table. Then only those returns of targets not already being tracked are processed for track quality, which is a function of range and sea state. For example, if the sea is high, no automatic acquisition is possible and the target candidate must be displayed for an operator to exercise judgment as to whether or not it should be tracked. If the sea state is somewhere between calm and high, there will be a minimum plot quality for the particular range and sea state. For example, if the sea state is calm, a minimum plot quality of 300 might be required for automatic target acquisition for a given range. The range of a target with such a plot quality is, however, ambiguous since a target return from two dwells is necessary to resolve range ambiguity. For a moderate sea, a plot quality of 210 might be required for automatic track acquisition for a given range.

This multipath return processing will be described more fully hereinafter, but the theoretical basis for it will now be described. For simplicity, assume a flat earth surface E and a target T' at the same altitude as the radar sensor. All angles $\theta$ are then equal. Further assume ST to be a one-way slant range from the radar to the target, and SET to be a one-way multipath range from the radar to the target via the flat earth. Under those conditions $\frac{1}{2}\overline{ST} = \frac{1}{2}\overline{SET} \cos \theta$. Therefore, $\overline{ST} = \overline{SET} \cos \theta$.

The path difference $\Delta R_{M1}$ between the direct and the first multipath return is $$\Delta R_{M1} = (\overline{SET} + \overline{ST}) - 2(\overline{ST})$$
$$= \overline{SET} - \overline{ST}$$

Substituting $\overline{ST}/\cos\theta$ for $\overline{SET}$ yields $$\Delta R_{M1} = \overline{ST}/\cos\theta - \overline{ST}$$
$$= \overline{ST}(\sec\theta - 1)$$

For the second multipath return $$\Delta R_{M2} = 2(\overline{SET}) - 2(\overline{ST})$$
$$= 2(\overline{ST})/\cos\theta - 2(\overline{ST})$$
$$= 2\overline{ST}(\sec\theta - 1)$$

This demonstrates that the second multipath delay $\Delta R_{M2}$ is twice the first multipath delay $\Delta R_{M1}$ for a target at the same altitude as the radar sensor.

A similar analysis of the more complex geometry resulting from a different altitude for the target will show that the second multipath delay $\Delta R_{M2}$ is still twice the first multipath delay $\Delta R_{M1}$ for a target at a different altitude. Take for example a target $T_1$ at an altitude greater than that of the radar sensor. The first and second multipath delays are given by $$\Delta R_{M1} = \overline{SE'T'} + \overline{ST'} - 2(\overline{ST'})$$
$$= \overline{SE'T'} - \overline{ST'}$$
$$\Delta R_{M2} = 2(\overline{SE'T'}) - 2(\overline{ST'})$$
$$= 2(\overline{SE'T'} - \overline{ST'})$$

Consequently, once the first multipath delay $\Delta R_{M1}$ has been measured, it can be used to check for a return of the same doppler frequency of twice the delay, namely $\Delta R_{M2} = 2\Delta R_{M1}$ to identify the return as a second multipath return.

The difference in doppler frequency for the first multipath return and the direct return is essentially only that difference between radial velocity $\dot{R}$ of the target and a vector component of target velocity $\dot{R}$ along the path $\overline{ET'}$, namely $\dot{R} - \dot{R}\cos\theta$, where $\dot{R}$ is the target velocity along the direct path $\overline{ST'}$. Assuming the radar and target are at the same altitude, the difference in doppler frequency between the first multipath and the second multipath is again $\dot{R} - \dot{R}\cos\theta$. The difference between the doppler frequency of the direct return over the path $\overline{ST'}$ and the second multipath return over the path $\overline{SET'}$ is $2\dot{R}\cos\theta$. It is therefore evident that except for close in targets, $\cos\theta$ will be very nearly equal to 1.00. Consequently, although the doppler frequency for the second multipath will be less than the first multipath return, and the doppler frequency of the latter will be less than the direct return, differences in doppler frequency will be sufficiently small for all returns to pass through the same doppler filter. Difference between target altitude and radar sensor altitude will have little effect on the differences in doppler frequency. Since most targets would be detected at long range (greater than 30 nautical miles at an altitude of about 15,000 feet) it is reasonable to discriminate multipath radar returns from a single target not only on the basis of time delay but also on the basis of doppler shift.

Under extreme operating conditions where this can no longer be depended upon, the process to be described can be modified to include a check for returns in the next lower doppler filter.

Figure 3A:
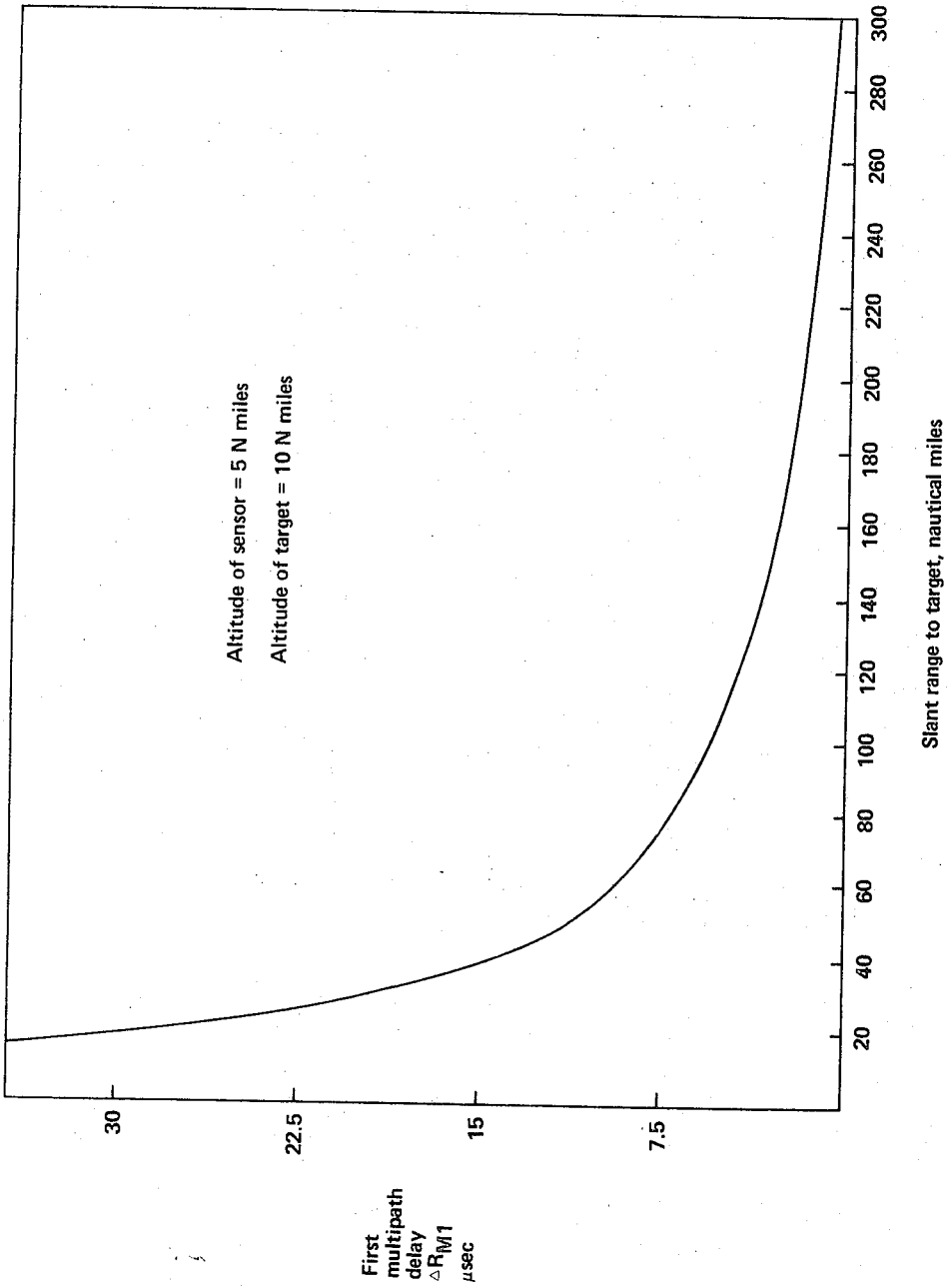
FIG. 3a is a graph of first *multipath delay $\Delta R_{M1}$ versus target range* for a given radar platform altitude.

FIG. 3a — Multipath Delay $\Delta R_{M1}$ Versus Target Range

To determine the maximum first multipath delay $\Delta R_{M1}$ for the purpose of looking for the first multipath return following a primary (direct) return, a family of delay time versus range to target curves may be used, one curve for each altitude. Since during initial acquisition the altitude of the target is unknown, the curve for the maximum height which the adder can see provides the maximum first multipath delay envelope. FIG. 3a illustrates a typical curve for a radar sensor altitude of 5 nautical miles. The curve assumes a maximum altitude for the target of 10 nautical miles. This curve which represents the maximum first multipath time delay envelope is picked so that the time delay between the primary and the first multipath return for a given range would be less than or equal to the maximum first multipath delay for that range. The ranges are segmented into 10 nautical-mile intervals for table look-up purposes.

It would be feasible to calculate $\Delta R_{M1}$ from a basic equation giving the time delay as a function of target range and radar altitude. However, it is preferred to precompute the maximum time delays and use table look-up techniques to quickly determine the maximum $\Delta R_{M1}$. Alternatively, the delay time for the worst case of both target and radar at an altitude of 10 nautical miles and a target range of 30 nautical miles could be used for $\Delta R_{M1}$ in all cases, but the reliability of the multipath target acquisition technique would be degraded in those situations where a first multipath return is found, but not a second. Once a first multipath return is found, its delay over the primary (direct) return is known and used as an accurate $\Delta R_{M2}$ to find a second multipath return. Consequently, if no other return matches the delay $\Delta R_{M2} \pm tol$, it is not known whether the first multipath return was from the same target or some other target. This is because failure to find a second multipath return could have been due to a less than smooth sea failing to reflect a second multipath return from the target back to the radar sensor as well as to misidentification of a primary return from another target as a first multipath return. However, discrimination of multipath returns on the basis of doppler shift will minimize such misidentification.

The manner in which data was computed for the graph of FIG. 3a will now be described. Referring to FIG. 2, assume a position S of the radar sensor at an altitude $h_s$, a position T of the target at an altitude $h_T$, and a range $R_o$ from the sensor to the target. Altitude is measured from sea level. The radius of the earth, $R_E$, is to be added to the altitudes to obtain distances of the sensor and target from the center of the earth. Because the earth is not a perfect sphere, it is necessary to use four-thirds of earths standard radius for the northern hemisphere. $R_1$ is the distance from the sensor to the point E of reflection on the earth's surface. $R_2$ is the distance from the point of reflection on the earth's surface to the target.

The earth's surface is assumed to be smooth. Therefore, the angle of incedence equals the angle of reflection. Using the law of cosines, the following equations can be written.

$$\text{p1 } R_o^2 = R_1^2 + R_2^2 - 2R_1R_2\cos 2\alpha \qquad (1.0)$$
$$(h_s + R_E)^2 = R_1^2 + R_E^2 - 2R_1R_E\cos(180 - \alpha) \qquad (2.0)$$
$$(h_T + R_E)^2 = R_2^2 + R_E^2 - 2R_2R_E\cos(180 - \alpha) \qquad (3.0)$$

The following identities are useful: $\cos 2\alpha = 2\cos^2\alpha - 1$; $\cos(180° - \alpha) = -\cos\alpha$.

Restating equation (2.0):

$$\cos\alpha = (h_s + R_E)^2 - R_1^2 - R_E^2/2R_1R_E$$
$$= h_s^2 + 2h_sR_E - R_1^2/2R_1R_E \qquad (2.1)$$

Restating equation (3.0):

$$\cos\alpha = h_T^2 + 2h_T R_E - R_2^2/2R_2 R_E \quad (3.1)$$

Combining equations (2.1) and (3.1) to eliminate $\cos\alpha$:

$$h_s^2 + 2h_s R_E - R_1^2/2R_1 R_E = h_T^2 + 2h_T R_E - R_2^2/2R_2 R_E \quad (4.0)$$

$$h_s^2 + 2h_s R_E - R_1^2/R_1 - h_T^2 + 2h_T R_E - R_2^2/R_2 = 0 \quad (4.1)$$

Let $\phi(R_1, R_2) = R_2(h_s^2 + 2h_s R_E - R_1^2) - R_1(h_T^2 + 2h_T R_E - R_2^2) = 0 \quad (4.2)$ Restating equation (1.0) as follows:

$$R_o^2 = R_1^2 + R_2^2 - 2R_1 R_2 (2\cos^2\alpha - 1) \quad (1.1)$$

$$\cos^2\alpha = (R_1 + R_2)^2 - R_o^2/4R_1 R_2 \quad (1.2)$$

Combining equations (1.2) and (2.1) to eliminate $\cos^2\alpha$ $$(h_s^2 + 2h_s R_E - R_1^2)^2/4R_1^2 R_E^2 = (R_1 + R_2)^2 - R_o^2/4R_1 R_2 \quad (5.0)$$

$$(h_s^2 + 2h_s R_E - R_1^2)^2/4R_1 R_E^2 - (R_1 + R_2)^2 - R_o^2/R_2 = 0 \quad (5.1)$$

Let $\Psi(R_1, R_2) = R_2(h_s^2 + 2h_s R_E - R_1^2)^2 - R_1 R_E^2 (R_1 + R_2)^2 + R_1 R_o^2 R_E^2 = 0 \quad (5.2)$ The real roots of the two equations (4.2) and (5.2) in the two unknowns $R_1$, $R_2$ can then be found by the Newton-Raphson method for simultaneous equations, where $$d\Psi/dR_1 = -2R_1 R_2 - h_T^2 - 2h_T R_E + R_2^2 \quad (6)$$

$$d\Psi/dR_2 = h_s^2 + 2h_s R_E - R_1^2 + 2R_1 R_2 \quad (7)$$

$$d\phi/dR_1 = 2R_2(h_s^2 + 2h_s R_E - R_1^2)(-2R_1) + R_o^2 R_E^2 - 3R_1^2 R_E^2 - 4R_1 R_2 R_E^2 - R_E^2 R_2^2 \quad (8)$$

$$d\phi/dR_2 = (h_s^2 + 2h_s R_E - R_1^2)^2 - 2R_1 R_E^2(R_1 + R_2) \quad (9)$$

To produce the graph of FIG. 3a, the following table of values for $R_1$, $R_2$ and $\Delta R_{M1}$ is then calculated as a function of range in steps of 20 n miles, assuming $h_s = 5$ n miles, $h_T = 10$ n miles. The time delay $\Delta R_{M1}$ is given in microseconds.

| $R_o$ | $\Delta R_{M1}$ | $R_1$ | $R_2$ |
|---|---|---|---|
| 20 | 27.69 | 8.17 | 16.32 |
| 30 | 19.44 | 11.06 | 22.08 |
| 40 | 14.82 | 14.17 | 28.23 |
| 50 | 11.90 | 17.38 | 34.55 |
| 60 | 9.89 | 20.66 | 40.95 |
| 70 | 8.43 | 23.97 | 47.39 |
| 80 | 7.31 | 27.33 | 53.85 |
| 90 | 6.43 | 30.73 | 60.31 |
| 100 | 5.71 | 34.17 | 66.76 |
| 110 | 5.11 | 37.64 | 73.19 |
| 120 | 4.61 | 41.15 | 79.60 |
| 130 | 4.17 | 44.70 | 85.98 |
| 140 | 3.79 | 48.28 | 92.34 |
| 150 | 3.46 | 51.91 | 98.66 |
| 160 | 3.17 | 55.57 | 104.94 |
| 170 | 2.90 | 59.28 | 111.19 |
| 180 | 2.66 | 63.04 | 117.40 |
| 190 | 2.44 | 66.84 | 123.56 |
| 200 | 2.25 | 70.69 | 129.68 |
| 210 | 2.06 | 74.58 | 135.76 |
| 220 | 1.90 | 78.52 | 141.79 |
| 230 | 1.74 | 82.50 | 147.78 |
| 240 | 1.60 | 86.54 | 153.72 |
| 250 | 1.46 | 90.62 | 159.62 |
| 260 | 1.34 | 94.75 | 165.47 |
| 270 | 1.22 | 98.92 | 171.27 |
| 280 | 1.11 | 103.15 | 177.04 |
| 290 | 1.01 | 107.41 | 182.75 |
| 300 | 0.92 | 111.72 | 188.43 |

In this table, time is given in microseconds. Since table look-up is most easily done in a digital computer, the table of range $R_o$ and delay $\Delta R_{M1}$ is stored. A similar table may be computed and stored for different sensor altitudes if surveillance missions are to be flown at different altitudes. Here it is assumed the aircraft will cruise at an altitude of 30,000 feet (about 5 n miles). Therefore, only the one table is required. If more than one table is provided, the appropriate table would be addressed as a function of aircraft altitude, always assuming a maximum target altitude of 60,000 feet (about 10 n miles). In each case, the table need include only the delay time $\Delta R_{M1}$ since the values of $R_1$ and $R_2$ computed by the Newton-Raphson method are not required in this automatic target acquisition system.

Figure 3B:
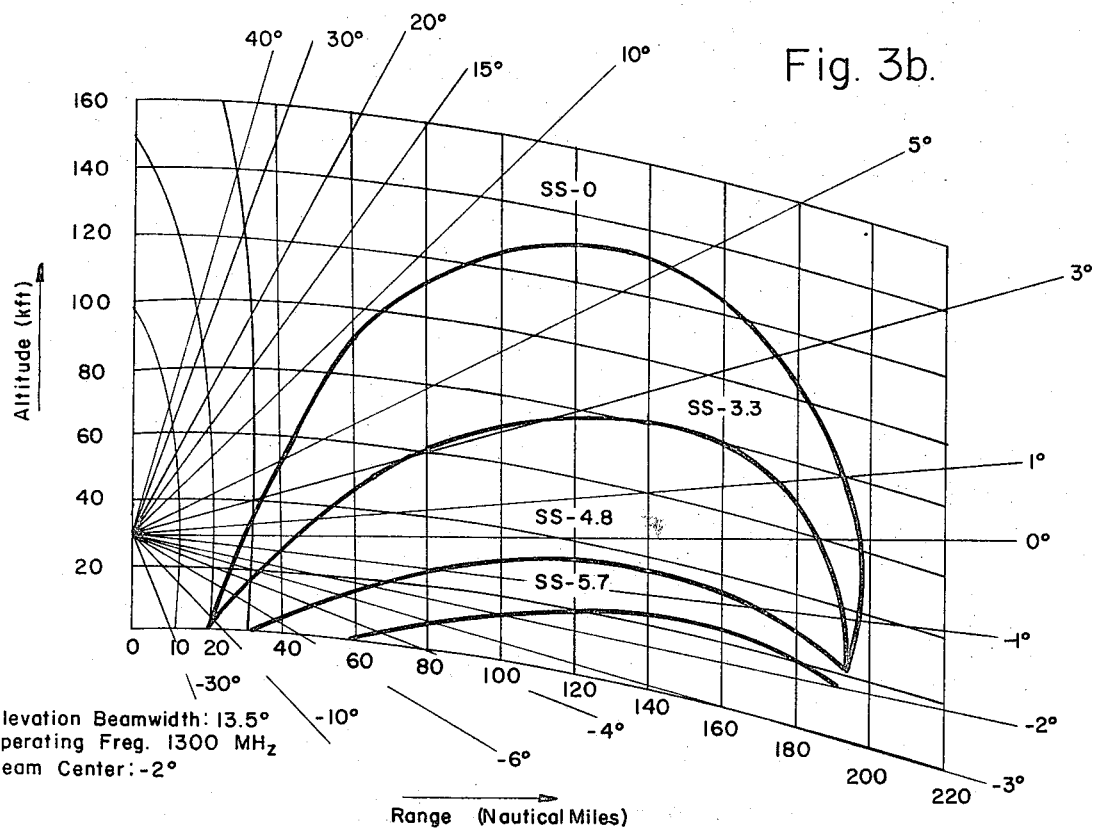
FIGS. 3b and 3c are graphs showing the *likelihood of target multipath returns for given sea conditions*.
Figure 3C:
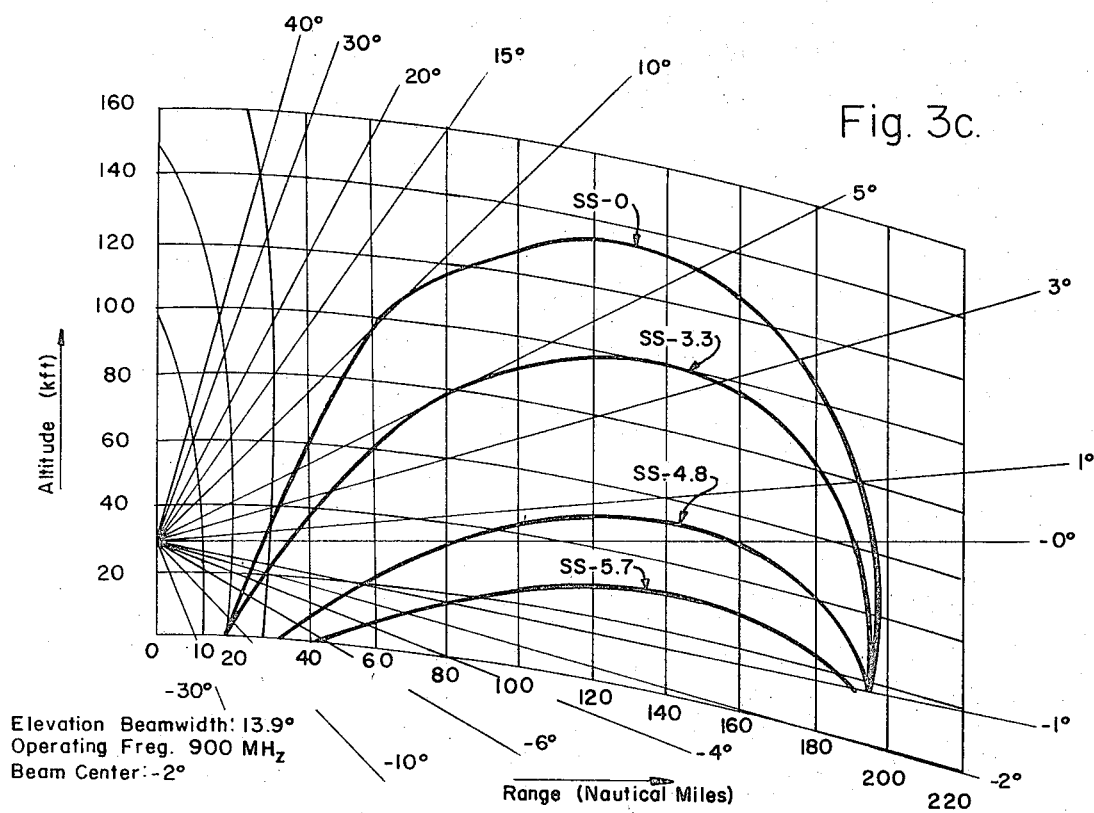

FIGS. 3b and 3c Likelihood of Target Multipath Returns For Given Sea Conditions

As noted hereinbefore, the intensity of sea echo increases as the sea becomes rougher. Therefore, sea state, as a measure of sea roughness, is of interest in this system only as in intermediate parameter in predicting the likelihood of target multipath returns for given sea conditions. FIG. 3b is a graph showing this likelihood for a radar sensor at 30,000 feet and an operating frequency of 1300 MHz. FIG. 3c shows this same information for an operating frequency of 900 MHz. In both cases the detection range at beam center is the same; the slight variation in coverage for sea-state 0 is a result of different elevation beamwidths. In FIG. 3b, the elevation beamwidth is 13.5°, and in FIG. 3c, it is 13.9°. In both instances the beam center is at −2°.

The range, $R_o$, of the target is plotted as the abscessa along a curved X-axis in a scale from 0 to 220 nautical miles. The curvature in the graph accounts for the curvature of the earth. The probability of a multipath return as a function of range for each of four distinct sea states SS-0 (calm sea) to SS-5.7 (rough sea) is then plotted as the ordinate for different target elevation angles relative to the radar sensor. Range was determined by assuming a range track gate of 100 range cells and an average false alarm rate of one every 10 seconds. A track gate of 100 range cells was based on: the maximum delay to be measured between direct path return and multipath return being 7.5 μs (0.6 n mi); the track being maintained on a MACH-3 target at an average update rate of 2 seconds (MACH 3 = 3000 ft/sec); and a design margin of 2.

In generating the plots the different antenna pattern loss for direct and multipath returns as well as the different atmospheric attenuation for the two different paths were considered. By tilting the beam by −2° it was found that antenna pattern loss was approximately equal for the two paths. Atmospheric loss was somewhat greater for the multipath return causing the coverage to be reduced slightly below the coverage for direct path alone. The near-in coverage is truncated at a bounce angle corresponding to the point on the earth at which the coverage pattern intersects the earth since any targets at ranges less than this will have bounce paths outside the main beam. To further explain the graphs of FIGS. 3b and 3c, for a specific range in a sea-state zero (SS0), any target in FIG. 3b, for example, under the SS0 curve should be detected by the system of the invention using the described quality standards. The radar craft is at 30,000 feet altitude and the target may have any altitude as high as 130,000 feet. The graphs of FIGS. 3b and 3c show that the detection technique of the invention is verified by all computations and that targets can be acquired in both smooth and rough sea conditions.

The coverage as a function of sea-state was obtained by modifying the curves for a smooth sea according to the expression $$C/D = \exp[-8(\pi H \Psi/\lambda)^2] \quad (10)$$

where
H = RMS wave height (=0.5 $H_{0-p}$), in feet
$\Psi$ = grazing angle, in radians
$\lambda$ = operating wavelength, in feet
C/D = reduction in forward voltage reflection coefficient This expression is reported by C. I. Beard, "Coherent and Incoherent Scattering of Microwaves from the Ocean," IRE Trans. on Antennas and Propagation, pp. 470–483, Sept. 1961, to be valid for both vertical and horizontal polarization. The plots for 1300 MHz and 900 MHz include a correction for reflection coefficents below 0.45 based on experimental results reported ly C. I. Beard in his paper, supra, and by C. I. Beard, I. Katz, and L. M. Spetner, in "Phenomonological Vector Model of Microwave Reflection from the Ocean," IRE Trans, on Antennas and Propagation, Vol. AP-4, pp. 162–167, April 1956.

The curves have been calculated assuming an average multipath return power equal to the direct power modified by equation (10). In reality, the amplitude of the multipath return (before applying that equation) varies from zero to four times greater than the direct power return depending on the relative phasing between the two components of the multipath return, i.e., the direct-path/bounce-path and the bounce-path/direct-path. It can be argued then that, if a height measurement is not required on every update (and straight-line tracking would tend to support this), then only those updates where a valid update (i.e., a predetermined threshold crossing) was acquired would be used to estimate target height thereby eliminating the consideration all target returns which do not cross this threshold. This in effect would consider coverage based only on "good" returns, hence increasing the possibile coverage according to a $\Delta S/N$ ratio between a minimum value of 0 dB to a maximum of 6 dB at the cost of increased time between valid updates. For a uniform distribution of multipath returns of zero to four times the direct return, the average value is 3 dB.

As noted hereinbefore, sea state is of interest only as an intermediate parameter. It is clearly possible to go directly from sea echo measurement to probability of target multipath returns. However, since sea state can be estimated visually or from weather reports, the likelihood of multipath returns can be estimated in the absence of radar measurements of the sea echo, thus a manual entry of current sea state may be easily provided. Consequently, in the exemplary embodiment of this invention periodic manual entry of sea state (from radio reports as weather conditions change) is contemplated. However, it is obviously possible to program the radar system to determine sea state by depressing the beam 10° from the horizontal and measuring sea echo return at 90° azimuth intervals, once upwind, once downwind and twice crosswind, and averaging the return. The amplitude of the averaged return may then be used to enter a table to determine "sea state." The range of echo signal amplitude must also be controlled to ensure that minimum expected signals exceed the receiver noise threshold while strongest expected signals do not saturate the receiver. This can be accomplished by range gating the sea echo. Since the radar system is designed to eliminate fixed surface (non-moving) targets it is necessary when making the sea state measurements to introduce an appropriate velocity bias into the radar system. This can be done by manipulating $\Delta F$, ground doppler offset, to correct for aircraft velocity plus whatever velocity one wishes to assign the sea echo to ensure that it is recognized as a moving target. Sample calculations for experimental data given by Fred E. Nathason, in *Radar Design Principles*, McGraw-Hill Book Co., at page 236, for L-Band, horizontal polarization and a 10° grazing angle, is reported as follows.

| Sea State | 0 | 1 | 2 | 3 | 4 | 5 |
|---|---|---|---|---|---|---|
| Reflection Coefficient db below $lm^2/m^2$ | 60 | 56 | 53 | 48 | 45 | 53 |

17 db dynamic range is required to encompass the signals of interest.

Before proceeding with a more detailed description of this invention relating to multipath automatic target acquisition, an exemplary environment will be described with reference to FIGS. 4 through 11.

Figure 4:
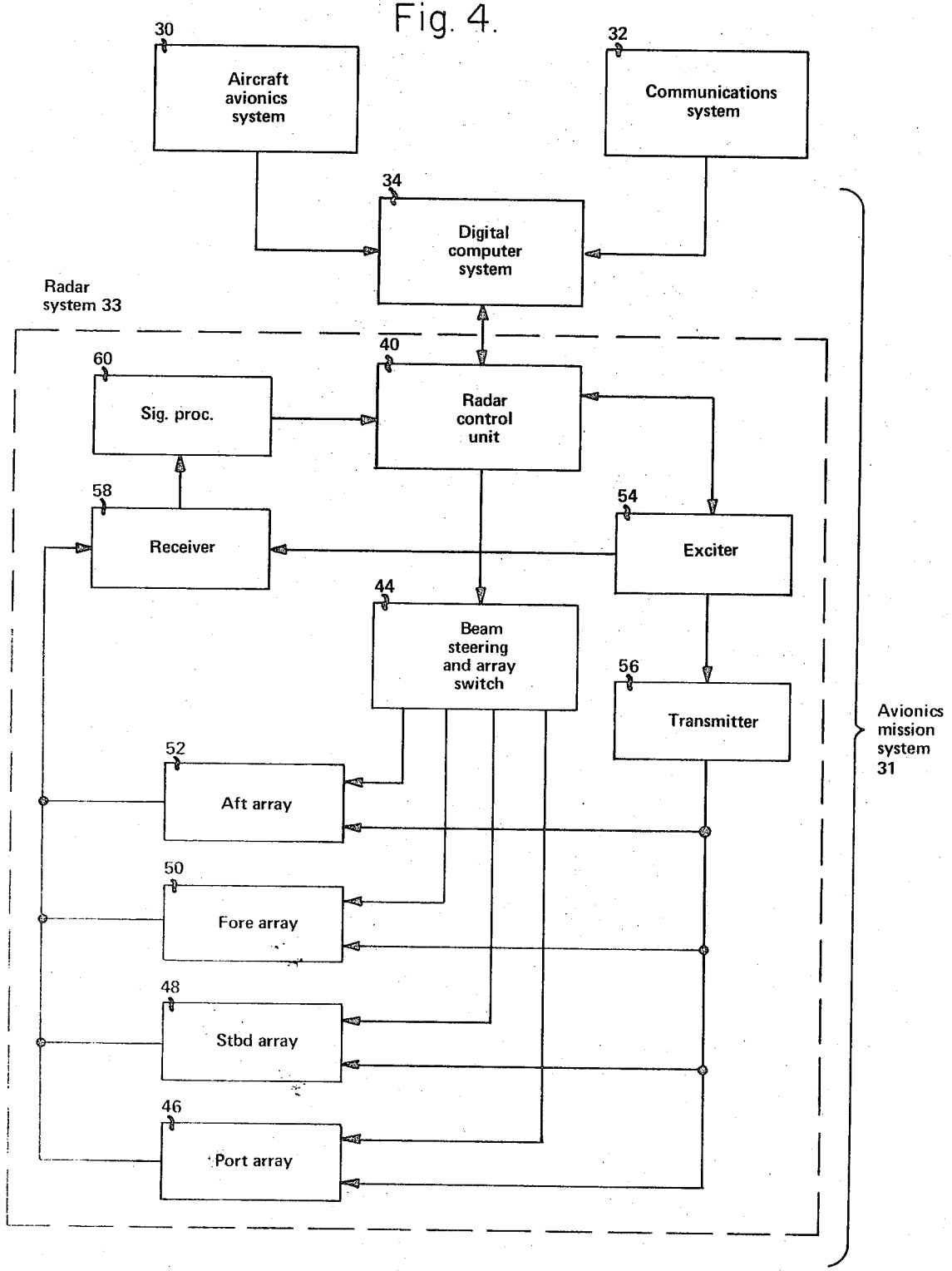
FIG. 4 is a block diagram of an *airborne early warning system* incorporating a radar system in accordance with the present invention containing a primary radar subsystem and a secondary radar subsystem.

FIG. 4 — Airborne Early Warning System

FIG. 4 illustrates a block diagram of an airborne early warning system. Briefly, the system can be considered as being comprised of the following major system components:

1. Aircraft system (not represented in FIG. 4);
2. Aircraft avionics system 30;
3. Mission avionics system 31;
4. Communications system 32.

The communication system 32 is generally comprised of airborne equipment used to communicate with ground based systems and other airborne systems.

The aircraft avionics system 30 includes the equipments which are generally essentiial for an aircraft to operate in a military environment. These equipments perform various functions related to navigation, identification, communication, et cetera, in addition to performing these general military functions, some of the aircraft avionics equipment interact with the mission avionics system 31 to assist with radar associated coordinate transformations and extrapolations.

The mission avionics system 31 is comprised of several system components including the radar system 33 and digital computer system 34. The mission avionics system includes other systems not shown which function to distribute power and cool the equipment. The present invention is directed primarily to the radar system 33 and digital computer system 34 of the mission avionics system 31.

The function of the primary radar subsystem is to fire search beams through 360° in azimuth to locate, verify and acquire targets. Subsequently, track beams are fired from the aircraft toward those targets to continually update target data stored in the memory module of the computer system 34.

The digital computer system develops radar control commands which define beam parameters and which are supplied to the radar subsystem 33. The digital computer subsystem 34 develops the radar control commands in response to beam return reports from the radar subsystem 33.

Considering the radar subsystem 33 in greater detail, it can be seen to comprise a radar control unit 40 which bilaterally communicates with the digital computer system 34. That is, the digital computer system provides radar control commands to the radar control unit to define the parameters of beams to be fired. The radar control unit in turn supplies beam return reports to the digital computer system.

In response to a radar control command, the radar control unit 40 controls beam steering and array switching equipment 44. The beam steering and array switching equipment 44 in turn selects which of the primary arrays 46, 48, 50 or 52 is to be fired and further controls the angle at which the beam is steered or fired.

The radar control unit 40 additionally controls an exciter 54 which provides coded drive waveforms to a transmitter 56 and local oscillator signals to a receiver 58. The transmitter 56 in turn supplies a signal of appropriate frequency, duration, etc., to the arrays 46, 48, 50 and 52 to cause a beam to be fired at an angle from broadside of one array controlled by means 44. The echo beam from the target is thereafter supplied by the firing array to the receiver 58 which in turn supplies the information, in analog form, to the radar signal processor 60. The signal processor 60 converts the applied analog information to digital form and then operates upon it to select the desired signal information out of the noise and clutter. The operation of the signal processor is in part determined by control signals provided from the radar control unit in response to the radar control command supplied by the digital computer system. The signal processor 60 develops information which enables the radar control unit 40 to assemble a beam return report which is subsequently supplied to the digital computer system 34.

Figure 5A:
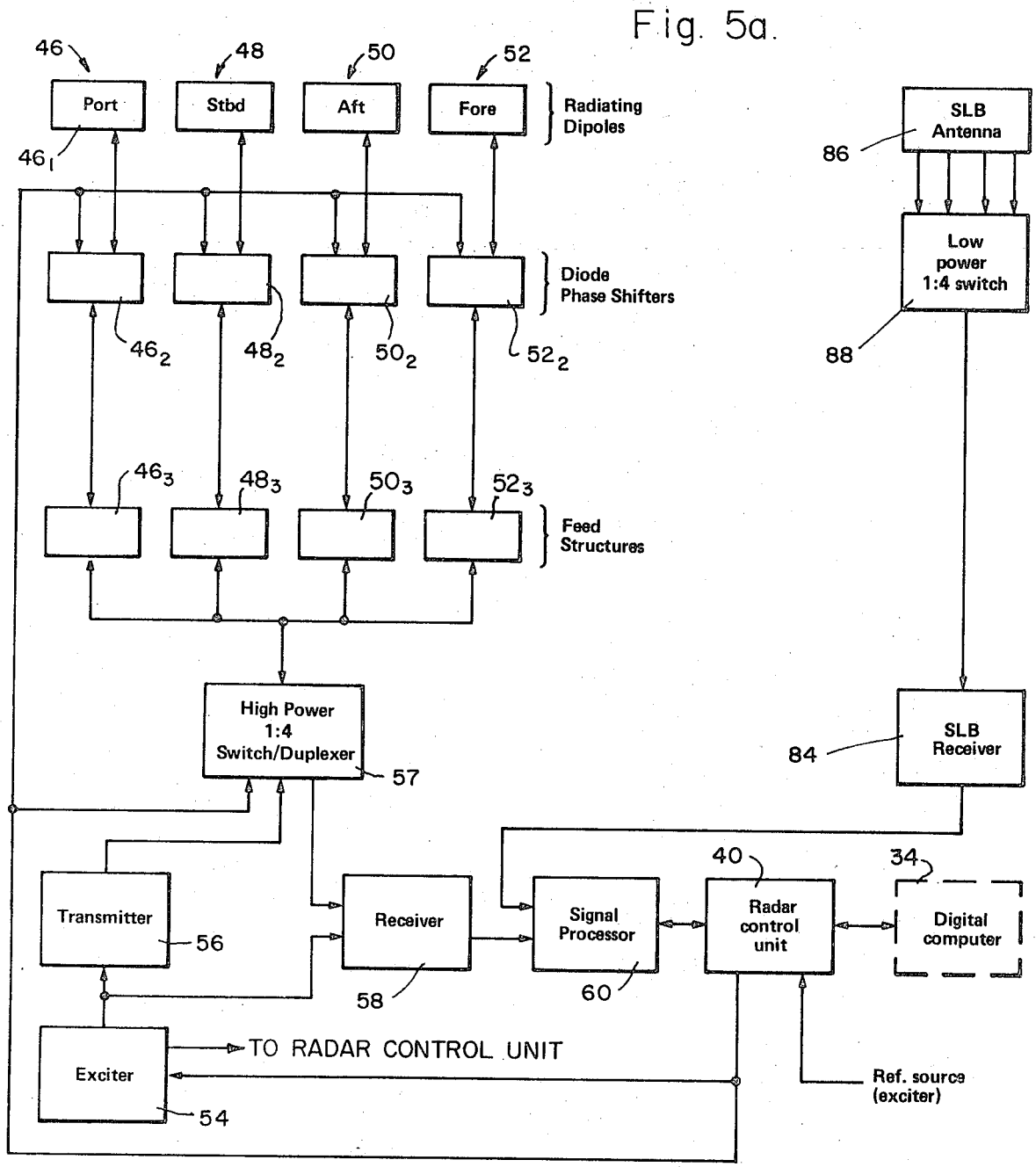
FIG. 5a is a block diagram illustrating the *primary radar subsystem* of FIG. 4 in greater detail.

FIG. 5a — Primary Radar Subsystem

FIG. 5a illustrates a more detailed block diagram of the radar subsystem 33. Associated with each of the arrays, e.g., the port array 46, is a set of radiating dipoles $46_1$, a diode phase shifter $46_2$, and a feed structure $46_3$. Briefly, power from a transmitter 56 is switched to any one of the four arrays by a high power 1:4 switch and duplexer 57. The outputs of the switch 57 are preferably connected by coaxial cables to respective feed structures at each array location, each feed structure being comprised of a radial power line divider for azimuth distribution and coaxial cable for distribution in elevation. A radial line feed technique is preferred because it constitutes a light weight means of handling high power and because it allows the use of a high gain uniform distribution on transmit and a low sidelobe level when receiving. The transmit signal passes through the switch 57 (which serves the function of array switching and duplexing), into the port of the radial line corresponding to a uniform distribution in azimuth. After power distribution in the radial line, each output is sent through coaxial cable to an elevation feed and diode phase shifters to the radiating dipole elements.

On receive, the signal flow is reversed with the signal from the port of the radial power line divider corresponding to a uniform distribution passing through the high power switch/duplexer 57 to the receiver 58. Thus, the function performed by the switch/duplexer 57 is to selectively couple a transmit signal from a transmit input to any one of four array outputs or couple a receive signal from any of those array outputs to a receive output. This function can be performed by known switch and duplexer devices of the type described in Chapter 12 of *Radar Handbook*, M. I. Skolnik, McGraw-Hill (1970). However, a preferred switch/duplexer device 57 will be described in detail in connection with FIG. 5b. The transmitter 56 which supplies energy to the radiating dipoles via the switch 57 is preferably of a traveling wave tube (TWT) type particularly designed for low weight, small size, high efficiency and stability.

The receiver 58 is preferably of the coherent double-conversion type utilizing a high first IF stage and appropriate filtering to eliminate noise and ther interference at the image frequency. Typically, the input energy applied to the receiver is initially preamplified and then coupled into a first converter where the L-band signals are converted to a first IF frequency, e.g., 288 MHz. After amplification and filtering the first IF signals are sent to a second converter and heterodyned to a lower frequency, e.g., 32 MHz. This lower frequency video signal is then preferably applied to a pulse compression line filter to improve signal-to-noise ratio. The output of the receiver to the signal processor is a pair of MTI bipolar inphase (I) and quadrature (Q) video signals.

The exciter 54 provides the coded transmitter drive waveforms and clock reference signals as well as the local oscillator signals for the receiver, to thus provide fully coherent operation. The exciter comprises a highly stable phase locked circuit. Passive chirp generation, in conjunction with a frequency synthesizer, develops linearly "chirped" doppler waveforms. In this exemplary environment, thirty-two different transmit frequencies spaced at 5 MHz intervals are available, covering the full 150 MHz operating bandwidth.

The output of the receiver 58 is coupled to the radar signal processor 60 which will be discussed in greater detail in connection with FIG. 6. The signal processor 60 additionally receives information from a sidelobe (SLB) receiver 84, which is responsive to signal energy received by four sidelobe antennas 86 via a 1:4 switch 88, for sidelobe blanking, as will be discussed hereinafter in connection with the description of the signal processor 60. Each sidelobe blanking antenna preferably comprises a horizontal halfwave dipole in front of a ground plane. Since the sidelobe antennas are used only on receive, and blank only the azimuth sidelobes, they require very little gain. Each of the four sidelobe antennas is located immediately adjacent to one of the four primary radar antennas. The sidelobe receiver 84 is preferably similar to the primary radar receiver 58.

The signal processor 60 communicates bidirectionally with the radar control unit 40. As previously mentioned, the radar control unit 40 assembles beam return reports which it communicates to the digital computer system 34. In response to a radar control command received from the digital computer 34, the radar control unit operates, in a manner to be described in greater detail hereinafter, to control the signal processor, receiver, exciter transmitter, high and low power switches, duplexers and phase shifters to both transmit and receive.

Figure 5B:
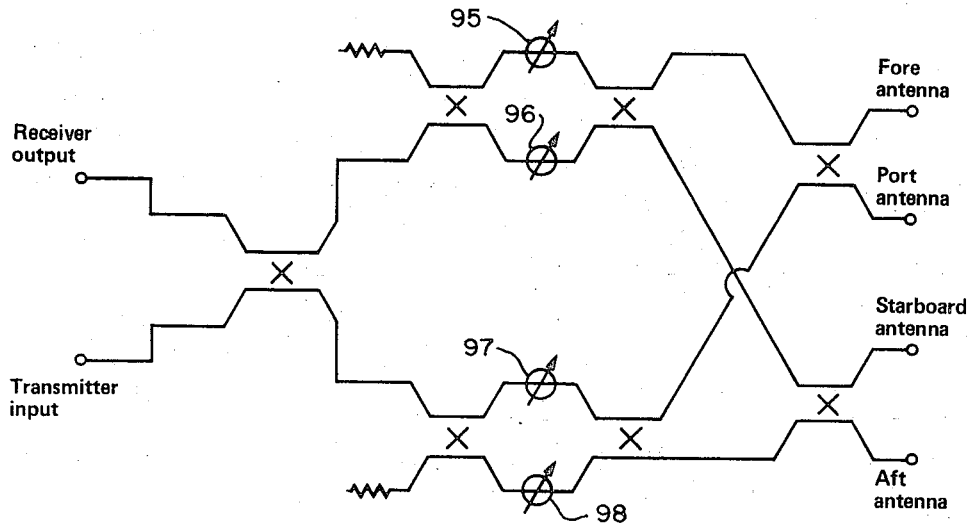
FIG. 5b is a schematic diagram illustrating the *high power switch/duplexer* of FIG. 5a in greater detail.

FIG. 5b — High Power Switch/Duplexer

The high power switch/duplexer 57 employs four single bit (0° to 180°) diode phase shifters 95, 96, 97, 98 in conjunction with a hybrid matrix power distribution network. By properly controlling the phase shifters, the full transmitter output power can be routed to any one of the four outputs of the hybrid matrix. On receive two of the phase shifter bits are reciprocated to direct the received power into the receive channel. The loss and isolation of the switch are primarily determined by the phase and amplitude control achieved and by the isolation of the hybrids. The time required to switch from one output port to a second (or from a transmit to receive) is 5 $\mu s$.

The phase shifters for the switch preferably consist of a 3-foot length of reduced height waveguide loaded at regular intervals by 18 pairs of diode switches mounted in stripline circuits. The loading of each diode is very light (approximately 5° of phase shift); hence the 36 diodes give 180° of phase shift.

Figure 6:
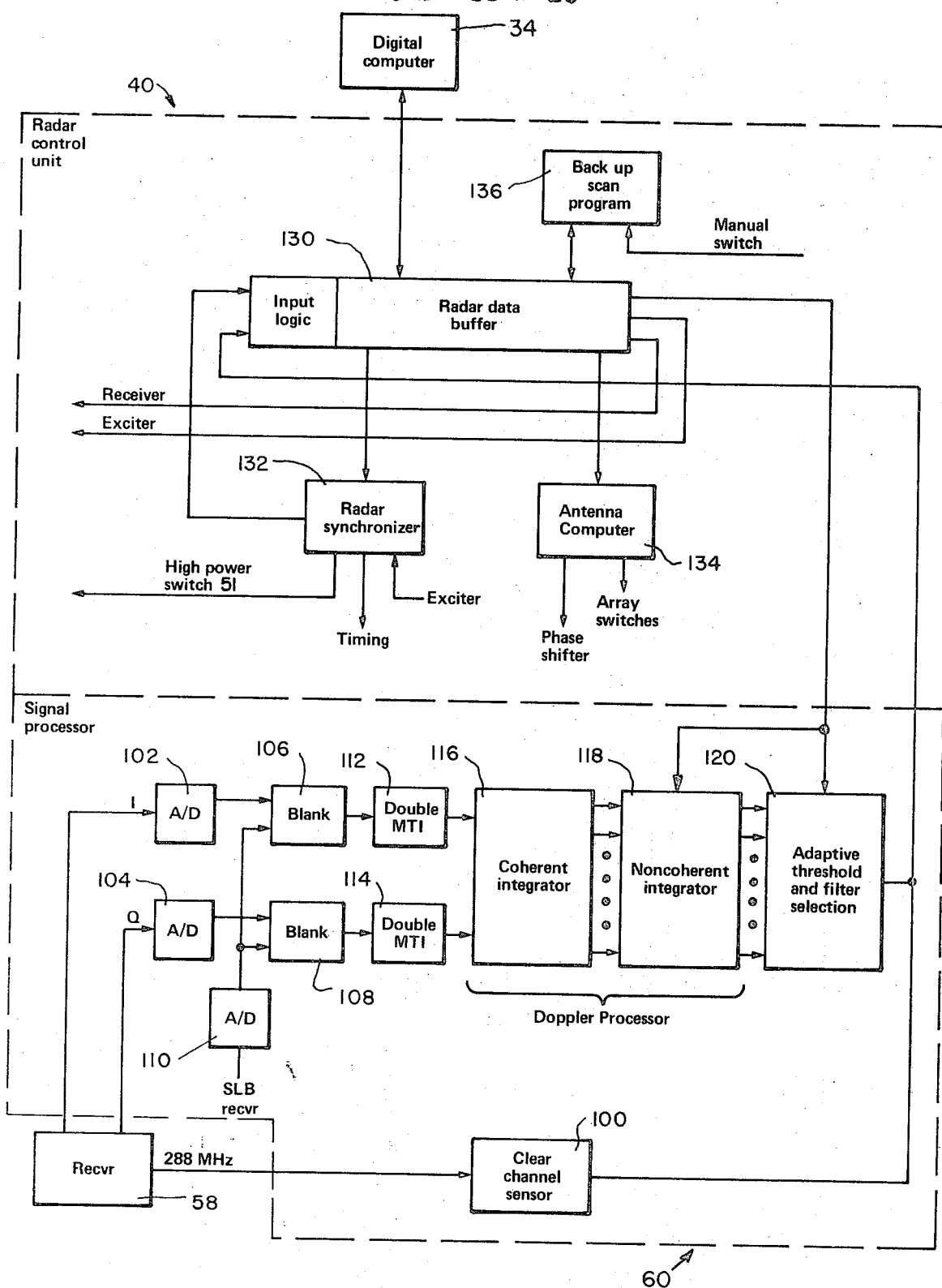

FIG. 6 — Signal Processor and Radar Control Unit

Attention is now called to FIG. 6 which illustrates a more detailed block diagram of the signal processor 60 and radar control unit 40 discussed in FIG. 5a. The signal processor 60 includes a clear channel sensor 100 which is responsive to the output of the first converter of the receiver 58 to provide a measurement of any noise, jamming signal or other interference being received through a selected antenna in a specified direction (azimuth) by detecting passively any electromagnetic energy received within the 150 MHz system bandwidth. More particularly, the clear channel sensor 100 uses the nominal channel output from one of the momentarily inactive but beam steered arrays 46, 48, 50 or 52 at a time $T_{ccs}$ (to be discussed hereinafter with reference to FIGS. 10a and 10c) immediately after the selection of the array and the setting of the phase shifters for that array and prior to dwell.

Briefly, the clear channel sensor 100 is preferably comprised of 32 5 MHz bandpass filters (not shown) each connected to receive the 288 MHz output from the first converter of the radar receiver 58, and each centered on a different one of thirty-two frequencies to be used to transmit radar beams. The frequencies are equally spaced between 1225 and 1375 MHz. The output of each filter is separately integrated in a lossy integrator to develop a time-average signal proportional to noise, jamming and other interference. Each time-average signal is then separately sampled and converted to digital form to provide a 3-bit number indicative of how clear the channel is, a binary number 000 indicating the clearest condition, and 111 indicating the worst condition.

Aside from the clear channel sensor 100, the remainder of the signal processor 60 is preferably implemented with digital techniques. All memory elements within the signal processor are preferably mechanized using metal oxide silicon (MOS) registers. Since random access of data is not necessary, recirculating shift registers can be utilized eliminating the requirement for an addressing function. Only clock signals are needed to sequentially control the input/output data flow.

The signal processor includes a pair of analog-to-digital converters 102 and 104 which quantize the in-phase and quadrature analog phase detected video returns into digital words (10 bits + sign). It is pointed out that this digital form is maintained throughout the signal processor, the advantage being that once the information is converted to digital form, the stringent stability requirements no longer apply and data need only be time coherent to the extent of the range resolution cell. Subsequent to conversion, the I and Q digital signals are respectively applied to sidelobe blanking (SLB) logic circuits 106 and 108. The output of the previously mentioned sidelobe blanking receiver 84 is applied to the SLB logic circuits 106 and 108 via an analog-to-digital converter 110. The blanking logic circuits 106 and 108 function to compare the sidelobe video signal from the receiver 84 with that of the main video signal from the receiver 58. Noise effects will appear in both the sidelobe and main video signals, and can therefore be eliminated by blanking the main video signal when the ratio of the sidelobe signal to the main video signal exceeds a given threshold. Consequently, the function of the blanking circuits 106 and 108 is to compare the ratio of the sidelobe and main video signals, and to blank the main video signal when the ratio therebetween exceeds a predetermined threshold.

The digital output signals from the SLB logic circuits 106 and 108 are applied to digital, double MTI cancelers 112 and 114, respectively, to provide "whitening" of the signals. These elements will be discussed in greater detail hereinafter in connection with FIG. 7. Suffice it to say at this time that the cancelers function to "whiten" the spectrum and reduce the dynamic range by cancelling main lobe clutter. The outputs of the cancelers 112 and 114 are applied to a doppler processor which provides further signal to clutter enhancement and signal-to-noise improvement. The doppler processor is comprised of a coherent integrator 116 including a bank of 13 digital doppler filters and a noncoherent integrator 118 which performs up to four summations. The doppler processor will be discussed in greater detail in connection with FIG. 8.

The output of the doppler processor is applied to an adaptive threshold and filter selection network 120. Briefly, the function of the network 120 is to compare each of the thirteen digital signals applied thereto from the dopplar processor against thirteen digital threshold values supplied to the network 120 by the radar control unit 40. The network 120 indicates those of the thirteen digital inputs that exceed their corresponding threshold value and, in addition, which of the thirteen inputs is largest.

The radar control unit 40 will be discussed in detail in the subsequent consideration of FIGS. 9–12. At this juncture, it is appropriate to point out that the radar control unit 40 is comprised of four major units including the radar data buffer 130, the radar synchronizer 132, the antenna phase computer 134 and the back up scan program unit 136.

As will be seen hereinafter, the function of the radar data buffer 130 is to control the transfer of data between the radar control unit and the digital computer system 34. That is, beam return reports assembled as a consequence of information provided by the signal processor 60 are assembled in the radar data buffer for transmission to the computer system 34. Further, the radar data buffer functions to store the radar control command provided to the radar control unit by the digital computer system 34.

The radar synchronizer 132 receives a stable reference signal from the previously mentioned exciter 54 and control information from the radar data buffer 130 to in turn develop timing signals necessary to control and synchronize operation of the various elements of the radar system. These timing signals are discussed hereinafter in connection with FIG. 10.

Figure 11:
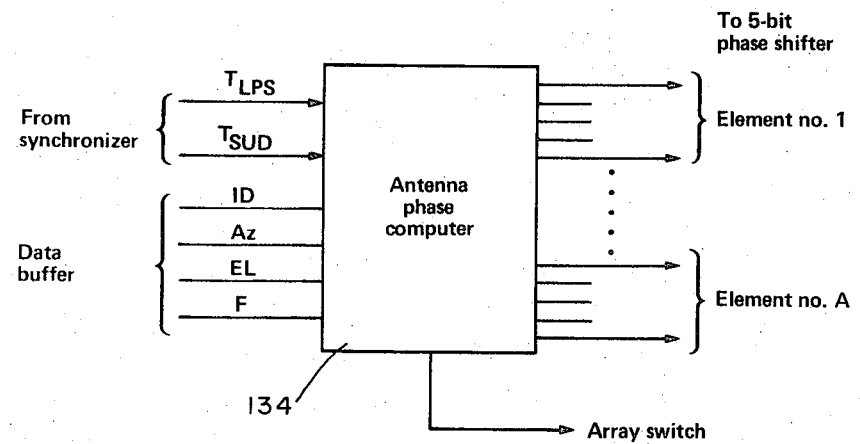
FIG. 11 is a block diagram of the *antenna phase computer* of the radar control unit of FIG. 6.

The antenna phase computer 134, to be discussed in connection with FIG. 11, provides phase calculations and the diode phase shifters $46_2 - 52_2$ to control the high power switch/duplexer 57 to control the transmission of the radar beam as dictated by the radar control commands stored in the radar data buffer.

Figure 7:
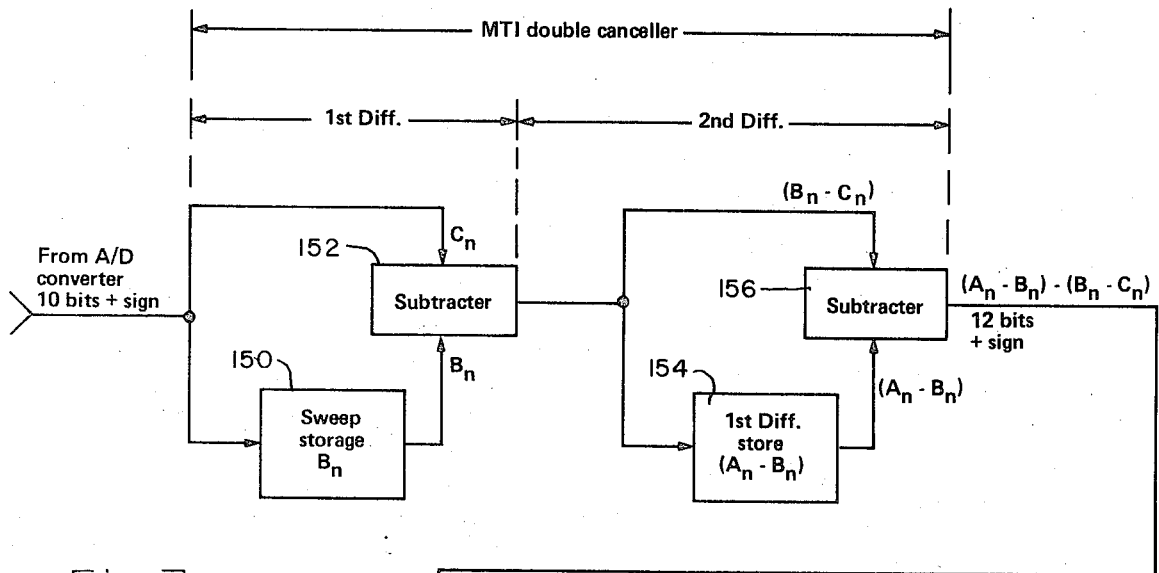
FIG. 7 is a block diagram of a *digital double MTI processor* utilized in the signal processor of FIG. 6.
Figure 7:
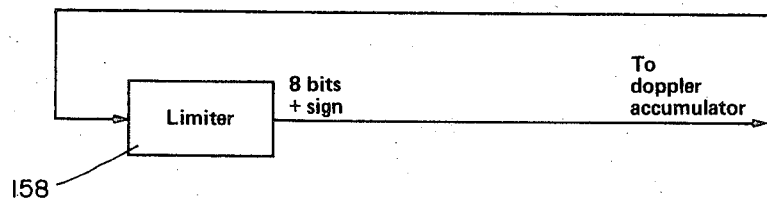

FIG. 7 — Double MTI Canceler

Attention is now directed to FIG. 7 which illustrates the details of one of the double MTI cancelers 112 or 114, previously discussed in connection with FIG. 6. Each double MTI canceler solves the equation $(A_n - B_n) - (B_n - C_n)$, where A, B, and C are correlated returns during successive range sweeps ($n$ is the corresponding range cell within a range sweep indicating correlation). In order to solve the foregoing equation, storage devices are required to accumulate data from previous range sweeps. Since access to the range cell data is required in sequence for cells 1, 2, 3 ... $n$ during subsequent range sweeps B and C. shift registers are employed for storage.

As shown in FIG. 7, the input to the double MTI canceler is an 11 bit word consisting of ten amplitude bits plus a sign bit. The operation of the double cancellation process is as follows. The sequential range cell data words from sweep A are clocked through a first sequential shift register memory 150 at a rate such that $A_1$ (range cell 1, transmission A) is at the output of the memory at the same time $B_1$ data is available at the input. The difference $A_n - B_n$ is formed at the output of subtracter 152 and shifted through a second memory 154, while the $B_n$ data is being shifted through the first memory 150 and subtracted from th $C_n$ data, providing the difference $B_n - C_n$ at the output of the first subtracter 152 to be subtracted in subtractor 156 from the difference $A_n - B_n$ being shifted through the second memory 154. The double MTI output is limited to eight bits plus sign by a limiter 158. Limiting is desirable since a large dynamic range is not required after clutter cancellation.

Figure 8:
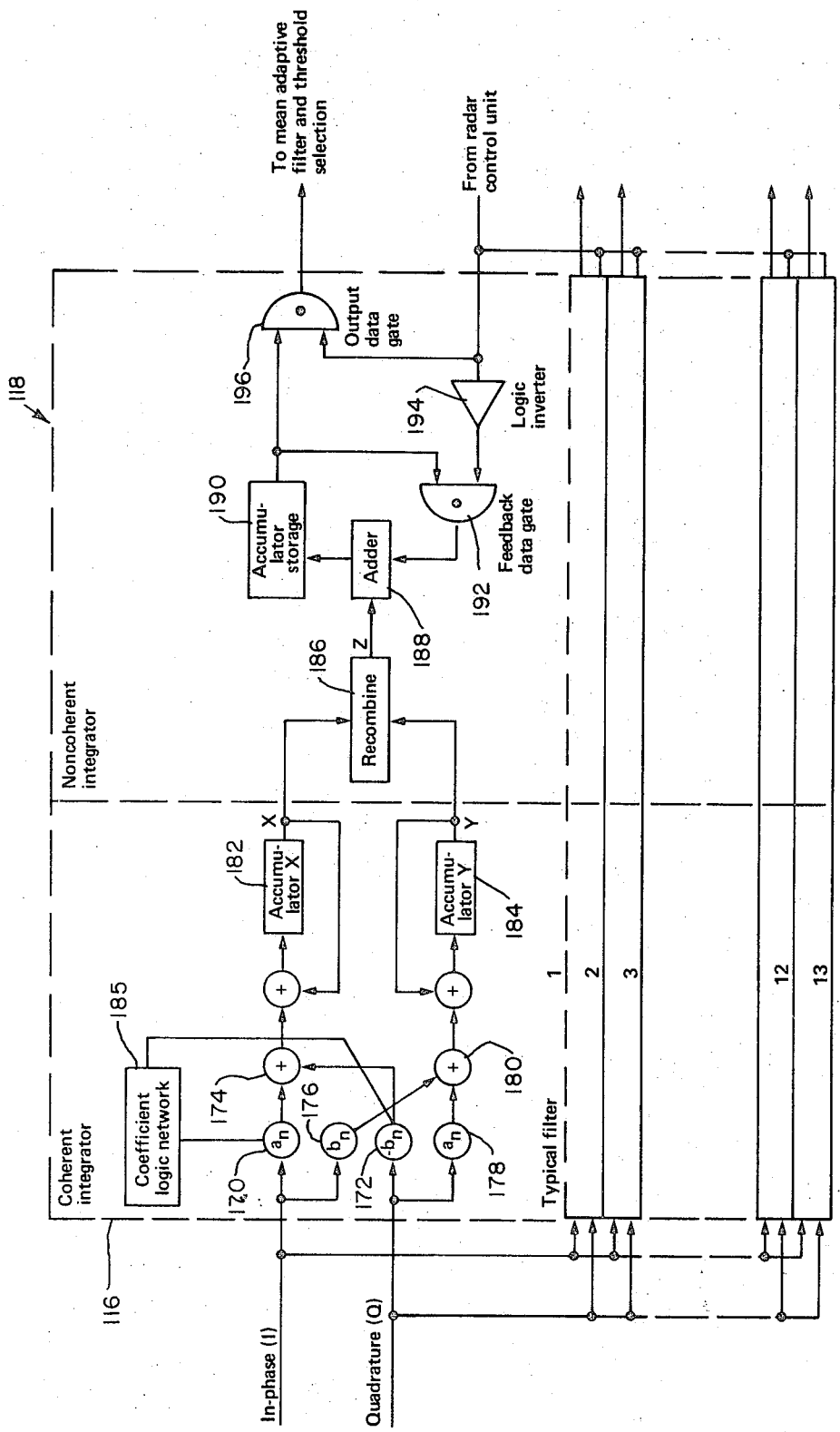
FIG. 8 is a block diagram of a *doppler processor* including the *coherent integrator and noncoherent integrator* utilized in the signal processor of FIG. 6.

FIG. 8 — Coherent Integrator and Noncoherent Integrator

Attention is now directed to FIG. 8 which illustrates a more detailed block diagram of the doppler processor mentioned in FIG. 6 as including a coherent integrator 116 and noncoherent integrator 118, both implemented with digital techniques. The function of the coherent and noncoherent integrators 116 and 118 is of course to isolate the doppler information associated with moving targets.

The coherent integrator 116 shown in FIG. 8 is comprised of a bank of complex digital filters each of which is supplied with the inphase ane quadrature digital outputs of the double MTI cancelers 112 and 114, respectively. The filters of the coherent integrator 116 are respectively centered at N (PRF)/16, where N is an integer, and each filter has a bandwidth of PRF/16. It then follows, of course, that the coherent integrator 116 would be comprised of 16 bandpass filters. However, as shown in FIG. 8, only the center 14 of the sixteen filters need be implemented since the edge filters are not useful because they would yield a relatively low signal-to-noise (S/N) enhancement ratio because of the main lobe clutter and low MTI gain at the extremities of the PRF interval. A further one of the fourteen filters, that located at the zero doppler position, can also be deleted because, as will be seen hereinafter, a ground doppler offset value, $\Delta F_{GDO}$, provided by the computer as part of the radar control command is used by the receiver local oscillator to effectively always null what would be the output of that deleted filter.

Each of the thirteen complex filters uses both inphase and quadrature components of the received signal and operates by multiplying each of the 5,000 successive orthogonal input samples of a given sweep (PRF interval) at a 4 MHz rate of the projected components of a rotating unit vector, $a_n$ and $b_n$ on the real and imaginary axes. The coefficients $a_n$, $b_n$ change from filter to filter and sweep to sweep. The quantity $a_nI$ developed by multiplier 170 is summed with the quantity $-b_nQ$ developed by multiplier 172 in summing network 174. Similarly, the quantity $b_nI$ developed by multiplier 176 and the quantity $a_nQ$ developed by multiplier 178 is summed by network 180. The outputs $a_nI - b_nQ$ and $a_nQ + b_nI$ constitute orthogonal components $x$ and $y$ of a complex, bandpass filter output. Each of these components is summed and stored in shift registers, 182 and 184, respectively, with samples of previous sweeps until the completion of sixteen sweeps. In that manner the radar signal received is filtered and integrated in each of thirteen different bandpass channels to develop, when recombined into a vector signal Z in digital form, and signal proportional to the frequency content of the doppler shifted radar signal received in a particular frequency band.

After sixteen sweeps, corresponding to the waveform dwell, the accumulated orthogonal components X and Y are recombined into a single channel by a recombination network 186 hardwired to form the sum $Z = X + kY$. The output Z represents an approximation of the signal vector which is then submitted to noncoherent integration. At this point, the filter registers in the coherent integrator 116 are cleared for the first sweep of the next waveform dwell.

Since the input signal to the filter registers in the coherent integrator has a dynamic range of 8 bits, the shift registers within the filters should be designed for a dynamic range of 12 bits in order to accommodate signal gain through the filters. While truncation of the signals by dropping least significant bits may be implemented at various stages in the doppler processor to minimize hardware, a minimum of three levels per RMS noise voltage should be maintained in order to prevent adverse effects on noise statistics. A nearly exact representation of the filter coefficients $a_n$ and $b_n$ is possible by the use of read only memories. Consequently, filter implementation is extremely flexible and can readily provide for a variety of filter characteristics by means of different sets of coefficients $a_n$, $b_n$ which are stored in a coefficient logic network 185 which includes a look-up table addressed by the sequence number of the pulse in the burst since the coefficients are dependent upon whether the pulse is the 1st, 2nd, . . . or 16th in the burst sequence.

The noncoherent integrator 118 performs a summing operation on a dwell to dwell basis for each of the thirteen coherent integrator filters. Since quadrature recombination performed in network 186 constitutes envelope detection, the effects of a summation is noncoherent video integration. The noncoherent integrator is designed to sum up to four sixteen data pulse groups, the number of such groups being controlled by the radar control unit in response to a burst number B contained in the radar control command.

The operation of the noncoherent integrator 118 is essentially that of a summer (adder 188 and accumulated storage registers 190). Each of the thirteen registers 190 in the noncoherent integrator 118 contains 5,000 range cells. In operation, the data is acquired by the noncoherent integrator 118 from the coherent integrator 116, and added sweep by sweep for each range cell to existing data which arrives via the feedback data gate 192. When the predetermined number of integrations have been performed (up to 4) as defined by the radar control unit, the radar control unit inhibits the feedback data gate 192 via the logic inverter gate 194 and enables the output data gate 196 which interfaces with the adaptive threshold circuits 120 of FIG. 4. During this time the feedback data gate yields zero output and allows entry of the first dwell of data of the next processing. Because of the sixteen pulse integrations performed by the coherent integrator, the operating speed of the noncoherent integrator is only 250 KHz.

Figure 9A:
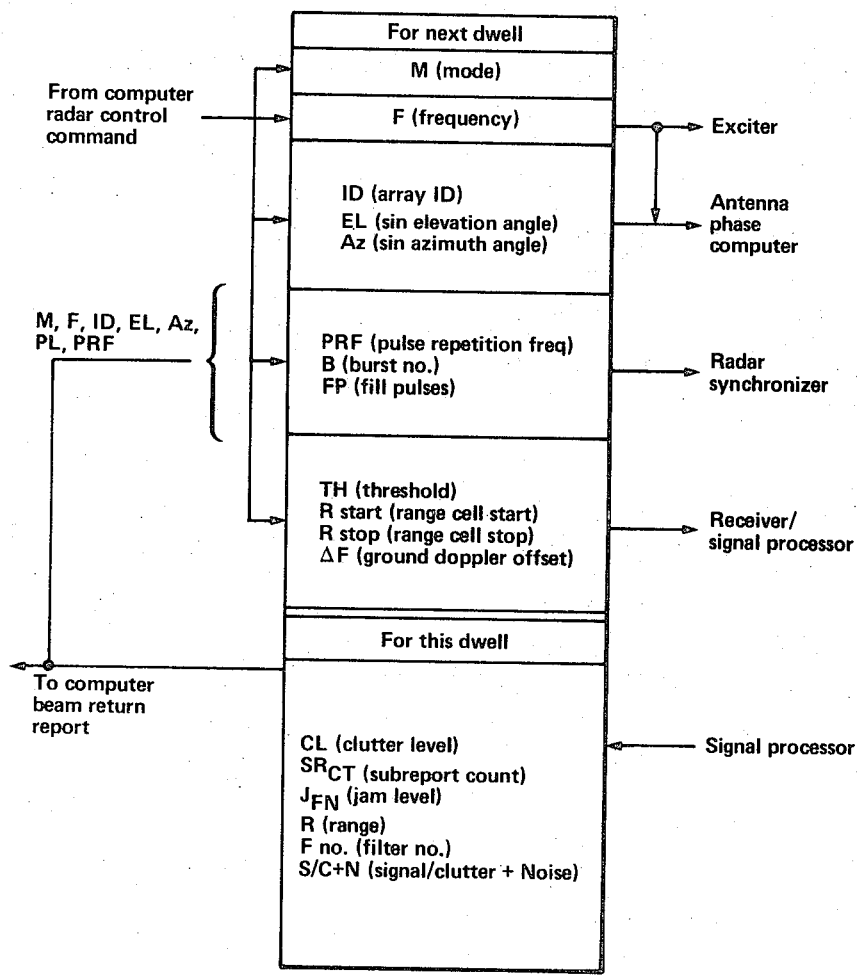
FIG. 9a is a representative diagram of a storage page in the *radar data buffer* of the radar control unit of FIG. 6 listing the items of information contained within a radar control command and a beam return report.

FIG. 9a — Radar Data Buffer
FIG. 9b — Radar Control Comman Format
FIG. 9c — Beam Return Report Format Reference was previously made in connection with FIG. 6 to the radar data buffer 130 which constitutes part of the radar control unit 40. The radar data buffer comprises a digital memory capable of storing radar control commands supplied thereto from the digital computer 34 and beam return reports supplied thereto by the signal processor 60 for subsequent transmittal to the digital computer 34.

The radar data buffer contains two "pages" of storage, each page having the capacity to store the information in the single page depicted in FIG. 9a. Radar control commands are loaded into the two pages alternately from the digital computer 34. While one page is being loaded, the control command in the other page is controlling the beam being fired with that other page also acting to store the beam return report being assembled.

Considering first the radar control command, attention is called to FIGS. 9a and 9b. As noted, FIG. 9a illustrates the information contained within a typical data buffer page. FIG. 9b illustrates the format of a radar control command, assuming an 18 bit word length, characteristic of the preferred computer system embodiment to be discussed hereinafter.

As shown in FIG. 9b, a typical radar control command is comprised of six 18-bit words. In accordance with the exemplary bit allocation represented in FIG. 9b, the respective fields have the following significance:

word 0: bits 1 and 2 are used to identify a particular one of the four antenna arrays;
word 0: bits 3-5 are used to identify a beam mode, i.e., where the beam to be fired is being used for search or track purposes, for example;
word 0: bits 6-17 are used to define the sine of the azimuth angle relative to broadside, at which a beam is to be fired;
word 1: bits 1-5 are used to define the frequency of the pulses to be fired;
word 1: bits 6-17 are used to identify the sine of the elevation angle with respect to broadside, at which a beam is to be fired;
word 2: bits 0-5 are used to define a threshold value which is used by the radar control unit to set the threshold of the adaptive threshold network 120 of FIG. 6;
word 2: bits 6-17 are used to define the value $\Delta F_{GDO}$ which represents the ground doppler offset and is effectively that value which compensates for the motion of the airborne platform relative to the ground;
word 3: bits 3-4 are used to define a burst number, which as will be seen hereinafter, is employed by the radar control unit to control the number of data pulse groups fired during each dwell;
word 3: bits 5-17 are used to define a range start cell;

word 4: bits 5-17 are used to define a range stop cell, the range start and stop cells defining a range window or time interval during which the radar is responsive to return beams;
word 5: bits 2-5 are used to define the number of fill pulses in the beam to be fired (to be discussed in more detail hereinafter in connection with FIG. 10b); and
word 5: bits 6-17 are used to define the PRF (pulse repetition frequency) of the beam to be fired.

FIG. 9a illustrates a typical page of the radar data buffer and shows where each of the fields of the radar control command is routed. Thus, the frequency field of the radar control command (word 1, bits 1-5) is used by the exciter 54 (FIG. 4) and the antenna phase computer 134 (FIG. 6) and the signal processor 60 (FIG. 6). The array ID, the elevation, and the azimuth information fields are all routed to the antenna phase computer. The PRF, burst number, and fill-pulse fields are all routed to the radar synchronizer 132 (FIG. 6) to be discussed in greater detail hereinafter in connection with FIG. 10b. The threshold, R-start, R-stop, and $\Delta F_{GDO}$ fields are all routed to the receiver 58 and signal processor 60 (FIG. 6). The information so routed to the various elements of the radar system determine the characteristics of the beam to be fired and in addition set up the receiver and signal processor to enable them to interpret the return beam.

Attention is now called to FIG. 9c which illustrates the format of a typical beam return report communicated from the radar control unit 40 to the digital computer 34 (FIG. 4). Again, the format in FIG. 9c assumes an 18-bit digital word. As shown, each report is comprised of a header portion which includes nine words and a report portion which includes two words for each target reported. That is, only one nine word header is reported back to the digital computer per beam dwell.

For each target return corresponding to that dwell, and meeting certain criteria entered into the receiver and signal processor as a consequence of the radar control command, a two word subreport is assembled that is part of the beam return report.

The beam return report header includes several items of information supplied to the radar data buffer 130 (FIG. 6) by the radar control command. With respect to these items, the radar data buffer is merely returning to the computer that which the computer defined in the radar control command. These items of information and their field location in the beam return report header as shown in FIG. 9c are as follows:

word 0: bits 1-5 are used to define frequency;
word 0: bits 6-17 are used to define the sine of the azimuth angle;
word 1: bits 6-17 are used to define the sine of the elevation angle;
word 2: bits 7 and 8 are used to identify the array;
word 2: bits 15-17 are used to define the mode; and word 8: bits 6-17 are used to define PRF.

In addition to the foregoing items of information entered into the radar data buffer 130 in response to a radar control command, and thereafter merely returned to the computer as part of a beam return report, the header contains the following items of information:

word 1: bits 1-5 are used to define clutter level;
word 2: bits 9-14 are used to identify the number of subreports, i.e., the number of detected targets, which are being reported following the particular header, it being recalled that each of the subreports contains two 18-bit words;
words 3-7: bits 0-17; and
word 8: bits 0-5 are used to define a 3-bit (8 level) jam number with respect to each of the thirty-two transmit frequencies.

Each two word subreport contains the following information fields:

word 0: bits 5-17 are used to define a range which may be ambiguous;
word 1: bits 1-4 are used to represent the signal to clutter plus noise ratio;
word 1: bits 5-13 are used to define the amplitude of the returned signal; and
word 1: bits 14-17 are utilized to define the filter number of the largest return signal which of course indicates the doppler frequency, where the filters are numbered successively in order of increasing doppler frequency.

As shown in FIG. 9a, this information is entered into the radar data buffer from the signal processor.

In addition to the radar control command supplied from the computer to the radar data buffer and the beam return report supplied from the radar data buffer to the computer, timing signals are also communicated therebetween. Thus, a timing signal $T_{BL}$ is communicated from the computer to the radar data buffer to signal completion of the loading of a radar control command into the buffer. On the other hand, timing signals in the form of an interrupt to the computer are provided by the radar data buffer as follows:

$T_{LPS}$ which advises the computer that the data buffer can accept new data from the computer; and $T_{DA}$ which signals the computer that data is available in the radar data buffer for communication to the computer.

These timing signals will be discussed in greater detail hereinafter with reference to FIGS. 10a, 10b and 10c.

Figure 10A:
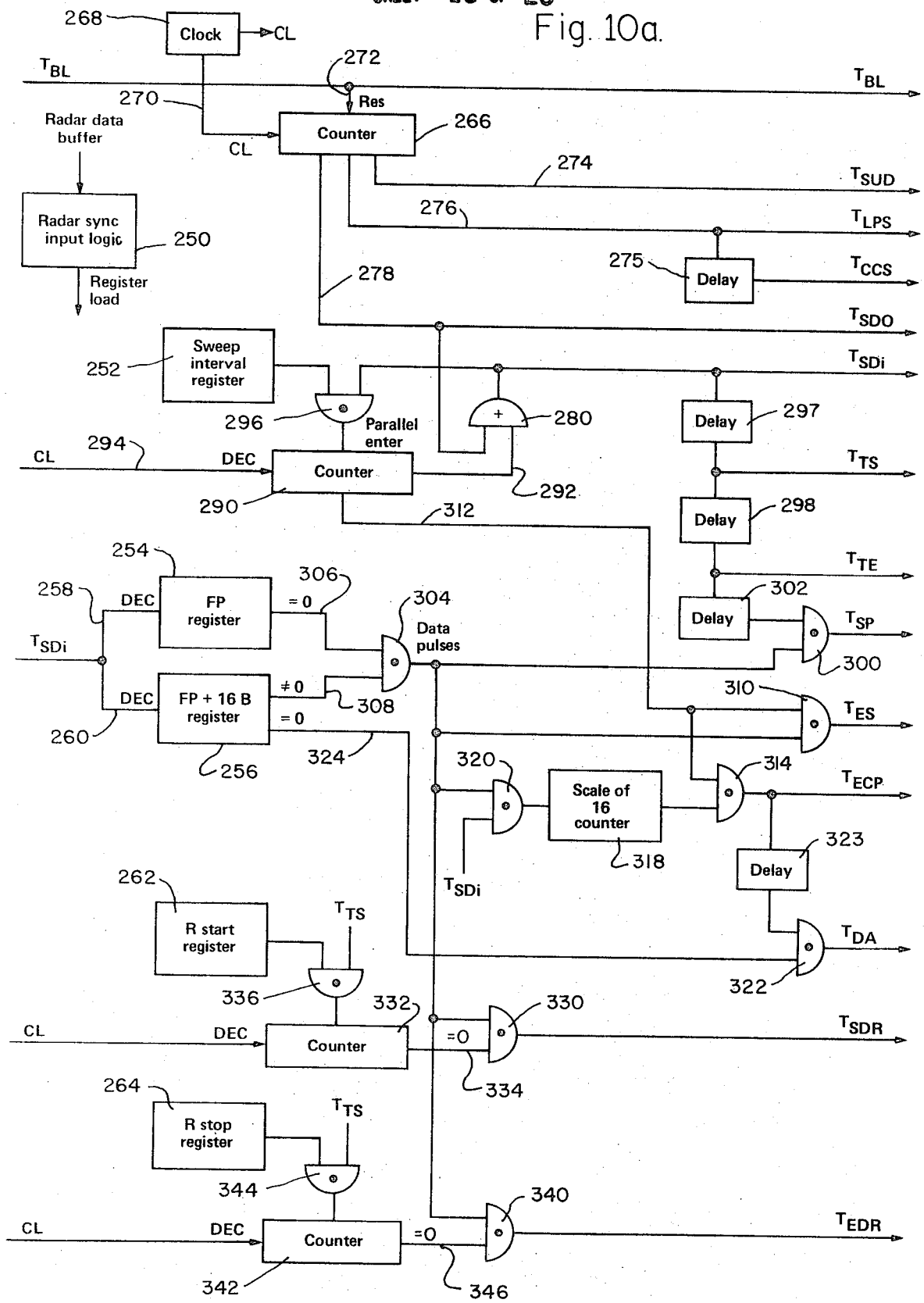
FIG. 10a is a block diagram of the *radar synchronizer* of the radar control unit of FIG. 6.
Figure 10B:
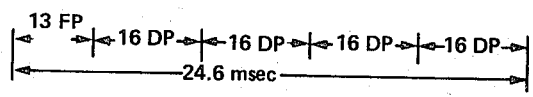
FIG. 10b is a *beam timing and format diagram* illustrating the dwells associated with a typical search beam and a typical track beam.
Figure 10B:
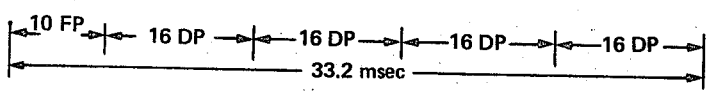
Figure 10B:
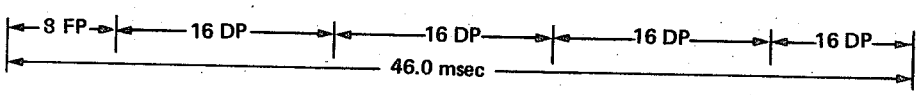
Figure 10B:
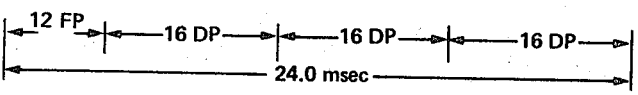
Figure 10B:
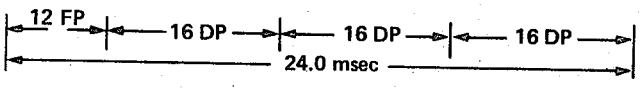
Figure 10C:
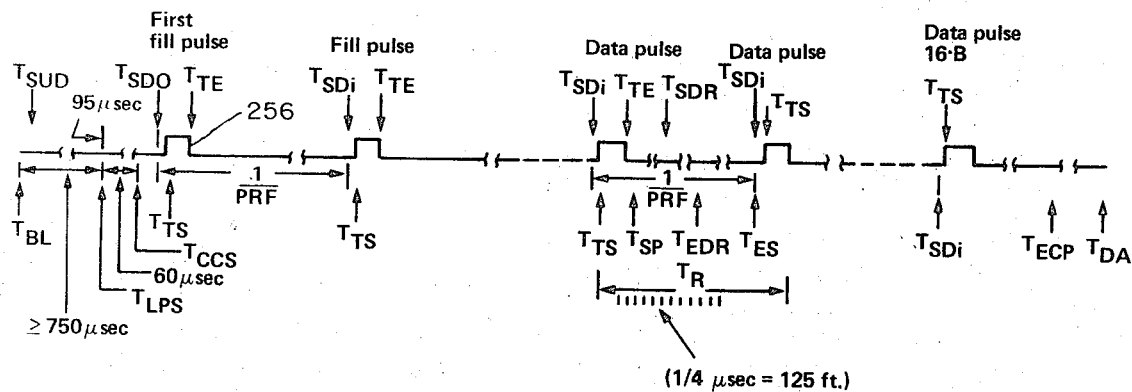
FIG. 10c is a *pulse timing diagram* illustrating the timing signals associated with each transmitted fill pulse and data pulse.

FIG. 10a — Radar Synchronizer
FIG. 10b — Beam and Timing Format Diagram
FIG. 10c — Pulse Timing Diagram Attention is now called to FIG. 10a which illustrates a block diagram of the radar synchronizer 132 previously referred to in connection with FIG. 6. The radar synchronizer 132 comprises registers, counters, and simple logic circuits which operate in response to applied input information to produce output timing signals, as will be discussed in greater detail hereinafter. The items of input information applied to the radar synchronizer input logic 250 from the radar data buffer consist of the pulse repetition frequency, (PRF), burst number, B, and fill pulse number, F.P. In addition, a timing signal $T_{BL}$ generated by the computer to represent that the buffer has been loaded is also applied to the radar synchronizer 132. In response to these input signals, the radar synchronizer 132 gates out the output timing signals illustrated in FIG. 10a which are then routed throughout the system as will be discussed hereinafter. Prior to considering the various timing signals, however, attention is called to FIG. 10b which illustrates the beam and timing format of a typical search beam and a typical track beam.

In the search mode, search beams are fired from the four antenna arrays at a plurality of different azimuth angles. It has previously been assumed herein that there exists 92 azimuth positions throughout the 360° at which search beams are to be fired. The typical search beam fired at any of these ninety-two positions is represented in FIG. 10b and can be seen to consist of three distinct dwells. A first dwell is indicated as consisting of 77 pulses at a pulse repetition frequency of 3125 pulses per second. The econd dwell is illustrated as consisting of 74 pulses at a PRF of 2232 pulses per second. The third dwell in the typical search beam illustrated is shown to consist of 72 pulses at a PRF of 1562 pulses per second. Multiple PRF's are employed in the search beam in order to maximize doppler and range visibility. The use of multiple PRF's is discussed at page 129 of *Introduction to Radar Systems*, McGraw-Hill Book Co. (1962) by Merrill I. Skolnik.

Each search beam dwell consists of a number of fill pulses followed by four groups of sixteen data pulses each. Fill pulses are fired prior to the data pulses in order to assure that the same clutter pattern is seen for each data pulse. That is, in order to better enable the signal processor 60 to isolate a return pulse from the clutter, it is advantageous that all of the return pulses be superimposed on the same clutter pattern. This is assured by generating a sufficient number of fill pulses prior to the data pulses. The number of fill pulses required is dependent on the system range and the pulse repetition frequency being used and can be determined by the computer 34 by use of a simple table look-up routine. The number of fill pulses for each dwell is indicated as part of the radar control command. As shown in FIG. 10b, the higher the pulse repetition frequency, the greater the number of fill pulses required. Thus, for PRF's of 3125, 2232 and 1562 pulses per second, 13, 10 and 8 fill pulses are acquired, respectively. The total duration of each of the search beam dwells is approximately 24.6 m sec, 33.2 m sec, and 46.0 m sec, respectively.

Also shown in FIG. 10b is a typical track beam consisting of two identical dwells (identical as to pulse configuration and PRF). As will be discussed hereinafter, they differ only in that they are offset from a defined azimuth angle Z so that the first track beam dwell is fired at an azimuth angle $Z - \Delta Z$ and the second track beam dwell is fired at an azimuth angle $Z + \Delta Z$. This technique is referred to as sequential lobing and is referred to on page 165 of *Introduction to Radar Systems*, supra. Each of the track beam dwells consists of a group of twelve fill pulses plus three groups of sixteen target data pulses. The number of groups of data pulses is defined by the burst number (B) field of a radar control command and, as represented in FIG. 9b, can comprise anywhere from one to four groups in accordance with the preferred embodiments of the invention.

Attention is now called to FIG. 10c which illustrates the timing signals generated in association with the fill and data pulses of a dwell, regardless of whether the dwell is part of a search or a track beam. The timing signals and their significance are as follows:

$T_{BL}$ — As has been previously pointed out, the timing signal $T_{BL}$ is provided to the radar synchronizer 132 from the digital computer 32 to indicate that the buffer 130 has been loaded and that the information therein can now be used to energize the arrays to fire a beam. $T_{BL}$ occurs only once per dwell, prior to the first fill pulse.

$T_{SUD}$ — A timing signal $T_{SUD}$ occurs in response to and shortly after the timing signal $T_{BL}$ and initiates an interval during which several operations are performed to set up for the ensuing dwell: specifically, azimuth and elevation calculations are performed in the antenna phase computer to point the beam; gate selections within the radar synchronizer are made to set up the appropriate PRF, burst number, number of fill pulses; the exciter 54 is set up in accordance with the frequency specified in the buffer; and a threshold specified by the radar control command is entered into the adaptive threshold network 120 of the signal processor 60. $T_{SUD}$ occurs only once per dwell, prior to the first fill pulse, and is coupled to the antenna phase computer 134, exciter 54, receiver 58 and signal processor 60.

$T_{LPS}$ — The timing signal $T_{LPS}$ occurs approximately 250 microseconds after the timing signal $T_{SUD}$ and is coupled to the antenna phase computer 134, exciter 54, receiver 58, signal processor 60 and backup scan programmer 136. In response to the timing signal $T_{LPS}$, the phase shifters $46_2$, $48_2$, $50_2$, $52_2$ (FIG. 5a) are loaded and the high power switch 57 is operated, all in accordance with the calculations of the antenna phase computer 134. Additionally, the buffer 130 is cleared for new data and the logic for PRF, burst number, and fill pulse number within the radar synchronizer, frequency within the exciter, and threshold within the adaptive threshold network, are enabled in accordance with the calculations performed during the interval initiated by the timing signal $T_{SUD}$. Approximately 95 microseconds after the generation of the timing signal $T_{LPS}$, the first fill pulse 256 is generated. It will be assumed herein that the duration of each fill pulse and each data pulse is 31 microseconds. However, the rate of which these pulses are generated, i.e., the space between successive fill pulses and data pulses is determined by the PRF specified.

$T_{CCS}$ — The timing signal $T_{CCS}$ occurs approximately 60 microseconds after the timing signal $T_{LPS}$. This signal is used to initiate the clear channel sensor 100 in the signal processor. The $T_{SD0}$ signal described hereinafter is used to complete the clear channel sensing process and to transfer the clear channel sensor data to the radar data buffer.

The aforementioned timing signals $T_{BL}$, $T_{SUD}$, $T_{LPS}$, and $T_{CCS}$ are generated only once per dwell, prior to the first fill pulse. The following timing signals are associated with the generation of each and every pulse, regardless of whether the pulse constitutes a fill pulse or a data pulse:

$T_{SDi}$ — The timing signal $T_{SDi}$ for the first fill pulse, i.e., $T_{SD0}$, where $i = 0$, occurs approximately 95 microseconds after the timing signal $T_{LPS}$. For all subsequent pulses, the timing signal $T_{SDi}$ occurs $[(1/PRF) - 5]$ microseconds after the timing signal $T_{TS}$. The timing signal $T_{SDi}$ functions to switch the high power switch/duplexer from receive to transmit, and to stop range counting.

$T_{TS}$ — Each timing signal $T_{TS}$ is generated 5 microseconds after each timing signal $T_{SDi}$ and is coupled to the exciter 54 to initiate the transmission of a pulse.

$T_R$ — Range timing signals $T_R$ are generated at quarter microsecond intervals, each interval representing 125 feet of range, beginning one quarter microsecond after the timing signal $T_{TS}$.

$T_{TE}$ — The timing signal $T_{TE}$ occurs 31 microseconds after the timing signal $T_{TS}$ and functions to end transmission and switch the duplexer from transmit to receive. $T_{TE}$ is coupled to the duplexers and exciter 54.

The following timing signals also shown in FIG. 10c are uniquely associated with each of the data pulses:

$T_{SP}$ — The timing signal $T_{SP}$ occurs 5 microseconds after the timing signal $T_{TE}$ and is coupled to the signal processor 60 to start data collection in the coherent integrator 116.

$T_{SDR}$ — The timing signal $T_{SDR}$ occurs at a time determined by the R-start information contained within the radar control command and is coupled to the signal processor 60 to initiate range gating.

$T_{EDR}$ — The timing signal $T_{EDR}$ occurs at a time defined by the R-stop information in the radar control command and is coupled to the signal processor 60 to end the range data collection interval, i.e., to terminate range gating.

$T_{ES}$ — The timing signal $T_{ES}$ occurs coincident with the timing signal $T_{SDi}$ during data pulse intervals and is coupled to receiver 58 and signal processor 60 to define the end of a data collection interval for a pulse.

The following timing signal also shown in FIG. 10c is uniquely associated with the last data pulse in each group of sixteen data pulses:

$T_{ECP}$ — A timing signal $T_{ECP}$ occurs at the same time as the previously mentioned timing signal $T_{ES}$ but whereas $T_{ES}$ occurs for each data pulse, $T_{ECP}$ occurs only every sixteenth data pulse. $T_{ECP}$ is coupled to signal processor 60 to end coherent processing and shift data from the coherent integrator 116 to the noncoherent integrator 118 and to clear the coherent integrator 116.

The following timing signal, also shown in FIG. 10c is uniquely associated with the sixteenth data pulse in the last data pulse group (B):

$T_{DA}$ — The timing signal $T_{DA}$ occurs a fixed time after $T_{ECP}$ associated with the last data pulse in a dwell. $T_{DA}$ is coupled to the signal processor 60 and the radar data buffer 130 to shift data out of the noncoherent integrator 118 to the radar data buffer and to clear the noncoherent integrator.

From the foregoing discussion of the timing signals, it should be apparent that the entire sequence of timing signals supplied by the radar synchronizer is initiated in response to the timing signal $T_{BL}$ supplied by the computer. Of course, one timing signal $T_{BL}$ is supplied by the computer for each dwell since each dwell requires that the computer supply the radar data buffer with a new radar control command. For a search beam, the timing signal $T_{SDR}$ coincides with $T_{SP}$ and the timing signal $T_{EDR}$ coincides with $T_{ES}$. For track, $T_{SDR}$ and $T_{EDR}$ are set in accordance with the R-start and R-stop fields of the radar control command.

Attention is now again specifically directed to FIG. 10a which illustrates a block diagram of the radar synchronizer 132 for generating each of the timing signals illustrated in FIG. 10c. The radar synchronizer includes an input logic circuit 250 which is responsive to the radar control command (FIGS. 9a and 9b) to load various registers contained within the radar synchronizer.

The radar synchronizer contains a sweep interval register 252 which is used to store a count representing the interval (1/PRF) between successive pulses. Register 252 is loaded by the input logic circuit 250 in response to the PRF indicated in the radar control command. The count loaded into the register 252 is preferably expressed in terms of a number of range timing signals $T_R$, i.e., in terms of ¼ microsecond intervals. By way of example, for a PRF equal to 2500 PPS, 1/PRF = 400 microseconds meaning that a count of 1600 would be stored in the sweep interval register 252.

The radar synchronizer contains a second register 254 which is loaded by the input logic circuit 250 with the number of fill pulses specified by the radar control command. Register 256 is loaded with a count equal to the total number of pulses (i.e., fill pulses plus data pulses = FP + 16·B) in the dwell defined by the radar control command. Registers 254 and 256 are implemented as decrementing counters having decrementing input terminals 258 and 260, to be discussed hereinafter.

The radar synchronizer also includes a register 262 which is loaded by the input logic circuit 250 with the number of the $R_{start}$ cell. Register 264 is loaded with the number of the $R_{stop}$ cell.

In addition to the aforementioned registers 252, 254, 256, 262 and 264, which are loaded by the input logic circuit 250, the radar synchronizer includes a plurality of binary counters. More particularly, a counter 266 is provided which is used to count clock pulses supplied at ¼ microseconds intervals by clock pulse source 268. The reset input terminal 272 is connected to receive the timing signal $T_{BL}$ from the computer. Thus, $T_{BL}$ resets the counter 266 to zero and thereafter counter 266 counts the clock pulses generated by source 268 throughout the entire dwell. Counter 266 has a plurality of output terminals which provide output signals in response to particular counts defined therein. Thus, the signal $T_{SUD}$ is provided on counter output terminal 274 a short fixed time interval after the signal $T_{BL}$. The timing signal $T_{LPS}$ is provided on output terminal 276, 250 microseconds after the occurrence of $T_{BL}$. Output terminal 278 provides the signal $T_{SDO}$ 95 microseconds after the occurrence of $T_{LPS}$. The timing signal $T_{SDO}$ is applied to the intput of an OR gate 280 whose output is connected to provide the signal $T_{SDi}$. It will be recalled that the timing signal $T_{SDO}$ occurs prior to the first fill pulse in each dwell. Thereafter, the timing signal $T_{SDi}$ occurs prior to each of the other fill and data pulses in the dwell. All $T_{SDi}$ pulses subsequent to $T_{SDO}$ are produced by counter 290 on output terminal 292 connected to the input of OR gate 280. More particularly, counter 290 is a decrementing binary counter having a decrementing input terminal 294. The output of clock pulse source 268 is connected to decrementing input terminal 294. Counter 290 is loaded from register 252 by an AND gate 296 which is enabled by the output of OR gate 280. Thus, upon the occurrence of any timing signal $T_{SDi}$ (including $T_{SDO}$) a count representing the duration of a sweep interval will be entered into the counter 290. This count will then be decremented toward zero in response to pulses provided by clock source 268. When the count in counter 290 reaches zero, output terminal 292 will become true to thereby enable OR gate 280 and produce a timing signal $T_{SDi}$ which reloads counter 290 from register 252.

Timing signal $T_{TS}$ is produced in response to $T_{SDi}$ after a 5 microsecond delay introduced by delay means 296. Timing signal $T_{TE}$ is produced in response to $T_{TS}$ after a 31 microsecond delay introduced by delay means 296. Timing signal $T_{SP}$ is produced by AND gate 300 only during data pulse intervals in response to $T_{TE}$ after a 5 microsecond delay introduced by delay means 302. AND gate 300 is enabled by the output of AND gate 304 only during a data pulse interval.

It has been previously mentioned that the registers 254 and 256 are each decrementing counters. Register 254 is initially loaded with the number of fill pulses in a dwell and register 256 is loaded with the total number (i.e., fill pulse data) of pulses in a dwell. Both registers 254 and 256 are decremented in response to $T_{SDi}$. After the count in register 254 equals zero, the non zero count in register 256 will indicate data pulse intervals. Register 254 is provided with an output terminal 306 which goes true when the count in register 254 equals zero. Register 256 is provided with an output terminal 308 which is true for so long as the count in register 256 is not zero. Thus, AND gate 304 will be enabled after all of the fill pulse intervals and during the data pulse intervals. As previously mentioned, the output of AND gate 304 enables AND gate 300 to generate the timing signal $T_{SP}$ during data pulse intervals. It similarly enables AND gate 310 during data pulse intervals to generate the timing signal $T_{ES}$ 5 microseconds prior to the end of a pulse interval as defined by counter 290 on output terminal 312.

The signal $T_{ECP}$ occurs concurrently with the signal $T_{ES}$ but only on the sixteenth data pulse of each data pulse group. Thus, the output terminal 312 connected to the input of gate 310 is also applied to the input of AND gate 314. Gate 314 is enabled on every sixteenth data pulse by the output of a scale of 16 counter 318.

The scale of 16 counter is incremented by the output of AND gate 320 in response to the timing signals $T_{SCi}$ during data pulse intervals.

The timing signal $T_{DA}$ is developed by the AND gate 322 which is enabled during the last data pulse interval of a dwell as indicated by the output terminal 324 of register 256 becoming true. Terminal 324 goes true when the counter register 256 has been decremented to zero. When enabled, gate 322 will output the signal $T_{DA}$ a fixed time delay (introduced by delay means 323) after the signal $T_{ECP}$.

The timing signal $T_{SDR}$ is developed by the AND gate 330 only during data pulse intervals as defined by the output of gate 304. Timing signal $T_{SDR}$ will be generated when the output of decrementing counter 332 reaches zero thereby causing its output terminal 334 to become true. Counter 332 is loaded via AND gate 336 from the previously mentioned $R_{start}$ register 262 during every pulse interval in response to timing signal $T_{TS}$. Counter 332 is decremented in response to the clock pulses provided by source 268.

Timing signal $T_{EDR}$ is generated in the same manner as timing signal $T_{SDR}$. That is AND gate 340 is enabled during data pulse intervals by the output AND gate 304. A decrementing counter 342 is loaded from the $R_{stop}$ register 264 via AND gate 344 during each pulse interval. Counter 342 provides an output pulse on terminal 346 when the count therein reaches zero. This pulse is coupled to AND gate 340 to define the timing signal $T_{EDR}$.

FIG. 11 — Antenna Phase Computer

Attention is now called to FIG. 11 which illustrates in greater detail inputs and outputs to a block representing the antenna phase coumputer 134 previously referred to in connection with FIG. 6. The antenna phase computer 134 is preferably a wired program computer which calculates the phase shift necessary to steer a beam in elevation and azimuth. Assuming equal element spacing with equal signal amplitudes, the phase shifts required for steering in azimuth ($\Phi_{AZ}$) and elevation ($\Phi_{EL}$) are represented by the following expressions:

$$\Phi_{AZ} = 2\pi(dF/C) \sin \Theta$$

$$\Phi_{EL} = 2\pi(d F/C) \sin \phi$$

where F equals transmission frequency, $d$ equals spacing between adjacent elements, C equal propagation velocity of electromagnetic radiation, $\Theta$ equals the azimuth angle from broadside, and $\Phi$ equals the elevation angle from broadside.

The values of sin $\Theta$, sin $\Phi$, and F, which are contained in the radar control command, are supplied from the radar data buffer to the input of the antenna phase computer 134. The array ID number is also supplied from the radar data buffer to the antenna phase computer. Additionally, the previously mentioned timing signals $T_{SUD}$ and $T_{LPS}$ are applied to the antenna phase computer from the radar synchronizer. In turn, the antenna phase computer 134 calculates the foregoing equations to develop five-bit digital signals for application to the phase shifters $46_2$–$52_2$ of FIG. 5a to fire a beam from the appropriate array and at the designated azimuth and elevation angles from broadside. Beam steering through the use of variable phase shift elements is discussed in *Introduction to Radar Systems*, supra, at page 298.

Figure 12:
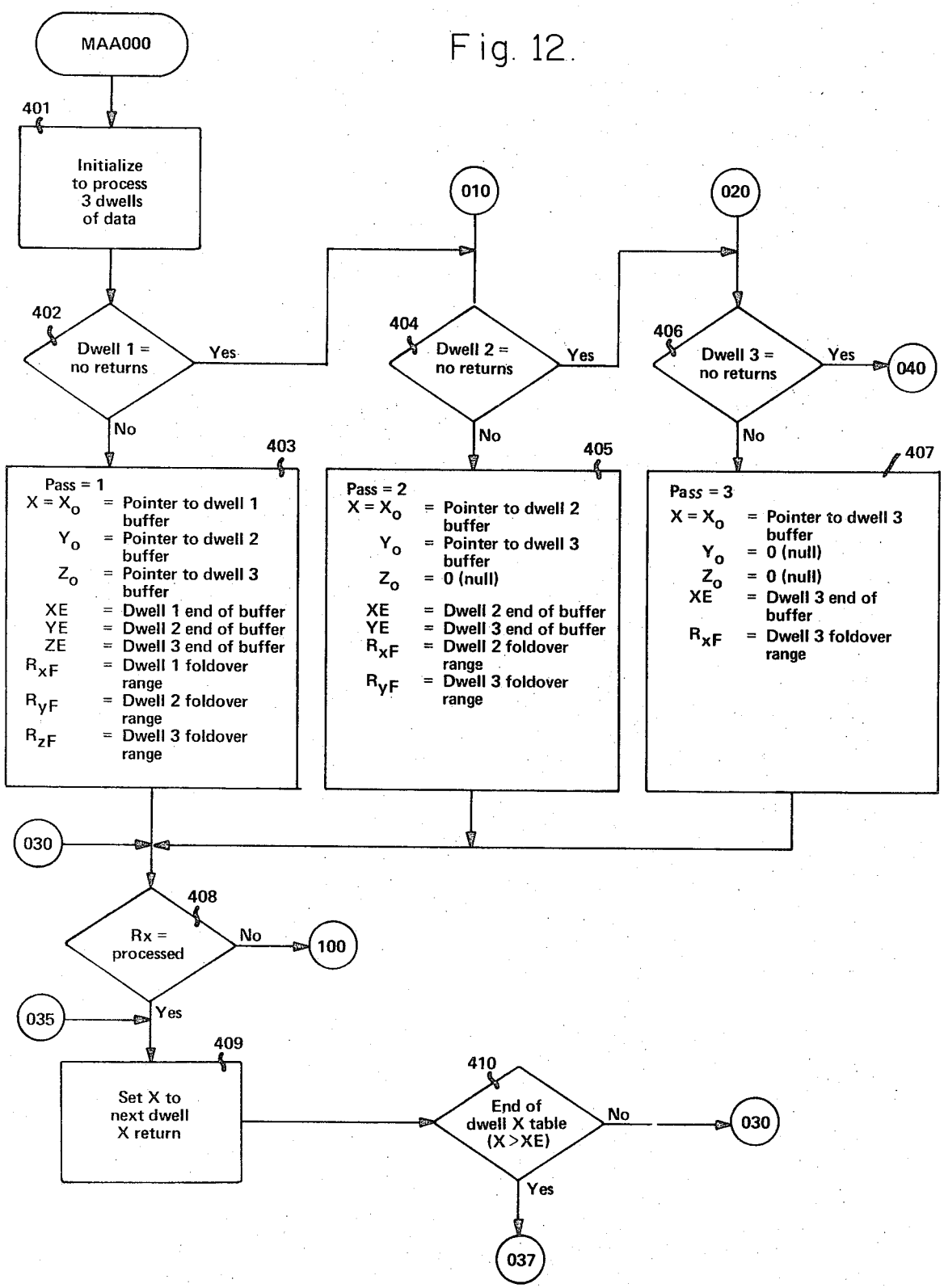
FIGS. 12 through 18 are *flow charts* of a program subroutine stored in the digital computer system of FIG. 4 to implement the present invention.
Figure 13:
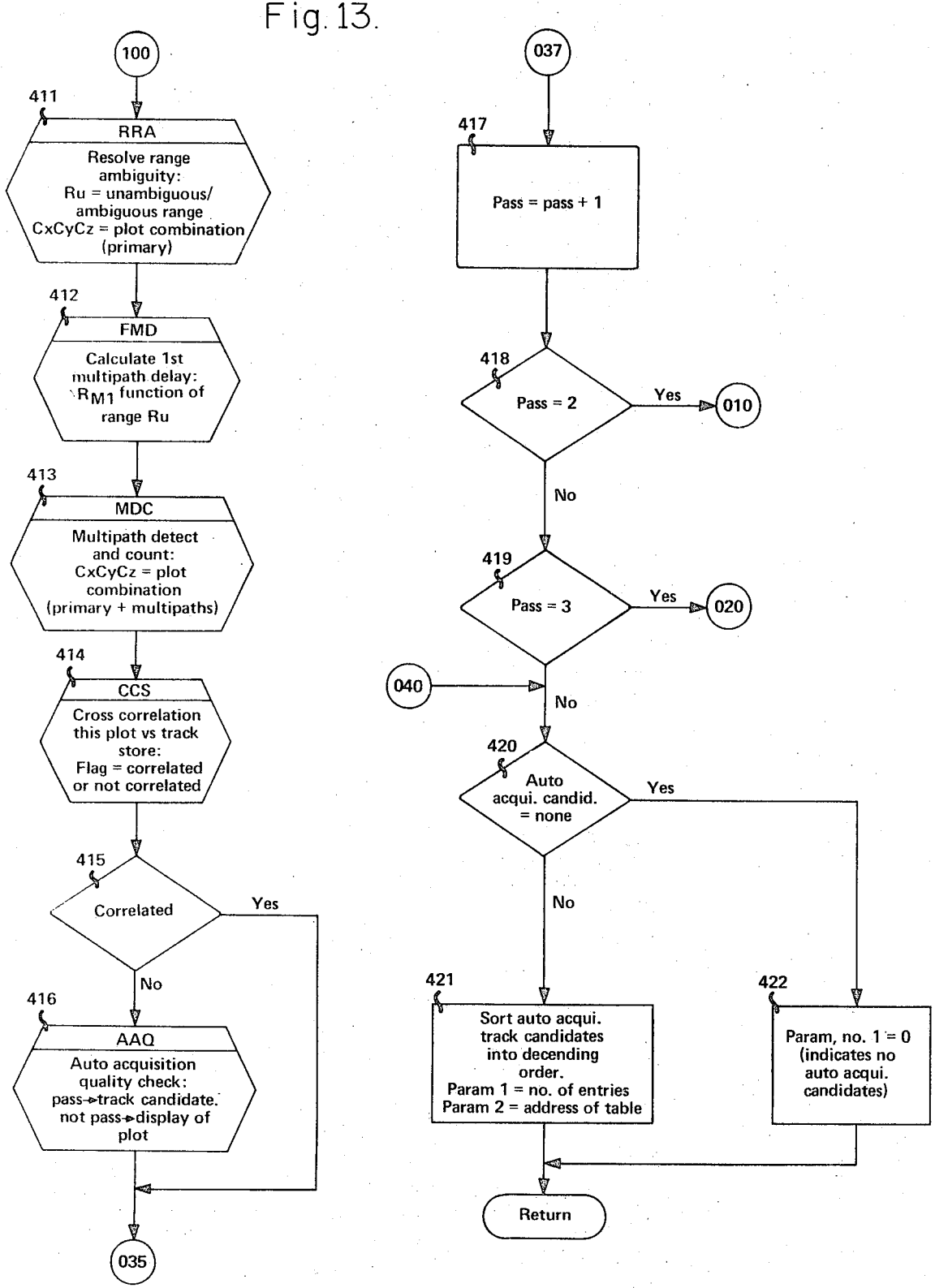

FIGS. 12–13 — Computer Flow Chart

Referring now to the flow chart in FIGS. 12 and 13 of a subroutine, MAA, stored in the digital computer system 34 to implement the present invention, it should be noted that the process for multipath automatic target acquisition includes the following subdivisions of sub-subroutines referred to hereinafter as subroutines to the main subroutine, MAA.

Resolve Range Ambiguity (RRA)
First Multipath Delay Calculation (FMD)
Multipath Detect and Count (MDC)
Cross Correlation Sequence (CCS)
Automatic Acquisition Quality Check (AAQ)

The MAA subroutine is called by an energy management routine stored in the computer system. The energy management routine is relied upon for overall control of the radar system with respect to all of its functions including search, verify and track. The MAA subroutine is called when a beam consisting of three dwells, one dwell for each of three staggered PRF's, has been transmitted and returns received. The subroutines RRA, FMD, MDC, CCS and AAQ, are called in sequence by the MAA subroutine to process each radar return, as will be presently described with reference to FIG. 13.

The function of the MAA subroutine is to provide general initialization for processing the three dwells of target data from a search beam, and to first process the data to resolve ambiguity in range (subroutine RRA) as to each target return, if possible, and for each target of ambiguous, or unambiguous, range, $R_i$, to determine the maximum first multipath return delay time, $\Delta R_{M1}$, (subroutine FMD) to be used to detect, for that target at range $R_i$, a first multipath return at range $R_{iM1}$ from the same doppler filter as the target return from the range $R_i$ (subroutine MDC). Each target report being processed is then cross correlated with targets already being tracked in a track store of the computer system (subroutine CCS). If the target report does not correlate with a target already being tracked, a quality check (subroutine AAQ) is made to determine whether the target report is to be automatically acquired for tracking based upon the number of multipath returns detected and the sea state. In general, the smoother the sea, the more selective the radar system can be in automatically acquiring targets based on one or more multipath returns for a given target at range $R_i$.

Sea state is an input parameter to the AAQ subroutine and is entered manually by an operator as noted hereinbefore. Alternatively, sea state could be determined by the radar system automatically, also as noted hereinbefore, using a stored subroutine called on demand by the radar operator or routinely by the energy management routine.

The output of the last subroutine AAQ is an entry to a track candidate table which shows all target candidates checked and found to be of sufficient quality. The subroutine AAQ will also set up for display each target checked and found not to be of sufficient quality. The minimum quality of a given target at range $R_i$ is a function of range and sea state. It is also a function of target altitude which, if not otherwise known, can be determined from multipath return delay measurements. However, for the exemplary embodiment disclosed herein, the effect of altitude on quality is assumed to be negligible, a reasonable assumption surveillance flights maintained at approximately 30,000 feet, and targets at a normal altitude of 40,000 to 50,000 feet. This is because both range and altitude effect the angles of incidence and reflection ($\Theta = 90° - \alpha$ in FIG. 2). The shorter the range, or the higher the target altitude, the greater the angle and therefore the lower the probability of multipath returns. Therefore, the greater the range, or the lower the altitude of the target, the higher the minimum plot quality should be for automatic target acquisition, where "plot quality" is a function of the number of multipath returns received. Similarly the calmer the sea the greater the probability of multipath returns. Therefore, for a given range, a higher plot quality is required for a low sea state than for a high sea state. Here a sea state of 1, 2 or 3 on the scale described hereinbefore is considered a low sea state, while a sea state of 3 and 4 is a medium sea state. A sea state measurement of 5 or higher is considered here to be a high sea state.

Each target entered into the automatic acquisition track candidate table is thereafter picked up by the energy management routine for verification. Each target not entered into the automatic acquisition track candidate table may, upon being displayed, be acquired on command of the radar operator in a conventional manner. In either case, the energy management routine will enter a subroutine to acquire the target by first firing a beam at the target to verify its presence and then entering the report from the verify beam in the target track store.

Except for track candidates with ambiguous range, a more accurate range may be obtained from the verify beam by range gating in the usual manner using the frequency and PRF combination of the search beam that provided visibility of the target during the search. In the case of ambiguous range, a "jittered" verify beam is fired in order to resolve range ambiguity, i.e., the verify beam is transmitted with two dwells, the second at a PRF that is different by a predetermined amount from the PRF of the search beam that provided visibility of the target. The energy management routine will then branch back to this subroutine MAA to use the subroutine RRA to resolve range ambiguity and then return to the energy management routine for further processing to determine whether the target is already in an existing track, i.e., is already being tracked, and if not to call and initialize a track routine. To branch back, the energy management routine calls and initializes the MAA subroutine to accept the jittered dwell returns as target reports from dwells 1 and 2, setting the number of reports in dwell 3 to zero, as will be more fully appreciated from the following description of the normal operation of the subroutine MAA.

Inputs to the multipath automatic acquisition subroutine are all target reports for dwells 1, 2, and 3; the start location in memory for dwells 1, 2 and 3 target reports; and precalculated foldover ranges for dwells 1, 2 and 3.

Outputs of the multipath auto acquisition subroutine are: the number of automatic acquisition track candidates; a pointer to the automatic acquisition track candidate table; and automatic acquisition track candidate table with entries sorted in descending plot quality order. Targets which do not qualify for automatic acquisition are set up for display as they are checked for quality as just noted hereinbefore. The system subroutine for display of these rejected targets can be cleared periodically or on demand of the operator. Still other possibilities will occur to those skilled in the art, such as display of each individual target for a specified period of time. The display is under control of the digital computer system which is very versatile, particularly for display through controllers which operate independently and need be serviced only as needed by the computer system.

The manner in which display is provided is conventional and not part of the present invention. Consequently, for purposes of this invention, it is sufficient for the multipath automatic acquisition subroutine to output the three items enumerated, namely, the number of acquisition track candidates, a pointer to the automatic acquisition track candidate table for use by the energy management program, and the automatic acquisition track candidate table itself. The preferred way of handling transfer of the automatic acquisition track candidate table to the track store is to transmit a verify beam for each target to obtain more accurate range data as the targets are transferred, one by one, to the track store.

A more detailed description of the multipath automatic acquisition subroutine will be set forth after the following list of notations used.

PASS = pass indicator
   pass 1: process dwell 1 vs dwells 2 & 3
   pass 2: process dwell 2 vs dwell 3
   pass 3: process dwell 3

X = current dwell X return pointer
   pass 1:X = current dwell 1 return
   pass 2:X = current dwell 2 return
   pass 3:X = current dwell 3 return Y = current dwell Y return pointer
   pass 1:Y = current dwell 2 return
   pass 2:Y = current dwell 3 return
   pass 3: not used Z = current dwell Z return pointer
   pass 1:Z = current dwell 3 return
   pass 2: not used
   pass 3: not used $X_o$ = pointer to start of dwell X buffer
$Y_o$ = pointer to start of dwell Y buffer
$Z_o$ = pointer to start of dwell Z buffer
$X_E$ = one report less than dwell X end of buffer
$Y_E$ = one report less than dwell Y end of buffer
$Z_E$ = one report less than dwell Z end of buffer
   $X_o$, $Y_o$, $Z_o$, $X_E$, $Y_E$ and $Z_E$ are used to process returns in the X, Y and Z buffers.

$R_{XF}$ = dwell X foldover range
$R_{YF}$ = dwell Y foldover range
$R_{ZF}$ = dwell Z foldover range
$R_x$ = Ambiguous range of dwell X return
   Sign bit positive = not processed
   Sign bit negative = processed
$R_y$ = Ambiguous range of dwell Y return
   Sign bit positive = not processed
   Sign bit negative = processed
$R_z$ = Ambiguous range of dwell Z return
   Sign bit positive = not processed
   Sign bit negative = processed
$C_x$ = Primary/multipath counter dwell $x$
$C_y$ = Primary/multipath counter dwell $y$
$C_z$ = Primary/multipath counter dwell $z$
   $C_x$, $C_y$, $C_z$ represent current plot combination used to calculate plot quality.
$R_u$ = Unambiguous range of current plot if sign bit is positive.

Ambiguous range of current plot is sign bit is negative.

$\Delta R_{M1}$ = Maximum 1st multipath delay for range $R_u$.

$N_x = 1, 2, 3, \ldots$ $N_y = 1, 2, 3, \ldots$ $N_z = 1, 2, 3, \ldots$ $R_L$ = Look-up range index into tables:
  a. Range vs 1st multipath delay table.
  b. Range vs minimum plot quality table (one table for each sea state).
  0 = 0 through 19 miles
  1 = 20 through 39 miles
  2 = 40 through 59 miles
  3 = 60 through 79 miles ...
  n = 20n through 20 (n + 1) − 1 miles $\Delta_{RL}$ = size of range interval used for look-up (20 miles)

FILTER $R_i (i = x,y,z)$ = doppler filter number for primary return $R_i$

FILTER $R_{iM1}(i = x,y,z)$ = doppler filter number for 1st multipath return $R_{iM1}$ FILTER $R_{iM2}(i = x,y,z)$ = doppler filter number for 2nd multipath return $R_{iM2}$ $X_p$ = X coordinate of plot in tracking plane $Y_p$ = Y coordinate of plot in tracking plane $Q_p$ = plot quality (function of plot combination $C_x$, $C_y$, $C_z$)

$Q_M$ = minimum plot quality required for auto acquisition (function of sea state and range $R_u$)

$R_{MAX}$ = maximum range of radar system

Initialization to process three dwells of data is performed by the general block 401. This entails saving the return address of the radar energy management program, setting to zero the number of automatic acquisition candidates and performing general housekeeping tasks for target buffer parameters that are used for all dwell passes, such as setting up the foldover ranges for dwells 1, 2 and 3. Once the general or basic initialization is complete, dwell processing begins by checking to determine whether there are any returns in dwell 1. If the check in block 402 indicates no returns, the MAA subroutine branches to block 404 where a similar check is made for dwell number two. If again no returns are indicated, the subroutine branches to block 406 where, if again no returns are indicated, the subroutine branches to block 420 (FIG. 13) where a check is made to determine if there are no candidates of targets to be automatically acquired. In that case, there are none, so the subroutine branches to block 422 where a parameter number one is set equal to zero to indicate that there are no automatic acquisition candidates. The subroutine then returns to the energy management program.

Returning to block 402, if the test for no returns in dwell one is negative, indicators, pointers and the like are set as shown in block 403 for pass one where the notations are as set forth hereinbefore. Thus, blocks 402 and 403 in the flow chart of FIG. 12 are used to set up processing of each return in dwell one. The processing consists of operations indicated in blocks 411 through 416 of FIG. 13, and includes "matching" returns against returns in dwells two and three to resolve range ambiguity, as will be described with reference to block 411. Blocks 404 and 405 set up similar processing of each nonprocessed (nonmatched) return of dwell two. Pass three represented by blocks 406 and 407 set up similar processing of each remaining nonprocessed return in dwell three.

Each of the three passes initiated by the logical decisions in blocks 402, 404 and 406 includes blocks 408, 409 and 410 in FIG. 12. If a given return $R_x$ has not been processed as determined by block 408, the subroutine branches to block 411 to process the return through all of the subroutines called for by blocks 411 through 416. Block 416 returns the subroutine to block 409 which sets the pointer X to the next dwell X return following which a check is made in logical decision block 410 to determine whether the end of the dwell X table has been reached. For the first pass, the end of the dwell X table is reached when the last report in dwell one has been reached. The end of dwell X table (XE) in the first dwell was entered during the initialization process (block 401). If the end of the dwell X table has not been reached, block 410 returns to block 408 where, if the next return $R_x$ has not been processed, the sequence of subroutines represented by blocks 411 through 416 are executed before the subroutine returns to block 409. For the first pass, each return checked by block 408 will not have been processed. During pass two, the X pointer is set to the dwell two buffer, and now each return to be processed must be checked in box 408 to determine whether it has been processed. If so, it has been marked as processed during the execution of the sequence represented by the blocks 411 through 416. In that case, further processing is not necessary. Similarly, during pass three, the pointer X is set to the dwell three buffer returns, and returns not previously processed are separately processed. Here "matching" with returns in other dwells to resolve range ambiguity is not possible since every dwell three return already processed has been matched with a return from another dwell. Accordingly, the remaining (unprocessed) returns to be processed during pass three are of targets which could not be seen by the other two dwells because of their range and/or velocity. Consequently, in block 411 of FIG. 13, the first step after initializing the RRA subroutine is to determine whether this is pass three. If so, the RRA subroutine branches to block 433 to set the sign bit of the target range negative, thereby indicating that the target range is ambiguous, as shown in FIG. 13. The RRA subroutine then returns to main subroutine MAA which then calls for block 412.

The processing of a single target report through blocks 411 to 416 will now be described with reference to FIGS. 14 to 18.

Figure 14:
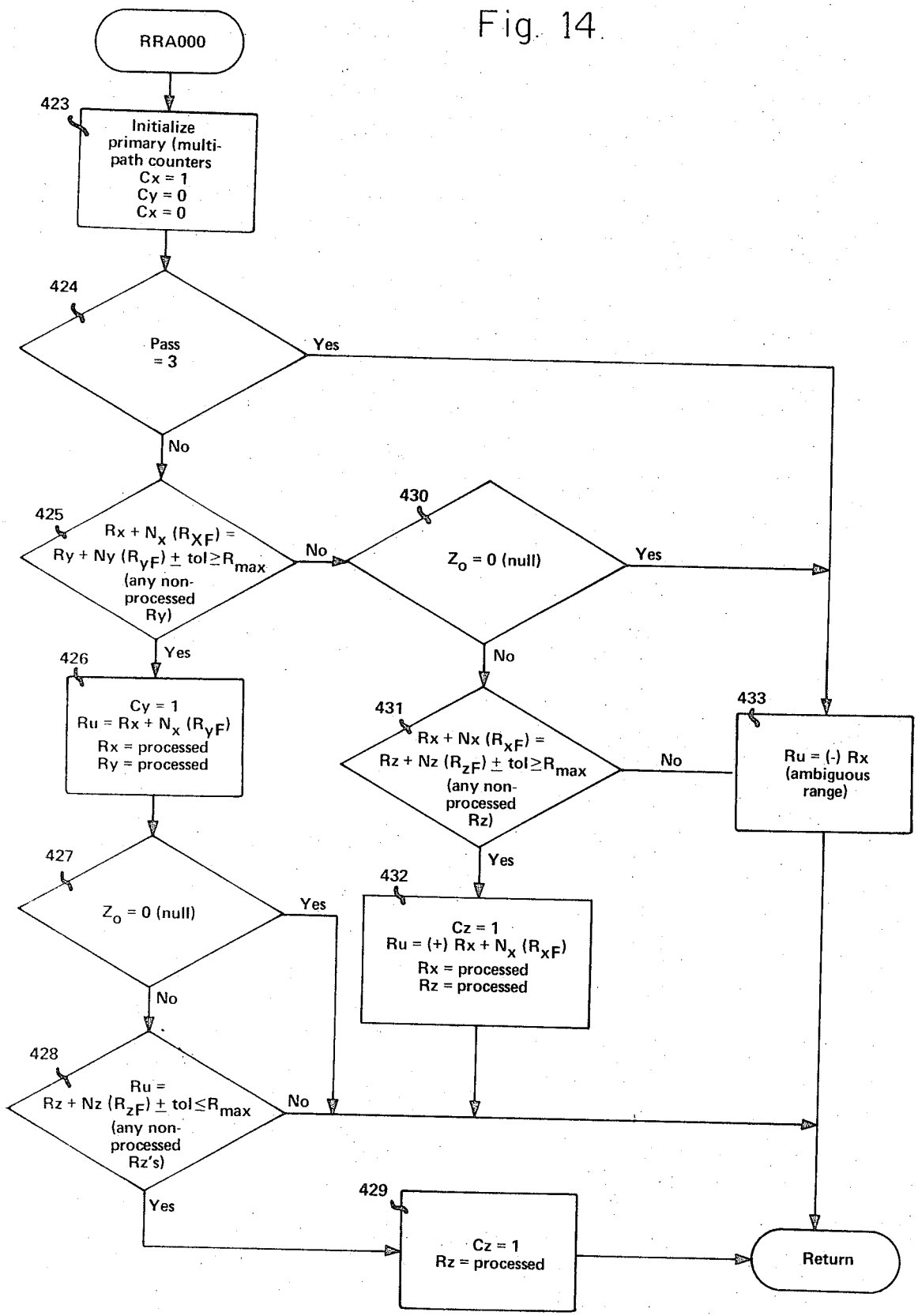

FIG. 14 — Resolve Range Ambiguity (RRA)

For each target report of the first pass, the primary multipath counters $C_x$, $C_y$ and $C_z$ are initialized (block 423) by setting $C_x = 1$, $C_y = 0$ and $C_z = 0$, thus indicating a primary return in dwell X (i.e., dwell 1 for pass 1; dwell 2 for pass 2; dwell 3 for pass 3). If this is not the third pass (block 424), a match with a return from dwell Y (i.e., dwell 2 for pass 1; dwell 3 for pass 2) is sought utilizing the equation:

$$R_x + N_x(R_{XF}) = R_y + N_y(R_{YF}) \pm tol \leq R_{MAX}$$

for any non-processed target reports in dwell Y where $R_x$ is the ambiguous range of the target return being processed, $R_{XF}$ is the foldover range for the PRF of dwell X. $R_y$ and $R_{YF}$ are the ambiguous range and foldover range for the dwell Y returns. A tolerance value "$tol$" is included to allow for some error in the measurements of $R_x$ and $R_y$. $R_{MAX}$ is the maximum range of the radar. The routine for implementing this equation is to test each non-processed dwell Y return, $R_y$, in sequence. The test is made with successive values of the integers $N_x$ and $N_y$ starting with both at zero in an attempt to satisfy the above equation. For example, the PRF for dwell 1 at 3125 produces a shorter foldover than the PRF for dwell 2 at 2232. Consequently, it is obvious that the integer $N_x$ and $N_y$ must be incremented independently in the attempt to satisfy the above equation. The $N_i (x = x$ or $y)$ to be incremented in each attempt is the $N_i$ associated with the smaller of the two values, $[R_x + N_x(R_{XF})]$ or $[R_y + N_y(R_{YF})]$, but only until $R_x + N_x(R_{XF})$ exceeds the maximum range, $R_{MAX}$, of the radar system. Once that maximum range occurs without finding a "match" (equality) block 425 branches to block 430. When a match has been found, counter $C_y$ is incremented ($C_y = 1$) in block 426, thus indicating a primary return in dwell Y (i.e., dwell 2 in pass 1, dwell 3 in pass 2) which matches the primary returns in dwell X (i.e., dwell 1 in pass 1, dwell 2 in pass 2) and the subroutine advances to block 427.

Each of the blocks 427 and 430 tests for a null in dwell Z (i.e., pass 2 or 3) which indicates a maximum of two dwells being processed on this pass. In that case, all targets have been "matched" that can be. Consequently, the RRA subroutine returns to the main subroutine directly from block 427, and through block 433 from block 430. In block 433, the sign bit of the target range $R_u$ is set negative to indicate "ambiguous range," and the value of $R_u$ is set equal to $R_x$.

If a "match" was not found in block 425, and block 430 determines dwell Z is not null (i.e., this is pass 1), block 431 checks for a "match" between the target return at range $R_x$ from dwell 1 with a return from dwell 3 using the equation $$R_x + N_x(R_{XF}) = R_z + N_z(R_{ZF}) \pm tol \leq R_{MAX}$$

for each non-processed target return of the third dwell. If a match is not found, the sign bit of the range $R_u = R_x$ is set negative in block 430, and if a match is found the multipath counter $C_z$ is set equal to one in block 432, thus indicating a primary return in the third dwell which matches the primary return in the first dwell. Block 432 also sets the sign bit of the unambiguous range $R_u$ positive, where $R_u$ is set equal to $R_x + N_x(R_{XF})$.

If a "match" was found in block 425, and dwell Z is not null (i.e., this is pass 1), block 428 determines whether any return $R_z$ matches the unambiguous range $R_u = R_x + N_x(R_{XF})$ found in block 425. That is done using equation $$R_u = R_z + N_z(R_{ZF}) \pm tol \leq R_{MAX}$$

for all non-processed target returns in dwell 3. If a match is found, in block 429 the target return at range $R_z$ is marked as processed and the multipath counter $C_z$ is incremented ($C_z = 1$), indicating a primary return in dwell Z which matches the primary return in dwell X.

The output of subroutine RRA shown in FIG. 14 is a target report including a plot combination count $C_x$ $C_y$ $C_z$ for the primary returns associated with dwells X, Y and Z. The target range is $R_u = +[R_x + N_x(R_{XF})]$ if a "match" was found, the plus sign signifying an unambiguous range, and the combination count is 111, 110 or 101, depending upon whether the "match" found was with a return in dwell y and/or dwell z. (Note: in pass 1 $C_x$ = dwell 1, $C_y$ = dwell 2, $C_z$ = dwell 3; in pass 2 $C_x$ = dwell 2, $C_y$ = dwell 3, $C_z$ = always 0.) If no match was found, the plot combination is 100, and the target range is $R_u = -[R_x]$, the negative sign signifying an ambiguous return.

A given target report of dwell 1 is processed in blocks 409 through 416 (FIG. 13) before the next target report is taken up to resolve its range ambiguity. When all returns of dwell 1 have been processed, block 410 branches the main subroutine through blocks 417 and 418 to set up processing of dwell 2 returns, if any. That is done in pass 2, as noted hereinbefore, by setting X and Y pointers to dwells 2 and 3, and setting $Z_o = 0$. The subroutine RRA of FIG. 14 then processes any unprocessed returns from dwell 2 as before. The only difference is that now plot combinations $C_x C_y C_z$ for each target are limited to the combinations 100 and 110 since $C_x$ is now associated with dwell 2, $C_y$ associated with dwell 3 and $C_z$ always zero.

Once the unprocessed dwell 2 returns have been processed in pass 2, block 410 (FIG. 12) branches to block 417 (FIG. 13) and from block 419 to block 406 to set up processing of returns in dwell 3, if any. Now, however, block 424 (FIG. 14) branches the RRA subroutine directly to block 433 where the range of the target return is entered as an ambiguous range, i.e., $R_u$ is set equal to the range of the unprocessed return from dwell 3 with a negative sign. Note also that the plot combination count remains 100 set in block 423.

Figure 15:
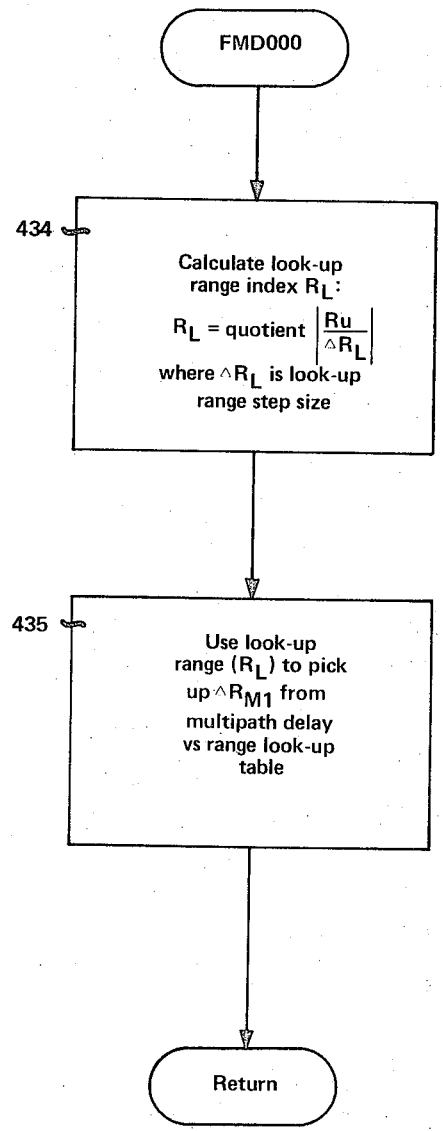

FIG. 15 — Calculate 1st Multipath Delay (FMD)

The next step of the main subroutine MAA in block 412 (FIG. 13) is to calculate the first multipath delay $\Delta R_{M1}$ as a function of range $R_u$ (ambiguous or unambiguous). A look-up table indexed by range look-up intervals $R_L$ of 20 nautical miles in this exemplary embodiment is used to find the maximum first multipath delay applicable for the particular target, and the look-up index $R_L$ is calculated as the ratio of the absolute value of range, $R_u$, for a predetermined range interval $\Delta R_L$. Consequently, the subroutine FMD shown in FIG. 15 is simply to divide $R_u$ by $\Delta R_L$ in block 434 to obtain the quotient $R_L$, and to then in block 435 look up $\Delta R_{M1}$ in the table referred to and set forth hereinbefore.

Figure 16:
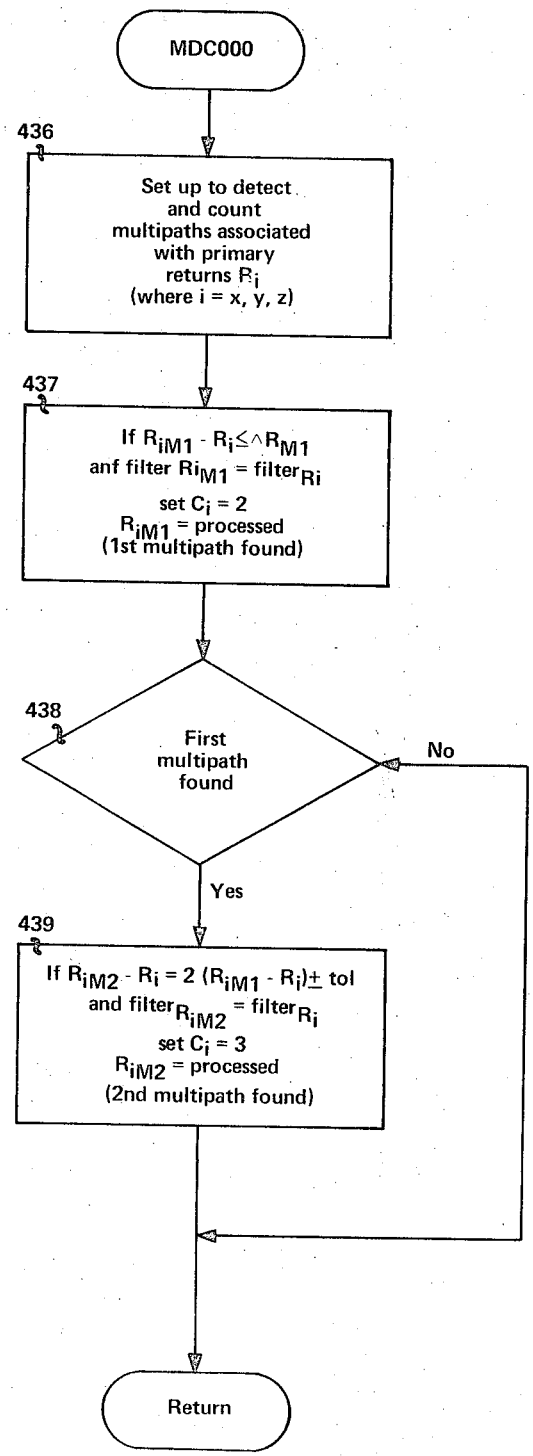

FIG. 16 — Multipath Detect & Count (MDC)

The next step, after looking up $\Delta R_{M1}$ for a given target return being processed is to detect and count multipath returns associated with the primary return $R_i$ being processed, where $i = x, y, z$. Inputs are the plot combination $C_x C_y C_z$ and pointers X, Y and Z to primary returns associated with the individual digits $C_x$, $C_y$ and $C_z$ of the plot combinations. Block 436 sets up this subroutine and block 437 checks for a first multipath return by looking for a return in which the following conditions are satisfied:

$$R_{iM1} - R_i \leq \Delta R_{M1}$$

where $R_{iM1}$ is the first multipath return sought, $R_i$ is the primary return, $\Delta R_{M1}$ is the maximum first multipath delay, and the doppler filters for $R_{iM1}$ and $R_i$ are the same. The subscript $i$ is $x, y$ or $z$ for dwell X, dwell Y or dwell Z data. If both conditions are satisfied, the plot combination digit $C_i$ is set to two and a "first multipath return processed" indicator is set.

If the first multipath return is found, the subroutine progresses through block 438 to block 439. There a check is made for a second multipath return. That is done by looking for a return in which the following conditions are satisfied:

$$R_{iM2} - R_i = 2(R_{iM1} - R_i) \pm tol$$

and the filter for both the $R_{iM2}$ return and the $R_i$ return is the same. Note that having found $R_{iM1}$, it is known that the delay in receiving the second multipath return after the primary ($R_{iM2} - R_i$) is twice the delay in receiving the first multipath return $2(R_{iM1} - R_i)$ within a predetermined tolerance.

If a second multipath return is received out of the same doppler filter as the primary return, the plot combination digit $C_i$ is set equal to three. This is done for each dwell. Consequently, for a plot combination 111, for example, obtained in pass 1 of the RRA subroutine, it is possible to find under ideal sea-state conditions two multipath returns for the same target at each PRF. If so, the plot combination goes to 333. A plot combination of 110 for another target in pass 2 could go to 330. With a higher sea state the same two targets may yield plot combinations of 213 and 230. The combination of 213 is a higher plot quality for automatic target acquisition than 320, even though the same total number (3) of multipath returns were received, because the same target was seen in each dwell, i.e., at all PRF's. As will be described hereinafter with reference to FIG. 18, the "plot quality" of each target is calculated by forming a number of three digits by copying the plot combinations (i.e., the $C_i$'s) in descending order. In the foregoing example, the plot quality of each of the two targets is 321 and 320, respectively. The target with the larger plot quality number is the one to be acquired first for tracking.

If a first multipath return is not found, block 439 is bypassed. Note that all this is done for each primary return as it is individually processed through blocks 411, 412 and 413 (FIG. 13).

Figure 17:
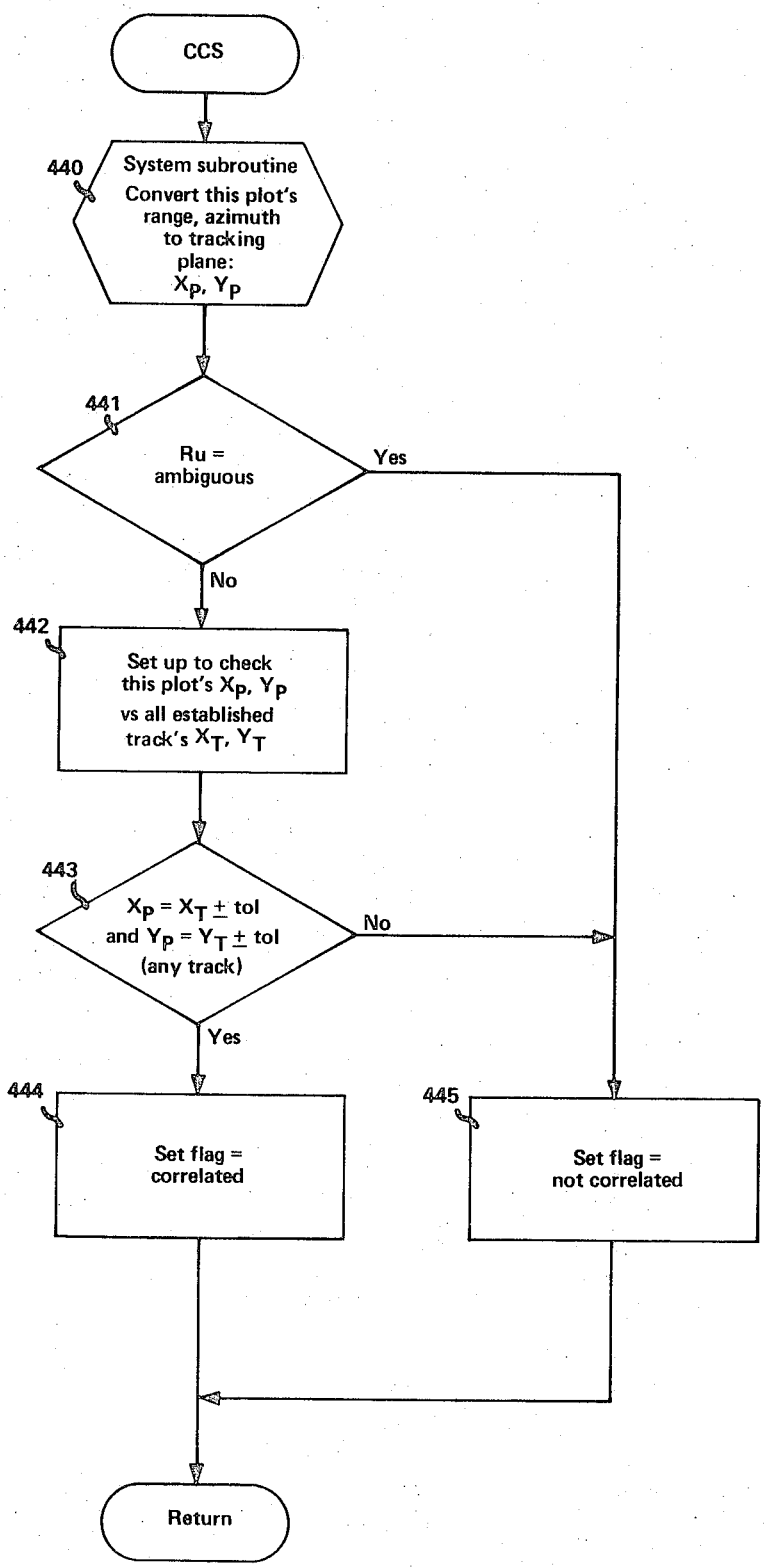

FIG. 17 — Cross Correlation Sequence (CCS)

The next step (block 414 in FIG. 13) is a subroutine CCS shown in FIG. 17. Its purpose is to convert the range and azimuth of each plot combination as it is being processed to Cartesian coordinates $X_p$ and $Y_p$ in the tracking plane (block 440) for correlation with targets already being tracked. If the range of the target is ambiguous, it is not possible to attempt correlation and block 441 transfers to block 445 to set a "not correlated" flag associated with the plot combination. If the range is unambiguous, block 442 sets up the plot ($X_p$, $Y_p$) for the plot combination for correlation. The correlation is carried out in block 443 by checking each target plot ($X_T$, $Y_T$) in the established tracks using the following equations $$X_p = X_T \pm \text{tolerance}$$
$$Y_p = Y_T \pm \text{tolerance}$$

where $X_T$ and $Y_T$ are set to the coordinates for the existing target tracks, one target at a time. If no match is found, a "not correlated" flag is set; if a match is found, a "correlated" flag is set in block 444.

Figure 18:
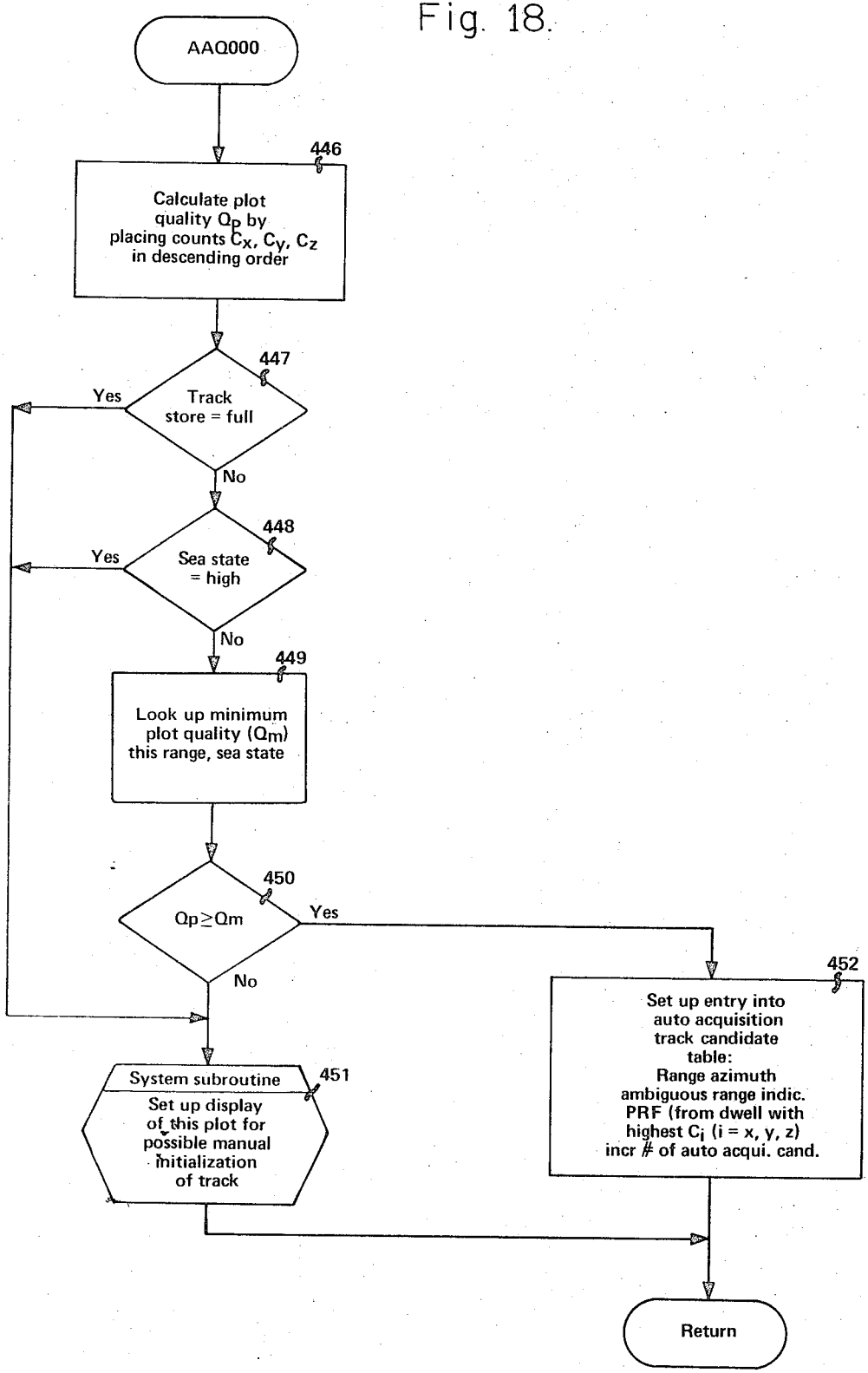

FIG. 18 — Auto Acquisition Quality Check (AAQ)

The last operation for each target return being processed through blocks 411 and 416 (FIG. 13) is a check on the quality of the plot combination to determine whether the target which did not correlate with a target already being tracked should be entered into a table of candidates for automatic acquisition. If not entered in the table, the plot ($X_p$, $Y_p$) is displayed.

The first step in block 446 is to calculate plot quality, $Q_p$, for the plot combination $C_x C_y C_z$ by forming a plot quality number, $Q_p$, by copying the plot combination digits $C_x$, $C_y$ and $C_z$ in descending order. For example, the plot combination 312 yields a plot quality $Q_p = 321$, as noted hereinbefore. The next step (block 447) is to determine whether or not the track store is full. For example, if only 64 targets can be tracked, and there are 64 targets in the track store, block 447 branches to block 451 to set up a display of the plot for possible manual initialization of track. If not, the next check in block 448 is for the seastate condition. If it is high (5 or more in the scale set forth hereinbefore), automatic target acquisition is not reliable, and again there is a transfer to block 451 to set up a display of the target plot for possible manual initialization of track. If not, the next step in block 449 is to look up the minimum plot quality, $Q_M$, for the target range and sea state. Then in block 450 a check is made to determine whether the plot quality is equal to or greater than the minimum plot quality for this target and sea state ($Q_p \geq Q_M$). If not, it is set up for display in block 451; if so, blocks 452 sets up an entry of the target slot in an auto acquisition track candidate table.

After all target returns have been processed through the operation of passes 1, 2 and 3, all qualified target plots will have been entered in the auto acquisition track candidate table. Note that all target returns are considered for entry into the auto acquisition track candidate table, even if range is ambiguous, but in practice targets with ambiguous range will have a plot quality of 100, and will likely not satisfy the test of block 450. However, if it is entered in the table, the energy management routine will verify the target before tracking and will at that time use staggered PRF's to resolve the range ambiguity, as noted hereinbefore. If range is not ambiguous, the PRF used to verify the targets presence is the one associated with the dwell 1, 2 or 3 having the largest plot combination number. Some examples will clarify how this matching between dwell combinations and PRF's is done. To understand these examples, it should be recalled that the subscripts $x$, $y$ and $z$ are used in the MAA subroutine with the following meaning:

Pass 1: $x$ indicates dwell 1 returns
Pass 1: $y$ indicates dwell 2 returns
Pass 1: $z$ indicates dwell 3 returns
Pass 2: $x$ indicates dwell 2 returns
Pass 2: $y$ indicates dwell 3 returns
Pass 2: $z$ is null (i.e., 0)
Pass 3: $x$ indicates dwell 3 returns
Pass 3: $y$ is null (i.e., 0)
Pass 3: $z$ is null (i.e., 0)

Consequently, a plot combination ($C_x$, $C_y$, $C_z$) reflects the primary/multipath counts for dwells $x$, $y$ and $z$ as indicated above for the particular dwell of the unprocessed primary being processed. For example, a plot combination of 100 indicates a primary (direct) return in dwell 1, 2 or 3 depending upon whether the plot combination was developed in pass 1, 2 or 3. Similarly, a plot combination of 320 indicates a primary and two multipath returns in dwell 1 or 2, and a primary and one multipath in dwell 2 or dwell 3, depending upon whether the plot combination was developed in pass 1 or pass 2. If in pass 1, it is known that no return was received from the target in dwell 3.

The plot quality, $Q_p$, is developed without disturbing the components $C_x$, $C_y$ and $C_z$ as stored in separate locations of a radar target return buffer in memory. Associated with each component is a PRF number for the dwell from which it actually originated. Therefore, in block 452, when the energy management program wants to get the PRF from the dwell that had the highest $C_i$ ($i=x,y,z$), the procedure is to compare the digit in the most significant digit position of the plot quality number developed from the plot combination. These digits are individually in binary form, and collectively in octal code. Therefore, three binary digits are used for each plot quality digit. However, that is not essential. Two bits suffice for storing each digit of the plot quality. The largest would always be stored in the most significant two bit positions. In either case, comparison can be made between the most significant plot quality digit and each of the $C_x$, $C_y$ and $C_z$ digits which are stored in the appropriate dwell 1, dwell 2 and dwell 3 radar target return buffers during the different passes. For example, in pass 2, $C_x$ is stored in a dwell 2 buffer thus becoming quite properly $C_y$ in the radar target return buffer. For this comparision, an index register is set to the dwell 1 radar target return buffer and a comparison is made between the most significant digit of the plot quality and $C_x$ of that buffer. If no match, the index register is incremented to the next buffer for a match with $C_y$. If the match is made there the contents of the index register are used as a pointer to fetch the PRF number for dwell 2. If no match is found the index register is incremented to the next buffer. There a comparison need not be made as it is then known that the multipath count in the most significant digit position of the plot quality originated in dwell 3.

The number of targets entered in the candidate table is incremented for each target so entered in order to advise the energy management routine of the number of targets to be verified. Once verified, the target data is transferred to the track store and the table entry relating thereto is cleared. At the same time, the number of targets to be verified is documented.

From the foregoing description of FIGS. 12 through 18, it is evident that the entire MAA subroutine can be programmed with simple instructions available in virtually any programmable digital computer system. The specific instructions required are simply addition, subtraction, multiplication, division, conditional branch, and the like. Accordingly, the following description of a typical computer system illustrated in FIGS. 19 and 20 is by way of example and not by way of limitation.

Figure 19:
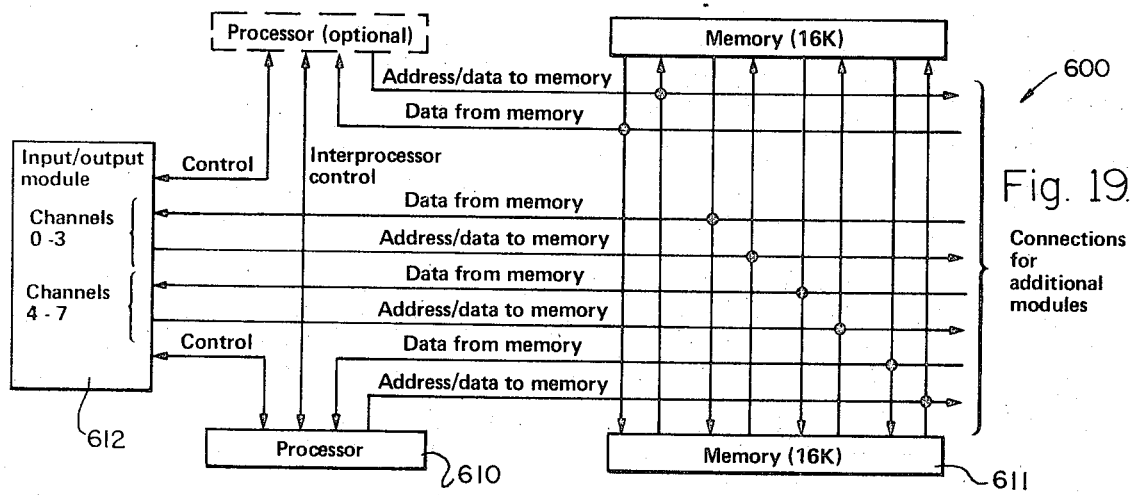
FIG. 19 is a block diagram of an *exemplary digital computer system* suitable for use in the system of FIG. 6.
Figure 20:
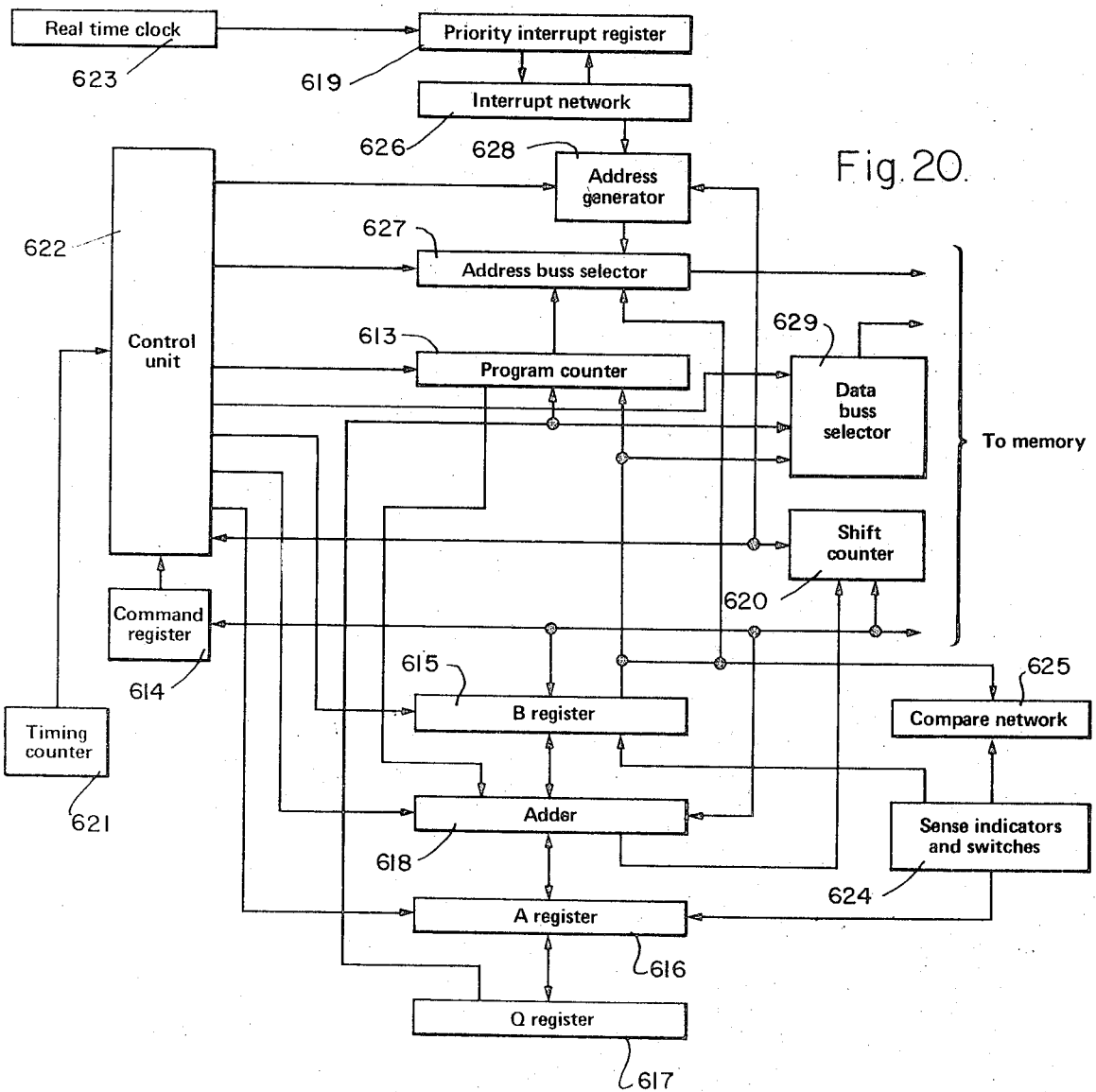
FIG. 20 is a block diagram of an *exemplary data processor* utilized in the system of FIG. 19.

FIG. 19 — General Purpose Digital Computer System

Attention is now directed to FIG. 19 which illustrates an exemplary computer system 600 suitable for use in the airborne early warning system of FIG. 4. The system shown in FIG. 19 comprises a Hughes Aircraft Company high speed general purpose digital computer system model HM-4118 which is well suited for use in real time applications. The computer system 600 includes at least one arithmetic logic processor 610, one module of core memory 611, and four buffered input-/output channels 612. The system can be expanded to 16,384 words of core memory through the expansion of the memory module in increments of 4,096, and to 131,072 words through the addition of seven other fully expanded memory modules. The system can also be expanded to a maximum configuration including two processors, and eight buffered input/output channels. Each processor and input/output channel may have direct access to all memory modules. The two processors of a fully expanded system can be connected together to form a multi-processor configuration. While in the multi-processor configuration, each processor can operate with memory concurrently so long as each addresses a different memory module. If the same memory module is addressed by both simultaneously, a prearranged priority system services one processor ahead of the other. Although multiple modes of operation are available to a user, it will be assumed herein, for clarity of explanation, that the system 600 includes only one processor and that one input/output channel is adequate with one or more memory modules as required to meet other mission objectives.

The processor 610 is the program control unit of the computer system. It receives data words and instructions from the memory, executes the instructions, performs arithmetic and logic operations on the data, and sends the data to the memory for storage. System control of the processor is exercised with interrupt signals sent from the peripheral equipment via the buffered I/O to the processor to initiate program branching. The processor controls the peripheral equipment with external-function command words. The execution of an external function instruction causes a coded command word to be transmitted from the memory to the selected peripheral device where the word is decoded and the specified function performed. The following is a summary of the computer operational characteristics.

| OPERATION | PARALLEL ARITHMETIC |
|---|---|
| General Characteristics: | |
| Logic | Synchronous, 4 MHz clock |
| Word Length | 18 bits |
| Instructions | 60 |
| Memory | 18-bit word modules, 1 $\mu$s cycle time; maximum capacity 131,072 words |
| Input/Output | Parallel transfers over up to 8 channels of 2,000,000 words/second total |
| Number Representations | Sign and absolute magnitude |
| Arithmetic Organization | All computation assumes fixed-point binary arithmetic |
| Instruction Operation Times: | |
| Add, Subtract | 2 $\mu$s |
| Double Precision Add | 3.25 or 3.5 $\mu$s |
| Multiply | 3.5 $\mu$s |
| Divide | 6.25 $\mu$s |
| Square Root | 9 $\mu$s |
| Gray Code Conversion | 6 $\mu$s |
| Real-Time Control: | |

-Continued

| OPERATION | PARALLEL ARITHMETIC |
|---|---|
| Elapsed Time Clock | Over 2 minutes (1 ms resolution decreasing time) |
| Time of Day Clock | Over 4772 hours in 2 consecutive memory cells (1 ms resolution increasing time) |
| Sense Switches | 10 |
| Indicators | 10 general purpose (7 have pre-assigned functions) plus 3 Special (overflow, compare high, compare low) |
| Memory Protect | Memory protected on any AC line transient, automatic recover to cell zero |
| Addressing Features: | |
| Type of Address | Single address, direct or relative addressing with or without index and/or indirect addressing |
| Index Registers | 48 (4 sets of 12) |
| Indirect Addressing | Yes |

The input/output module 612 provides interface control of data input/output operations between a variety of peripheral devices and the computer. For real-time data processing applications, data input to the computer may be received from a wide range of peripheral devices such as radar, digital data links, and analog-to-digital equipment. Data output may be transmitted to a variety of devices such as displays, consoles, and data links. For normal data processing applications, devices such as a magnetic tape unit, a line printer, a card reader, a card punch, and a disc file may be used for input/output operations and secondary storage. The input/output module provides interface control of data input/output operations between the peripheral equipment and the computer, consists of one or two bidirectional, 4 channel buffers. These buffers, designated as buffer A and buffer B, are identical and independent of each other. Each buffer contains control logic for input/output data and provides routing for address and data lines between the peripheral equipment and the computer memory.

Each channel carries two kinds of information flow between the computer and the peripheral equipment; incoming data, sent through 18 input lines, and outgoing data, sent through 18 output lines. These same lines are time shared for the transfer of control information; the output lines carry I/O commands to the peripheral equipment, and the input lines carry status information to the computer. Each channel has 17 address lines that identify the memory locations in the computer to be used for the input/output operations. There are control lines provided for interrupt, data requests, data acknowledge, and external function.

Each buffered input/output (I/O) channel operation is a control loop that transmits signals between the peripheral equipment and the computer. The computer or the peripheral equipment perform the specified function and the computer transmits a control signal to terminate the operation.

The exchange of data between the computer and the peripheral equipment takes place over data lines. Input data is received from input data lines, and outgoing data is transmitted over output data lines. Address lines are provided for selecting the memory address of input or output data for each channel.

An input data transfer operation transfers one word of data from a peripheral device through the buffered I/O to a specified address in the computer memory. To accomplish the operation, the peripheral device places a data word on the input data lines and a memory address on the address lines, and activates the input request line. The buffer terminates the input data transfer operation by sending a data acknowledge signal to the peripheral device.

An output data transfer operation transfers one word of data from the computer memory through the buffered I/O on the output data lines to a peripheral device. This type of output data transfer is initiated by a peripheral device when it places a memory address on the address lines and activates the output request line. The output data transfer operation is terminated when the peripheral device receives a data acknowledge signal from the buffer indicating that the output data lines contain valid information.

To store a program, a peripheral device initiates a program-load operation by activating both a program load request line and an input request line to the buffered I/O. Functionally, the program load and the input data transfer operations are identical except that program load can be performed while buffer lockout has been established in the buffer. Each channel has provisions for a program load request line.

A channel interrupt operation transfers one word from a peripheral device to memory, interrupts the normal computer program sequence, and signals the peripheral device to inhibit further interrupt requests until the program is ready for the next interrupt operation. The peripheral device initiates an interrupt word transfer by setting the interrupt request line after it has placed an address on the address lines and an interrupt word on the input data lines. After sampling the input data lines, the computer terminates the interrupt word transfer by sending a data acknowledge signal to the peripheral device, setting an interrupt indicator in the processor, and resetting an interrupt enable line to the device. When execution of an interrupt subroutine for the device has been completed, the computer terminates the channel interrupt operation by setting the interrupt enable line. This line represents computer program readiness for interrupts and does not inhibit interrupt word transfers if requested. Use of the line to inhibit interrupt requests is a function of the peripheral device.

An external-function operation is the means of processor communication through the buffered I/O with peripheral equipment. This operation is initiated by the computer program with an external function instruction. This instruction causes the transfer of one word from computer memory through the buffered I/O on the output data lines to a peripheral device. The buffer notifies the peripheral device of the external function operation with an acknowledge signal. Normally, the output communication is a control word which instructs a peripheral device to perform an operation.

FIG. 20 — Data Processor 610

The functional units within the processor 610 shown in block diagram in FIG. 20 are as follows:

Program Counter 613

The Program Counter is an 18-bit counter holding the address of the next instruction of the program to be executed. The Program Counter is incremented by one after an instruction is fetched from memory, except for skip instructions when it is incremented by two. For transfer instructions, the contents of the Program Counter are changed to the effective address of the instruction. At the start of the DPA instruction the contents of the B register are transferred to the Program Counter for incrementing by one to gain access to the second part of the DPA operand. The Program Counter also provides the base for the operand address when the relative addressing option is employed. The Program Counter has a range of 131,072 words.

Command Register 614

The Command register is an 8-bit holding register for the instruction and augmentor codes of the instruction currently being executed. These instructions and augmentor codes are decoded and establish the proper logic controls to perform the specified operation.

Buffer Register 615

The 18-bit Buffer register is primarily a register for temporary storage of data transferred to and from memory. When the contents of index registers or clock words are modified, their new values are stored in the B register pending return storage in memory. The B register contains the effective address for all addressing operations and functions as a buffer between the memory and the other arithmetic circuits for instructions requiring an operand. The B register manipulates data for execution of some of the arithmetic instructions. A complement control is provided for gating the B register when a subtraction is to occur.

Accumulator Register 616

The A register is used for execution of all arithmetic instructions (with the exception of the right rotate Q register (RRQ instruction) and for the execution of the PIA and PAI instructions. The A register may hold an augend, minuend, an operand to be compared (either logically or algebraically) to the contents of a memory location, a multiplier, or the most significant bits of a dividend. At the conclusion of an arithmetic operation, it may hold a sum, a difference, a quotient, the most signficant bits of a product, or the result of a square root operation. In general, the contents of the A register must be interpreted in terms of the program operation which has just been performed or is about to be performed.

Quotient Register 617

The Q register functions as an extension of the A register for those instructions which require words of a length greater than 18 bits. These arithmetic operations are the DPA, MLY, DIV, and SQR instructions. The Q register is also connected as a shift register and may be used by itself or in conjunction with the A register during shift operations. During shift operations, the contents of the Q register, A register, or both are shifted at a rate of one bit per block pulse (0.25 $\mu$s) for the number of bits specified by the instructions. The input data supplied to the Q register is from the A register or the adder. Output data from the Q register is sent to the B register, A register, or memory via the interrupt and addressing circuits. Circuits are also provided for use of the Q register during console input/output operations.

Adder Network 618

The Adder network is a full 18-bit, parallel, binary adder. The network adds the selected input data to the B register data. The Adder is required during arithmetic operations, during relative addressing and indexed operations, and during updating the Program Counter, clock words, and index registers. The Adder network includes the various controls and matrices used to accomplish the required operations. Included in the Adder are the sum and carry networks. A complete 18-bit addition is performed in one clock time (0.25 microsecond).

Interrupt Register 619

The Interrupt register is an 18-bit register which controls the interrupt operation. This interrupt function occurs whenever an outside source of data desires to change the normal program sequence.

Shift Counter 620

The Shift Counter has three major functions. In shift operations it counts down the number of places to be shifted. Its initial value is obtained from the K field in a shift instruction. In multiply, divide, square root, and convert grey code operations it is used to count the number of iterations involved. During address modification it stores the R-field of the instruction.

Timing Counter 621

The Timing Counter is a 4-bit ring-type counter whose outputs control timing of all operations in the computer. The normal count sequence is advanced to the next count at each clock pulse. However, the timing counter can enter a null state before recycling when new memory data is not available. For some arithmetic operations the timing counter will deviate from the regular count sequence.

Control Unit 622

The Control Unit decodes instructions and sequences the operations necessary to carry out each instruction command. A series of microcommands are generated which direct the transfer between registers, memory access, and other fundamental tasks to complete the execution of each instruction. This Control Unit includes a 4-bit register (level counter) that indentifies and specifies the type of word being fetched or stored in memory. The outputs of the "level counter" establish initial logic conditions to perform an instruction or complete an operation cycle.

Real Time Clock 623

The Real Time Clock provides a means for programming the computer system through use of an interrupt instruction for operation with respect to real time.

Sense Indicators 624

The Sense Indicators comprise a group of 13 flip-flops which indicate the results of previous operations and the current status of the processor. As such, the contents of the Sense Indicators can provide a means of program branch control. When a flip-flop is set, the condition is detected by an appropriate branch instruction. When the flip-flop is reset, the branch instruction is ineffective in branching the program routine being executed. The functions of the Sense Indicators are reflected in the table following on the next page. In addition to the assigned functions, four instructions affect the states of the sense indicators. The reset indicators (REI) instruction resets those bits of the sense indicators specified by the N-field of the instruction word. The REI instruction affects F 1, F 2, F 4 through F 6, F 8 through F 10, and F 7 in a multisystem mode. The set indicators instruction (SEI) sets the bits of the sense indicators specified by the N-field of the instruction word. The SEI instruction affects the same flip-flops as the REI instruction. The place accumulator in indicators (PAI) instruction places the least significant bits of the A register in the sense indicators. The PAI instruction controls all sense indicators except F 1, F 3, and F 7.

SENSE INDICATOR FUNCTIONS

| Indicator | Function |
| --- | --- |
| Flag FL FH | Show the result of comparison instructions as follows:<br>FL   FH   Comparison<br>0    1    High<br>1    0    Low<br>1    1    Equal |
| Sense Indicators | Serve as program flags or branch controls |
| F 1 | Indicates the processing of an interrupt and locks out further interrupt processing. |
| F 2 | Indicates an illegal divisor, an illegal radicand during a Square Root operation, or indicates the parity of bits shifted during a Right Rotate Both instruction. |
| F 3 | Indicates that a console device is not being used. When F3 is not lit, a console input/output operation is in progress. |
| F 4 | Indicates parity error during console input/output operations. |
| F 5 | Indicate the designated index register bank (0 through 3) as follows:<br>F5   F6   Bank<br>0    0    0<br>0    1    1<br>1    0    2<br>1    1    3 |
| F 7 | Indicates that this processor has executive control of computer operations in a dual-processor system. Always lit in a single-processor computer. |
| F 8 | Programmer controlled. |
| F 9 | Programmer controlled. |
| F 10 | Programmer controlled. |
| Overflow FV | Indicates that an overflow occurred during the execution of an arithmetic instruction. |

Indicators F 1 through F 10 may be sensed by the skip on indicators (SKI) instruction. All thirteen indicators may be stored in the accumulator by the place indicators in accumulator (PIA) instruction. The transfer on overflow (TOF) instruction tests FV, and rests it if FV has been set by a previous arithmetic operation. A master clear operation will reset FV, F 2, F 4 through F 6, F 8 through F 10 and F 7 (in a Multiprocessor mode). The master clear operation sets F 1, and F 3 and does not affect FL and FH. The processor also is equipped with a group of ten sense switches which control program branches for manual operator control. The configuration of these switches may be sensed by the skip on switches (SKW) instruction.

Compare Network 625

The Compare Network permits the state of sense indicators and switches to be determined in response to an instruction "Skip on Indicators" (SKI). If indicators specified by the instruction in the buffer register 115 are on (1), one instruction is skipped. Otherwise the next instruction in sequence is taken, thus permitting a conditional branch. Set Indicator (SEI) and Reset Indicator (REI) instructions permit the indicators to be set as required. Place Indicators in Accumulator (PIA) and Place Accumulator in Indicators (PAI) are further instructions which enable the programmer to use the sense indicators referred to hereinbefore as "flags" in the flow chart.

Interrupt Network 626

The Interrupt Network provides the logic and control functions for priority interrupt. The interrupt register 619 provides an indicator for each of eighteen interrupt conditions. Each indicator is set when the corresponding condition is detected and remains set until the normal program sequence is interrupted for that condition. If more than one indicator is on, the one with highest priority will be serviced first. When the normal program sequence is interrupted, a lockout indicator (a sense indicator) is set to prevent further interruption. A Reset Indicator (REI) resets the lockout indicator after the interrupting sequence is completed.

Address Buss Selector 627

The Address Buss Selector 627 is an AND/OR network which selects the address from the program counter or the operand address as generated in the B register or the interrupt network 628 in response to a control signal by the control unit 622.

Data Buss Selector 629

The data buss selector 629 is an AND/OR gate combination that selects the output of the B register 615 or the Q register 617 in response to a control signal from the control unit 622 to pass the selected data to memory.

Address Generator 628

The Address Generator cooperates with the program counter 613 and buffer register 615 to generate addresses used through an Address Buss Selector 129 for absolute addressing, relative addressing and indirect addressing. If absolute addressing is specified, the primary address is the value specified by a particular field (Y) of the instruction plus the content of an index register specified by another field (R) of the instruction, if any is specified. If relative address is specified by the R field of the instruction, the primary address is equal to the sum of the program counter 613 plus the number specified by the Y field. Unless indirect addressing is specified by the R field, the effective address is the primary address. When indirect addressing is specified, the effective address is obtained from the word in memory specified by the primary address. If the operation code of the instruction specifies, that effective address is modified by the contents of a predetermined index register. All the index registers and necessary logic networks are contained in the address register.

Processor operation is initiated when instructions, stored in sequential locations in memory, are accessed. The memory location of an instruction to be accessed is contained in the Program Counter. The contents of the Program Counter are incremented by one after each instruction access from memory, except when the instruction is a transfer. When a transfer instruction is executed, the next instruction may be accessed from any designated memory location. If a skip operation is executed, the program counter is incremented a second time when skip conditions are met. The transfer and skip operations may be generated by branch controls such as arithmetic Overflow and Divide Check.

An additional facility provided in the processor for producing program branches is the interrupt function.

When interrupts are activated by either internal or external sources via the register 619, the normal program sequencing is inhibited. When an interrupt occurs, the contents of the Program Counter are stored temporarily and the program branches to the preassigned interrupt cell associated with the source of the interrupt.

Attached as Appendix A is a listing of a source program for the exemplary computer just described to implement the flow chart of FIGS. 12 through 18. All of the instructions of the HM-4118 computer system, from which the instructions in the source program were selected, are described in Appendix B. The source program follows the flow chart and is therefore self explanatory, i.e., there is correspondence between the flow chart and the program written in a recognized programming language for an existing computer. That source program can be entered into the HM-4118 computer system with an assembly program to obtain an object program. The manner in which that is done is described in an Appendix C titled Assembly Program.

From the foregoing it should now be recognized that an improved airborne radar system has been disclosed herein capable of providing automatic target acquisition based on multipath returns from airborne targets with the capability of changing the minimum plot quality, $Q_M$, as the sea state conditions change, and with experience in different sea states by simply altering the minimum plot quality table. The minimum plot quality is also a function of range and target height or altitude.

The exemplary embodiment described herein provides for minimum plot quality only as a function of range, but the table could be expanded to provide for minimum plot quality as a function of target height. Then using the target range and the first multipath delay time measured by the system shown, it is possible to program a subroutine that will compute target height. The altitude of the radar sensor is known or can be determined, as by an altimeter. Computed target height may then be used to enter the expanded minimum plot quality table or tables. In any case, a minimum plot quality for a low sea state may be set empirically at, for example, 310 and for a high sea state at 210. Consequently, the following claims are intended to include both arrangements.

APPENDIX A

MULTIPATH AUTO ACQUISITION (MAA)

THE MULTIPATH AUTO ACQUISITION SUBROUTINE IS CALLED BY THE ENERGY MANAGEMENT ROUTINE WHEN RETURNS ARE DETECTED ON THE SEARCH BEAM DWELLS (THERE ARE THREE DWELLS - ONE FOR EACH OF THE THREE PRF S USED ON THE SEARCH BEAM.)

INPUTS:

TARGET REPORTS FOR DWELLS 1, 2 AND 3

START LOCATIONS FOR DWELLS 1, 2 AND 3

PRECALCULATED FOLDOVER RANGE FOR DWELLS 1, 2 AND 3

OUTPUTS:

NUMBER OF AUTO ACQUISITION TRACK CANDIDATES

POINTER TO AUTO ACQUISITION TRACK CANDIDATES TABLE

AUTO ACQUISITION TRACK CANDIDATES TABLE WITH ENTRIES

SORTED INTO DESCENDING PLOT QUALITY ORDER

ROUTINE CONSTANTS:

| | | |
|---|---|---|
| RNGCL1 | DEC 1280 | DWELL 1 RANGE CELL/INTERVAL COUNT |
| RNGCL2 | DEC 1810 | DWELL 2 RANGE CELL/INTERVAL COUNT |
| RNGCL3 | DEC 2560 | DWELL 3 RANGE CELL/INTERVAL COUNT |
| MAXVAL | DEC 9720 | MAX RANGE IN RANGE CELLS |
| MAXGAT | DEC 389 | CORRELATION GATE RADIUS AT MAX RANGE |
| CORGAT | BSS 1 | CORRELATION GATE RADIUS FOR RU RANGE |
| DLTRL | DEC 972 | RANGE DELTA FOR MULTIPATH TIME DELAY |
| 017 | OCT 17 | |
| 03777 | OCT 3777 | |

ROUTINE ADDRESS CONSTANTS:

| | | |
|---|---|---|
| RTRB1 | GAD TR1 | START OF TARGET REPORT BUFFER 1 |
| RTRB2 | GAD TR2 | START OF TARGET REPORT BUFFER 2 |
| RTRB3 | GAD TR3 | START OF TARGET REPORT BUFFER 3 |
| RTRD1 | GAD TR1+9 | START OF DATA IN TARGET REPORT BUFFER 1 |
| RTRD2 | GAD TR2+9 | START OF DATA IN TARGET REPORT BUFFER 2 |
| RTRD3 | GAD TR3+9 | START OF DATA IN TARGET REPORT BUFFER 3 |
| CANDCT | GAD CAND | ADDRESS OF TRACK CANDIDATE TABLE ENTRY COUNT |
| CANDPT | GAD CAND+1 | ADDRESS OF FIRST DATA WORD IN TRACK CANDIDATE TABLE |
| CANADD | GAD CANA | ADDRESS OF TRACK CANDIDATE TABLE POINTERS |
| PTR | GAD *+1,1 | REGISTER POINTER FOR MULTIPATH LOOP |
| | GAD 4 | INDEX REGISTER 4 |
| | GAD 3 | INDEX REGISTER 3 |
| | GAD 2 | INDEX REGISTER 2 |
| TKSTAD | GAD TKST | ADDRESS OF TRACK STORE TABLE |
| TKSTCT | GAD TKCT | ADDRESS OF REPORT COUNT IN TRACK STORES |

| | | |
|---|---|---|
| MPTDAD | GAD MPTD | ADDRESS OF MULTIPATH TIME DELAY TABLE |

INTERNAL TEMPORARY STORAGE

| | | |
|---|---|---|
| XO | BSS 1 | POINTER TO DWELL 1 BUFFER |
| YO | BSS 1 | POINTER TO DWELL 2 BUFFER |
| ZO | BSS 1 | POINTER TO DWELL 3 BUFFER |
| XE | BSS 1 | DWELL 1 END OF BUFFER ADDRESS |
| YE | BSS 1 | DWELL 2 END OF BUFFER ADDRESS |
| ZE | BSS 1 | DWELL 3 END OF BUFFER ADDRESS |
| RXF | BSS 1 | DWELL 1 FOLDOVER RANGE |
| RYF | BSS 1 | DWELL 2 FOLDOVER RANGE |
| RZF | BSS 1 | DWELL 3 FOLDOVER RANGE |
| XN | BSS 1 | NUMBER OF TARGET REPORTS FOR DWELL 1 |
| YN | BSS 1 | NUMBER OF TARGET REPORTS FOR DWELL 2 |
| ZN | BSS 1 | NUMBER OF TARGET REPORTS FOR DWELL 3 |
| SAVRTN | BSS 1 | RETURN ADDRESS TEMPORARY STORAGE |
| PASS | BSS 1 | PASS INDICATOR |
| CURPLT | GAD *+1 | ADDRESS OF CURRENT PLOT INFORMATION |
| RU | BSS 1 | RANGE (AMBIGUOUS IF NEGATIVE) |
| CX | BSS 1 | DIRECT/MULTIPATH COUNT FOR DWELL 1 |
| CY | BSS 1 | DIRECT/MULTIPATH COUNT FOR DWELL 2 |
| CZ | BSS 1 | DIRECT/MULTIPATH COUNT FOR DWELL 3 |
| QP | BSS 1 | PLOT QUALITY (FUNCTION OF CX, CY AND CZ) |

```
XP       BSS 1           X POSITION OF PLOT ON TRACKING PLANE

YP       BSS 1           Y POSITION OF PLOT ON TRACKING PLANE

DRM1     BSS 1           FIRST MULTIPATH DELAY TIME DELTA

TEMP     BSS 10          RESERVE AREA FOR TEMP STORAGE

CORREL   BSS 1           CROSS CORRELATION FLAG
                             0 = NO CORRELATION
                             1 = CORRELATION

MAA000   CLA 12          SAVE RETURN ADDRESS OF RADAR ENERGY
         ADD I1
         STR SAVRTN      MANAGEMENT PROGRAM

CLA I0          SET NUMBER OF AUTOMATIC ACQUISITION
         STR*CANDCT         CANDIDATES = NONE
```

HOUSEKEEP TARGET BUFFER PARAMETERS THAT ARE USE FOR ALL DWELL PASSES.

```
         CLA RTRB1       FETCH START OF BUFFER AND START OF DATA
         LDQ RTRD1          ADDRESSES FOR DWELL 1
         STQ X0             (SET UP POINTER TO DWELL 1 DATA)
         TSX MAA900      COMPUTE COUNT AND END OF BUFFER

STR XE          SET UP END OF BUFFER ADDRESS AND
         STQ XN             TARGET COUNT FOR DWELL 1

CLA RNGCL1      SET UP DWELL 1 FOLDOVER RANGE
         STR RXF
```

```
        CLA RTRB2    FETCH START OF BUFFER AND START OF DATA
        LDQ RTRD2      ADDRESSES FOR DWELL 2
        STQ YO         (SET UP POINTER TO DWELL 2 DATA)
        TSX MAA900   COMPUTE COUNT AND END OF BUFFER

STR YE       SET UP END OF BUFFER ADDRESS AND
        STQ YN         TARGET COUNT FOR DWELL 2

CLA RNGCL2   SET UP DWELL 2 FOLDOVER RANGE
        STR RYF

CLA RTRB3    FETCH START OF BUFFER AND START OF DATA
        LDQ RTRD2      ADDRESSES FOR DWELL 3
        STQ ZO         (SET UP POINTER TO DWELL 3 DATA)
        TSX MAA900   COMPUTE COUNT AND END OF BUFFER

STR ZE       SET UP END BUFFER ADDRESS AND
        STQ ZN         TARGET COUNT FOR DWELL 3

CLA RNGCL3   SET UP DWELL 3 FOLDOVER RANGE
        STR RZF

BASIC INITIALIZATION IS COMPLETE.  BEGIN DWELL PROCESSING

CLA XN       DWELL 1 = NO RETURNS ?
        TRZ MAA010     YES, CHECK DWELL 2
        CLA I1         NO, PROCESS DWELL 1 RETURNS
        STR PASS     SET PASS = 1

CLA XO       SET X (REGISTER 2) = XO (POINTER TO
        STR 2          DWELL 1 DATA)
```

```
            TRU MAA030    BRANCH TO PROCESSING AREA

MAA010  CLA YN          DWELL 2 = NO RETURNS ?

TRZ MAA020         YES, CHECK DWELL 3

CLA I2             NO, PROCESS DWELL 2 RETURNS

STR PASS        SET PASS = 2

CLA YO          SET XO = POINTER TO DWELL 2 BUFFER

STR XO

CLA ZO          SET YO = POINTER TO DWELL 3 BUFFER

STR YO

CLA I0          SET ZO = NULL

STR ZO

CLA YE          SET XE = DWELL 2 END OF BUFFER

STR XE

CLA ZE          SET YE = DWELL 3 END OF BUFFER

STR YE

CLA I0          SET ZE = NULL

STR ZE

CLA RNGCL2      SET RXF = DWELL 2 FOLDOVER

STR RXF

CLA RNGCL3      SET RYF = DWELL 3 FOLDOVER

STR RYF

CLA I0          SET RZF = NULL

STR RZF

CLA XO          SET X (REGISTER 2) = XO (POINTER TO
        STR 2               DWELL 2 DATA)

TRU MAA030      BRANCH TO PROCESSING AREA
```

```
MAA020    CLA ZN        DWELL 3 = NO RETURNS ?
          TRZ MAA040       YES, BRANCH TO EXIT PROCESSING
          CLA I3        SET PASS = 3
          STR PASS

CLA YN        WERE THERE ANY DWELL 2 PROCESS FUNCTIONS
                        PERFORMED??
          TRZ MAA023    NO
```

IF PASS 2 FUNCTIONS WERE PERFORMED, DATA TO BE MOVED TO THE "X" AREAS WILL BE LOCATED IN THE "Y" AREAS.

```
          CLA YO        SET XO = POINTER TO DWELL 3 BUFFER
          STR XO

CLA YE        SET XE = DWELL 3 END OF BUFFER
          STR XE
          TRU MAA025    BRANCH TO NULL SET
```

IF PASS 2 FUNCTIONS WERE NOT PERFORMED, DATA TO BE MOVED TO THE "X" AREAS WILL BE LOCATED IN THE "Z" AREAS.

```
MAA023    CLA ZO        SET XO = POINTER TO DWELL 3 BUFFER
          STR XO
          CLA ZE        SET XE = DWELL 3 END OF BUFFER
          STR XE

MAA025    CLA RNGCL3    SET RXF = DWELL 3 FOLDOVER
          STR RXF
```

```
        CLA I0
        STR Y0          SET Y0 AND Z0 = NULL
        STR Z0
        STR YE          SET YE AND ZE = NULL
        STR XE
        STR RYF         SET RYF AND RZF = NULL
        STR RZF

CLA X0          SET X (REGISTER 2) = X0 (POINTER TO
        STR 2              DWELL 3 DATA)
        TRU MAA030      BRANCH TO PROCESSING AREA

MAA030  CLA 0,2         CHECK PROCESS FLAG (BIT ZERO OF RANGE)
                           IS RX PROCESSED?
        TRN *+2            YES, CHECK FOR END OF TABLE
        TRU MAA100         NO, PROCESS THIS REPORT

INX 2,2         SET X TO NEXT DWELL X RETURN
        CLA 2           END OF DWELL X TABLE ?
        CMA XE             (X > XE)
        TRH *+2            YES, CHECK PASS
        TRU MAA030         NO, CHECK NEXT REPORT

CLA PASS
        ADD I1          PASS = PASS + 1
        STR PASS

CMA I3          PASS = 2 ?
```

```
        TRL MAA010     YES, PROCESS FOR PASS 2

PASS = 3 ?

TRE MAA020     YES, PROCESS FOR PASS 3

MAA040  CLA*CANDCT     AUTOMATIC ACQUISITION CANDIDATES = NONE ?

TRZ*SAVRTN        YES, RETURN WITH A-REGISTER = ZERO

TSX MAA800     CALL SORT ROUTINE TO SEQUENCE TRACK

CANDIDATES IN ORDER OF PREFERENCE (HIGHEST PLOT QUALITY TO LOWEST)

CLA*CANDCT     LOAD A-REGISTER WITH COUNT OF VERIFY

TARGETS

LDQ CANADD     LOAD Q-REGISTER WITH ADDRESS OF TARGET

ENTRY POINTER TABLE

TRU*SAVRTN     RETURN TO RADAR ENERGY MANAGEMENT

MAA100  TSX**+1        CALL RRA TO RESOLVE RANGE AMBIGUITY IF

GAD RRA000        POSSIBLE

TSX**+1        CALL FMD TO CALCULATE FIRST MULTIPATH

GAD FMD000        DELAY

TSX**+1        CALL MDC TO DETECT AND COUNT MULTIPATH

GAD MDC000        RETURNS

TSX**+1        CALL CCS TO CROSS CORRELATE THIS PLOT

GAD CCS000        VS. TRACK STORES

CLA CORREL     DID THE TRACK CORRELATE WITH AN EXISTING

TRACK ?
```

```
        TRZ MAA030        YES, BYPASS AUTO-ACQUISITION CHECK

TSX**+1           CALL AAQ TO CHECK AUTO-ACQUISITION
        GAD AAQ000           QUALITY

TRU MAA030        RETURN TO CHECK NEXT REPORT
```

MAA800 SORTS THE TRACK CANDIDATES IN ORDER OF HIGHEST PLOT QUALITY. SINCE THE TRACK CANDIDATE TABLE COULD CONTAIN AS MANY AS 63 PLOTS, AND EACH ENTRY IN THE TABLE CONTAINS 4 WORDS, THE NORMAL EXCHANGE SORT WOULD BE TIME CONSUMING. THE METHOD CHOSEN IS A SEMI-EXCHANGE SORT THAT EXCHANGES POINTERS TO THE ENTRIES RATHER THAN THE ENTRIES THEMSELVES.

```
MAA800  CLA*CANDCT       FETCH COUNT OF ENTRIES IN TRACK
        CMA I2              CANDIDATE TABLE
        TRL MAA850       IF ONLY 1 TARGET, NO SORT REQUIRED

SUB I1           USE REPORT COUNT-1 FOR LOOP COUNTER TO
        STR 1               SET UP POINTER TABLE (REGISTER 1)
        CLA CANADD       SET UP POINTER TO TRACK CANDIDATE
        STR 2               ADDRESS TABLE (REGISTER 2)
        CLA CANDPT
        STR 0,2          STORE ADDRESS OF ENTRY INTO ADDRESS
        INX 1,2             TABLE AND BUMP ADDRESS TABLE POINTER
        ADD I4           INCREMENT ENTRY ADDRESS TO NEXT ENTRY
        TRX *-3,1        LOOP FOR ALL TARGETS
```

```
MAA810   CLA*CANDCT    FETCH COUNT OF ENTRIES IN TRACK
         SUB I2            CANDIDATE TABLE
         STR 4         USE COUNT-2 FOR LOOP COUNTER THROUGH
                           SORT (REGISTER 4)
         CLA CANADD    SET POINTER TO TABLE OF TRACK CANDIDATE
         STR 3             ADDRESSES (REGISTER 3)

CLA I0        SET EXCHANGE FLAG = NONE
         STR CHNGER

MAA820   CLA 0,3       SET POINTER TO AN ENTRY IN "TC" TABLE
         STR 1             FROM "TC" ADDRESS TABLE (REGISTER 1)
         CLA 1,3       SET POINTER TO AN ENTRY+1 IN "TC" TABLE
         STR 2             FROM "TC" ADDRESS TABLE (REGISTER 2)

CLA 3,1       COMPARE PLOT QUALITY FROM ENTRY TO
         CMA 3,2           ENTRY+1
         TRL MAA840    IF LOWER, EXCHANGE ENTRY POINTERS

MAA830   INX 1,3       BUMP ADDRESS TABLE POINTER AND BRANCH
         TRX MAA820,4  BACK TO COMPARE ALL ENTRIES

CLA CHNGER    IF PASS COMPLETED WITHOUT CHANGING AN
                           ENTRY
         TRZ 0,12          RETURN, SORT COMPLETE

TRU MAA810    OTHERWISE REPEAT PROCESS
```

```
MAA840   CLA 0,3        EXCHANGE POINTERS IN "TC" ADDRESS TABLE
         LDQ 1,3          SO THAT FIRST ADDRESS ALWAYS POINTS
         STR 1,3          TO THE ENTRY WITH THE HIGHEST PLOT
         STQ 0,3          QUALITY
         STR CHNGER     SET EXCHANGE FLAG AND BRANCH TO
         TRU MAA830       CHECK NEXT ENTRY

MAA850   CLA CANDPT     IF ONLY 1 REPORT IN TRACK CANDIDATE
         STR*CANADD       TABLE, SET ADDRESS POINTER TO FIRST
         TRU 0,12         PLOT AND RETURN

CHNGER   BSS 1          EXCHANGE FLAG FOR SORT
```

MAA900 COMPUTES THE NUMBER OF TARGET REPORTS THAT CAME IN DURING A DWELL PERIOD AND THE "END OF BUFFER" ADDRESS FOR THAT DWELL.

INPUTS:

A-REGISTER = BUFFER ADDRESS

Q-REGISTER = START OF DATA ADDRESS

OUTPUTS:

A-REGISTER = END OF BUFFER ADDRESS

Q-REGISTER = TARGET REPORT COUNT

INTERNAL TEMPORARY STORAGE:

SAV001   BSS 1

ROUTINE CONSTANTS:

I1       DEC 1

```
I3       DEC 3

O77      OCT 000077

MAA900   STR 1            SAVE START ADDRESS OF REPORT HEADER

STQ 2            SAVE START ADDRESS OF DATA

CLA 2,1          FETCH HEADER WORD CONTAINING TARGET

RSA 3               REPORT COUNT

LGM O77          SHIFT AND MASK OUT JUNK BITS

STR SAV001       SAVE

COMPUTE "END OF BUFFER ADDRESS"

MLY I3

XCA              ((COUNT * 3) + START) - 1

ADD 2

SUB I1           "END OF BUFFER" ADDRESS IN A-REGISTER

LDQ SAV001       REPORT COUNT IN Q-REGISTER

TRU 0,12         RETURN

RRA000   CLA I1           INITIALIZE PRIMARY/MULTIPATH COUNTERS

STR CX

CLA I0

STR CY

STR CZ

CLA PASS
```

```
          CMA I3          PASS = 3 ?
          TRE RRA040         YES

RRA010    CLA YO          SET UP POINTER TO DATA FOR NEXT DWELL
          STR 3
RRA011    CMA YE          END OF BUFFER ?
          TRH RRA030         YES, CHECK NEXT DWELL
          CLA 0,3         HAS THIS REPORT BEEN PROCESSED ?
          TRN RRA013         YES, CHECK NEXT REPORT
          TRU RRA015         NO, COMPARE THIS REPORT

RRA013    INX 2,3         BUMP POINTER TO NEXT REPORT AND
          CLA 3              CHECK FOR END OF BUFFER
          TRU RRA011

RRA015    STR TEMP+3      SAVE RANGE OF REPORT TO BE USED
                              (RY)

CLA 0,2
RRA017    STR TEMP+2      SAVE RANGE OF REPORT TO BE USED
                              (RX)
          CMA MAXVAL      IF RANGE > MAXIMUM ALLOWABLE,
          TRH RRA013         BRANCH TO CHECK NEXT REPORT

RRA 018   CLA TEMP+3
          ADD TOL
          CMA TEMP+2      DOES RX = RY + TOLERANCE ?
          TRE RRA019         YES
```

```
        TRL *+7          DOES RX < RY + TOLERANCE

CLA TEMP+3          NO

ADD RYF          CHECK NEXT RY FOLDOVER RANGE

STR TEMP+3

CMA MAXVAL       GREATER THAN MAX RANGE

TRH RRA013          YES, NO MATCH THIS RY RETURN

TRU RRA017          NO, TRY AGAIN

CLA TEMP+3

SUB TOL

CMA TEMP+2       DOES RX = RY - TOLERANCE ?

TRE RRA019          YES

TRH RRA019       RY - TOL < RX < RY + TOL

CLA TEMP+2       CHECK NEXT RX FOLDOVER RANGE

ADD RXF          RX = RX + RXF

TRU RRA017

RRA019  CLA TEMP+2       RU = RX + NX(RXF)

STR RU

CLA I1           SET PRIMARY FLAG FOR DWELL 2

STR CY

CLA 0,2

CSA

STR 0,2          SET RX AND RY = PROCESSED

CLA 0,3

CSA

STR 0,3
```

```
RRA020   CLA ZO         ZO = NULL ? (PASS 2)
         TRZ 1,12         YES, RETURN

STR 4          SET UP POINTER TO DATA FOR NEXT DWELL
RRA021   CMA ZE         END OF BUFFER ?
         TRH 1,12         YES, EXIT

CLA 0,4        HAS THIS REPORT BEEN PROCESSED ?
         TRN RRA023       YES, CHECK NEXT REPORT
         TRU RRA025       NO, COMPARE THIS REPORT

RRA023   INX 2,4        BUMP POINTER TO NEXT REPORT AND
         CLA 4          CHECK FOR END OF BUFFER
         TRU RRA021

RRA025   STR TEMP+4     SAVE RANGE OF REPORT TO BE USED
                            (RZ)
         CMA MAXVAL     IF RANGE > MAXIMUM ALLOWABLE
         TRH RRA023        BRANCH TO CHECK NEXT REPORT

CLA TEMP+4
         ADD TOL        RU = RZ + TOLERANCE ?
         CMA RU
         TRE RRA027       YES
         TRL *+2        DOES RU < RZ + TOL
         TRU RRA023       NO, NO MATCH THIS RZ RETURN
         CLA TEMP+4
         SUB TOL        RU = RZ - TOLERANCE ?
```

```
        CMA RU

TRE RRA027      YES

TRH RRA027      RZ - TOL < RU < RZ + TOL

CLA TEMP+4      CHECK THE NEXT RZ FOLDOVER RANGE

ADD RZF         RZ = RZ + RZF

TRU RRA025

RRA027  CLA I1          SET PRIMARY FLAG FOR DWELL 3

STR CZ

CLA 0,4

CSA             SET RZ = PROCESSED

STR 0,4

TRU 1,12           RETURN

RRA030  CLA ZO          ZO = NULL ? (PASS 2)

TRZ RRA040         YES

STR 4           SET UP POINTER TO DATA FOR NEXT DWELL

RRA031  CMA ZE          END OF BUFFER ?

TRH RRA040         YES, EXIT

CLA 0,4         HAS THIS REPORT BEEN PROCESSED ?

TRN RRA033         YES, CHECK NEXT REPORT

TRU RRA035         NO, COMPARE THIS REPORT

RRA033  INX 2,4         BUMP POINTER TO NEXT REPORT AND

CLA 4              CHECK FOR END OF BUFFER

TRU RRA031
```

| | | |
|---|---|---|
| RRA035 | STR TEMP+4 | SAVE RANGE OF REPORT TO BE USED (RZ) |
| | CLA 0,2 | |
| RRA037 | STR TEMP+2 | SAVE RANGE OF REPORT TO BE USED (RX) |
| | CMA MAXVAL | IF RANGE > MAXIMUM ALLOWABLE |
| | TRH RRA033 | BRANCH TO CHECK NEXT REPORT |
| RRA038 | CLA TEMP+4 | |
| | ADD TOL | |
| | CMA TEMP+2 | RX = RZ + TOLERANCE ? |
| | TRE RRA039 | YES |
| | TRL *+7 | DOES RX < RZ + TOL |
| | CLA TEMP+4 | NO |
| | ADD RZF | CHECK NEXT RZ FOLDOVER RANGE |
| | STR TEMP+4 | |
| | CMA MAXVAL | GREATER THAN MAX RANGE |
| | TRH RRA033 | YES, NO MATCH THIS RZ RETURN |
| | TRU RRA038 | NO, TRY AGAIN |
| | CLA TEMP+4 | |
| | SUB TOL | |
| | CMA TEMP+2 | RX = RZ - TOLERANCE ? |
| | TRE RRA039 | YES |
| | TRH RRA039 | RZ - TOL < RX < RZ + TOL |
| CLA TEMP+2 | | CHECK NEXT RX FOLDOVER RANGE |
| | ADD RXF | RX = RX + RXF |
| | TRU RRA037 | |

```
RRA039   CLA TEMP+2      RU = RX + NX(RXF)

STR RU

CLA I1           SET PRIMARY FLAG FOR DWELL 3

STR CZ

CLA 0,2

CSA              SET RX = PROCESSED

STR 0,2

CLA 0,4

CSA              SET RZ = PROCESSED

STR 0,4

TRU 1,12         RETURN

RRA040   CLA 0,2

CSA              RU = RX (AMBIGUOUS)

STR RU

TRU 1,12         RETURN
```

FMD000 CALCULATES THE MAXIMUM TIME DELAY FOR A GIVEN RANGE. THIS IS ACCOMPLISHED BY DIVIDING THE RANGE BY A DELTA RANGE AND USING THE QUOTIENT TO INDEX A TABLE CONTAINING THE MAXIMUM TIME DELAY.

```
FMD000   CLA I0           CLEAR A-REGISTER

LDQ RU           LOAD Q-REGISTER WITH RANGE WORD

RSB 0            (INSURE DIVIDEND IS POSITIVE)

DIV DLTRL        COMPUTE ADDRESS OF TIME DELAY

ADD MPTDAD

STR TEMP+1       ADDRESS = (RU / DLTRL) + MPTDAD
```

```
CLA*TEMP+1      FETCH CONTENTS OF COMPUTED ADDRESS
STR DRM1        AND SAVE FOR MULTIPATH DETECTION
TRU 1,12        RETURN
```

MDC000 DETECTS AND COUNTS MULTIPATH RETURNS FOR ALL 3 DWELLS OF A SEARCH BEAM. TO BE CONSIDERED A MULTIPATH RETURN, THE REPORT UNDER INVESTIGATION MUST PASS THE FOLLOWING TESTS

1. THE TIME DELAY BETWEEN THE PRIMARY RETURN AND THE FIRST MULTIPATH MUST BE EQUAL TO OR LESS THAN A "WORST CASE" VALUE DEPENDING ON TARGET RANGE.

2. THE TIME DELAY BETWEEN THE PRIMARY RETURN AND THE SECOND MULTIPATH MUST BE EQUAL TO TWICE THE FIRST MULTIPATH DELAY + OR - 1 CELL.

3. THE FILTER NUMBER FOR THE FIRST OR SECOND MULTIPATH RETURN MUST BE EQUAL TO OR 1 LESS THAN THE FILTER NUMBER FOR THE PRIMARY RETURN.

```
MDC000  CLA 12          SAVE RETURN ADDRESS TO MAIN PROGRAM
        ADD I1
        STR TEMP+0
        CLA I2          SET COUNTER TO LOOP FOR 3 DWELLS
        STR 1
        CLA CURPLT      SET UP A POINTER TO THE CURRENT PLOT
        STR 7              INFORMATION
MDC010  CLA*PTR         SET UP A POINTER TO THE CURRENT PRIMARY
        STR 5              REPORT
        ADD I3          SET UP A POINTER TO THE NEXT AVAILABLE
        STR 6              REPORT IN THE REPORT BUFFER
```

```
         TSX MDC100      CALL FIRST INNER LOOP TO PROCESS THIS
                             DWELL
         INX 1,7         BUMP POINTER TO CURRENT PLOT INFORMATION
         TRX MDC010,1    LOOP FOR 3 DWELLS

TRU*TEMP+0      RETURN

MDC100   CLA 12          SAVE RETURN ADDRESS OF OUTER LOOP
         STR TEMP+1
MDC110   TSX MDC900      CHECK FOR END OF BUFFER
                             IF END OF BUFFER, MDC900 AUTOMATICALLY
                             RETURNS TO OUTER LOOP
         CLA 1,7         WAS THERE A PRIMARY FOUND ON THIS DWELL ?
         TRZ*TEMP+1      NO, RETURN TO CHECK NEXT DWELL

CLA 0,6         HAS THIS REPORT ALREADY BEEN PROCESSED ?
         TRN MDC113         YES, INCREMENT
         TRU MDC120         NO, CHECK FOR MULTIPATH

MDC113   INX 2,6         BUMP POINTER TO NEXT ENTRY AND
         TRU MDC110         RETURN TO CHECK FOR END OF BUFFER

MDC120   SUB 0,5         COMPUTE RIM1 - RI < OR = DRM1
         SAP                IF DIFFERENCE IS > DELTA, NO CHANCE
         CMA DRM1           FOR FIRST MULTIPATH SO
         TRH*TEMP+1         RETURN TO OUTER LOOP

LSA 1           COMPUTE 2(RIM1 - RI) AND SAVE FOR
```

```
         STR TEMP+2       SECOND MULTIPATH CHECK
         TSX MDC700       TEST FOR FILTER MATCH
         TRU MDC123       RETURN + 0 = FILTER MATCH
         TRU MDC113       RETURN + 1 = NO MATCH

MDC123   TSX MDC800       SET THIS REPORT = PROCESSED
                            FIRST MULTIPATH FOUND
MDC125   INX 2,6          BUMP POINTER TO NEXT ENTRY AND
         TSX MDC900         CHECK FOR END OF BUFFER

CLA 0,6          HAS THIS REPORT ALREADY BEEN PROCESSED ?
         TRN MDC125         YES, INCREMENT
         SUB 0,5
         SAP              ABSOLUTE VALUE (RIM2 - RI)
         STR TEMP+4         SAVE
         CLA TEMP+2       GET 2(RIM1 - RI)
         ADD TOL
         CMA TEMP+4       (RIM2 - RI) > 2(RIM1 - RI) + TOL
         TRH*TEMP+1         YES, NO 2ND MULTIPATH
         CLA TEMP+2
         SUB TOL
         CMA TEMP+4       (RIM2 - RI) < 2(RIM1 - RI) - TOL
         TRL MDC125         YES, TRY NEXT RETURN

MDC127   TSX MDC700       CHECK FOR FILTER MATCH
         TRU MDC129         FILTER MATCH
         TRU MDC125       NO MATCH, TRY NEXT RETURN
```

```
MDC129   TSX MDC800      SET THIS REPORT = PROCESSED
                           SECOND MULTIPATH FOUND

TRU*TEMP+1      RETURN TO OUTER LOOP

MDC700   CLA 1,5         SAVE FILTER NUMBER OF PRIMARY TARGET

LGM 017

STR TEMP+3

CLA 1,6         COMPARE TO FILTER NUMBER OF POSSIBLE

LGM 017            MULTIPATH TARGET

CMA TEMP+3

TRE 0,12        MATCH

SUB I1

CMA TEMP+3      CHECK FOR TOLERANCE

TRE 0,12           MATCH

TRU 1,12           NO MATCH

MDC800   CLA 1,7         INCREMENT MULTIPATH COUNTER FOR THIS

ADD I1             DWELL

STR 1,7

CLA 0,6         SET PROCESSED FLAG

CSA

STR 0,6

TRU 0,12        RETURN

MDC900   CLA 6           CHECK MULTIPATH POINTER FOR END OF

CMA 3,7            BUFFER

TRH*TEMP+1      IF END, EXIT TO OUTER LOOP

TRU 0,12           OTHERWISE RETURN
```

CCS000 CROSS CORRELATES THE PLOT UNDER INVESTIGATION AGAINST THE TRACKS CURRENTLY IN THE TRACK STORE TABLE. IF A SEARCH TARGET CORRELATES WITH A KNOWN TRACK, THE PLOT IS IGNORED. IF NO CORRELATION OCCURS, THE PLOT IS ENTERED INTO THE TRACK CANDIDATE TABLE BY A CALL TO THE AUTOMATIC ACQUISITION ROUTINE, AAQ000.

```
CCS000   CLA 12         SAVE RETURN ADDRESS
         STR TEMP+0
         CLA I0         RESET TRACT CORRELATION FLAG
         STR CORREL
         CLA RU         SET UP INPUT PARAM FOR RANGE, AZ
         SAP               TO DISPLAY X,Y SUBROUTINE
         XCA            Q-REG = RANGE
         CLA*RTRB1
         LGM 03777      ACC = AZIMUTH
         TSX LIS        SAVE REGISTERS
         TSX CONVTK        CALL SYSTEM SUBROUTINE TO CONVERT
                           XP AND YP
         TSX LIR        RESTORE REGISTERS

STR XP         SAVE CONVERTED XP AND
         STQ YP            YP

CLA RU         IS RANGE AMBIGUOUS ?
         TRN CCS030        YES, SET FLAG = NO CORRELATION
         MLY MAXGAT     CALCULATE CORRELATION GATE RADIUS
         DIV MAXVAL        FOR THIS RU RANGE
         STR CORGAT        SAVE
```

```
         CLA TKSTAD      SAVE ADDRESS OF TRACK STORE FOR
         STR 5              CORRELATION CHECK

CLA*TKSTCT      USE COUNT -1 FOR LOOP THROUGH TRACK
         SUB I1             STORE TABLE
         STR 6

CCS010   CLA 0,5
         SUB XP
         SAP             COMPARE XP:XT + OR - TOLERANCE
         CMA CORGAT      DOES X POSITION CORRELATE
         TRH CCS020         FAIL

CLA 1,5
         SUB YP
         SAP             COMPARE YP:YT + OR - TOLERANCE
         CMA CORGAT      DOES Y POSITION CORRELATE
         TRH CCS020         FAIL

CLA I1
         STR CORREL      SET FLAG = CORRELATION
         TRU*TEMP+0         RETURN

CCS020   INX 5,5         BUMP TRACK STORE POINTER TO NEXT ENTRY
         TRX CCS010,6      LOOP FOR ALL TRACKS
                         IF ALL CHECKED AND NO MATCH
CCS030   CLA I0
         STR CORREL      SET FLAG = NO CORRELATION AND
         TRU*TEMP+0         RETURN
```

CCS000 CROSS CORRELATES THE PLOT UNDER INVESTIGATION AGAINST
THE TRACKS CURRENTLY IN THE TRACK STORE TABLE. IF A SEARCH
TARGET CORRELATES WITH A KNOWN TRACK, THE PLOT IS IGNORED.
IF NO CORRELATION OCCURS, THE PLOT IS ENTERED INTO THE TRACK
CANDIDATE TABLE BY A CALL TO THE AUTOMATIC ACQUISITION ROUTINE,
AAQ000.

```
AAQ000   INX 1,12

CLA 12           SAVE RETURN ADDRESS TO MAIN
         STR TEMP+0          PROGRAM

CLA CX           SET UP MULTIPATH COUNTS FOR
         STR TEMP+2          PLOT QUALITY COMPUTATION
         CLA CY
         STR TEMP+3
         CLA CZ
         STR TEMP+4

TSX AAQ900       CALCULATE PLOT QUALITY (QP)
         CLA TKSTCT       IS TRACK STORE TABLE FULL ?
         CMA MXTKST
         TRE AAQ010          YES, BRANCH TO DISPLAY SET-UP

CLA SEASTE       SEA STATE = HIGH ?
         CMA I1
         TRH AAQ010          YES, BRANCH TO DISPLAY SET-UP

ADD SSTADR       COMPUTE ADDRESS OF SEA STATE/RANGE TABLE
         STR TEMP+1          ADDRESS
         CLA*TEMP+1
         STR 6            SAVE IN REGISTER 6
```

```
           CLA  I0
           LDQ  RU          COMPUTE ENTRY INTO SEA STATE/RANGE
           RSB  0              TABLE
           DIV  DLTRL
           ADD  6
           STR  6           SAVE IN REGISTER 6

CLA  0,6         QP > OR = QM ?
           CMA  QP
           TRL  AAQ020         YES

AAQ010     CLA  XP          INPUT PARAM, ACC = X OF PLOT
           LDQ  YP             Q-REG = Y OF PLOT
           TSX**+1          CALL DISPLAY ROUTINE FOR POSSIBLE
           GAD  DISPL1         MANUAL INITIALIZATION OF THIS TRACK
           TRU*TEMP+0          RETURN

SET UP ENTRY INTO TRACK CANDIDATE TABLE
AAQ020     CLA*CANDCT      CALCULATE ADDRESS IN TRACK CANDIDATE
           MLY  I4         TABLE FOR THIS NEW CANDIDATE
           XCA
           ADD  CANDPT
           STR  6             SAVE IN INDEX 6
           CLA*CANDCT      UPDATE NUMBER OF TRACK CANDIDATES COUNT
           ADD  I1
           STR*CANDCT

CLA*RTRB1
           LGM  03777      EXTRACT AND STORE AZIMUTH FOR THIS RETURN
           TSX**+1         COMPUTE AZIMUTH ANGLE IN DEGREES
```

```
         GAD ARCSIN

STR 0,6

CLA RU         STORE RANGE INTO CANDIDATE TABLE

STR 1,6

CLA RTRB1      SAVE ADDRESS OF FIRST REPORT BUFFER
         STR 7             TO FIND PRF OF HIGHEST COUNT

CLA PASS       IF PASS = 1, CHECK DWELLS X,Y AND Z.
         CMA I2            CX = DWELL X (1)
         TRL AAQ023        CY = DWELL Y (2)
                           CZ = DWELL Z (3)

INX 132,7      IF PASS = 2, CHECK DWELLS Y AND Z ONLY.
         TRE AAQ023        CX = DWELL Y (2)
                           CY = DWELL Z (3)

INX 132,7      IF PASS = 3, NO CHECK REQUIRED.
         TRU AAQ025        USE DWELL Z ONLY.
                           CX = DWELL Z (3)

AAQ023   CLA QP

RSA 6          SAVE PLOT QUALITY (HIGHEST COUNT)
         STR TEMP+2

RSA 6

STR TEMP+2     COMPARE CX, CY AND CZ TO PLOT QUALITY
         CLA CX            TO FIND DWELL WITH HIGHEST COUNT
         CMA TEMP+2
         TRE AAQ025
         INX 132,7      NOT DWELL X, CHECK DWELL Y
         CLA CY
         CMA TEMP+2
         TRE AAQ025
         INX 132,7      NOT DWELL Y, MUST BE DWELL Z
```

```
AAQ025   CLA 8,7        FETCH "PRF" WORD FROM REPORT HEADER

LGM 07777         MASK

STR 2,6        STORE IN CANDIDATE TABLE

CLA QP         STORE PLOT QUALITY

STR 3,6

TRU*TEMP+0     RETURN

AAQ900   CLA 12         SAVE RETURN ADDRESS

STR TEMP+1

AAQ910   CLA I0         USE TEMPORARY REGISTER FOR EXCHANGE

STR TEMP+5        FLAG

CLA TEMP+2     COMPARE MULTIPATH COUNTS FOR

LDQ TEMP+3        2 DWELLS

CMA TEMP+3

TRH AAQ920     IF FIRST DWELL IS < OR = SECOND

TSX AAQ980        BRANCH TO EXCHANGE

AAQ920   CLA TEMP+3

LDQ TEMP+4

CMA TEMP+4

TRH AAQ930

TSX AAQ990

AAQ930   CLA TEMP+5     WAS THERE AN EXCHANGE MADE ?

TRZ AAQ940        NO, PREPARE TO EXIT
```

```
        TRU AAQ910

AAQ940  CLA TEMP+2       MERGE MULTIPATH COUNTS TO
        LSA 3                FORM PLOT QUALITY
        LGA TEMP+3
        LSA 3
        LGA TEMP+4
        STR QP           SAVE AND
        TRU*TEMP+1         RETURN

AAQ980  STR TEMP+3
        STQ TEMP+2       EXCHANGE FIRST AND SECOND ENTRIES
        CLA I1              IN TEMP
        STR TEMP+5       SET EXCHANGE FLAG
        TRU 0,12            RETURN

AAQ990  STR TEMP+4
        STQ TEMP+3       EXCHANGE SECOND AND THIRD ENTRIES
        CLA I1              IN TEMP
        STR TEMP+5       SET EXCHANGE FLAG
        TRU 0,12            RETURN

SSTADR  GAD*+1

GAD SST1         SEA STATE TABLE 1 (LOW)
        GAD SST2          *    *    *    2 (MED)
```

LOW SEA STATE

| | | |
|---|---|---|
| SST1 | OCT 110 | MINIMUM QUAL FOR RANGE 000 - 019 |
| | OCT 110 | MINIMUM QUAL FOR RANGE 020 - 039 |
| | OCT 210 | MINIMUM QUAL FOR RANGE 040 - 059 |
| | OCT 210 | MINIMUM QUAL FOR RANGE 060 - 079 |
| | OCT 210 | MINIMUM QUAL FOR RANGE 080 - 099 |
| | OCT 300 | MINIMUM QUAL FOR RANGE 100 - 119 |
| | OCT 300 | MINIMUM QUAL FOR RANGE 120 - 139 |
| | OCT 300 | MINIMUM QUAL FOR RANGE 140 - 159 |
| | OCT 210 | MINIMUM QUAL FOR RANGE 160 - 179 |
| | OCT 210 | MINIMUM QUAL FOR RANGE 180 - 199 |
| | OCT 210 | MINIMUM QUAL FOR RANGE 200 - 219 |

MEDIUM SEA STATE

| | | |
|---|---|---|
| SST2 | OCT 110 | MINIMUM QUAL FOR RANGE 000 - 019 |
| | OCT 110 | MINIMUM QUAL FOR RANGE 020 - 039 |
| | OCT 110 | MINIMUM QUAL FOR RANGE 040 - 059 |
| | OCT 110 | MINIMUM QUAL FOR RANGE 060 - 079 |
| | OCT 210 | MINIMUM QUAL FOR RANGE 080 - 099 |
| | OCT 210 | MINIMUM QUAL FOR RANGE 100 - 119 |
| | OCT 210 | MINIMUM QUAL FOR RANGE 120 - 139 |
| | OCT 210 | MINIMUM QUAL FOR RANGE 140 - 159 |
| | OCT 210 | MINIMUM QUAL FOR RANGE 160 - 179 |
| | OCT 110 | MINIMUM QUAL FOR RANGE 180 - 199 |
| | OCT 110 | MINIMUM QUAL FOR RAGNE 200 - 219 |

MAXIMUM FIRST MULTIPATH TIME DELAY (VALUES ARE IN RANGE CELLS)

| MPTDAD | GAD | MPTD | | | | |
|---|---|---|---|---|---|---|
| MPTD | DEC | 111 | 20 - 29 MILES | = | 27.69 | MICROSECONDS |
| | DEC | 78 | 30 - 39 MILES | = | 19.44 | MICROSECONDS |
| | DEC | 59 | 40 - 49 MILES | = | 14.82 | MICROSECONDS |
| | DEC | 48 | 50 - 59 MILES | = | 11.90 | MICROSECONDS |
| | DEC | 40 | 60 - 69 MILES | = | 9.89 | MICROSECONDS |
| | DEC | 34 | 70 - 79 MILES | = | 8.43 | MICROSECONDS |
| | DEC | 29 | 80 - 89 MILES | = | 7.31 | MICROSECONDS |
| | DEC | 26 | 90 - 99 MILES | = | 6.43 | MICROSECONDS |
| | DEC | 23 | 100 - 109 MILES | = | 5.71 | MICROSECONDS |
| | DEC | 20 | 110 - 119 MILES | = | 5.11 | MICROSECONDS |
| | DEC | 18 | 120 - 129 MILES | = | 4.61 | MICROSECONDS |
| | DEC | 17 | 130 - 139 MILES | = | 4.17 | MICROSECONDS |
| | DEC | 15 | 140 - 149 MILES | = | 3.79 | MICROSECONDS |
| | DEC | 14 | 150 - 159 MILES | = | 3.46 | MICROSECONDS |
| | DEC | 13 | 160 - 169 MILES | = | 3.17 | MICROSECONDS |
| | DEC | 12 | 170 - 179 MILES | = | 2.90 | MICROSECONDS |
| | DEC | 11 | 180 - 189 MILES | = | 2.66 | MICROSECONDS |
| | DEC | 10 | 190 - 199 MILES | = | 2.44 | MICROSECONDS |
| | DEC | 9 | 200 - 209 MILES | = | 2.25 | MICROSECONDS |
| | DEC | 8 | 210 - 219 MILES | = | 2.06 | MICROSECONDS |
| | DEC | 8 | 220 - 229 MILES | = | 1.90 | MICROSECONDS |
| | DEC | 7 | 230 - 239 MILES | = | 1.74 | MICROSECONDS |
| | DEC | 6 | 240 - 249 MILES | = | 1.60 | MICROSECONDS |
| | DEC | 6 | 250 - 259 MILES | = | 1.46 | MICROSECONDS |
| | DEC | 5 | 260 - 269 MILES | = | 1.34 | MICROSECONDS |

```
DEC 5        270 - 279 MILES =  1.22 MICROSECONDS

DEC 4        280 - 289 MILES =  1.11 MICROSECONDS

DEC 4        290 - 299 MILES =  1.01 MICROSECONDS

DEC 3        300 - 309 MILES =  0.92 MICROSECONDS

CAND    BSS 253      AUTO ACQUI TRACK CANDIDATES TABLE

CANA    BSS 63       AUTO ACQUI TRACK CANDIDATES LOOK-UP
                     TABLE (SORTED, DESCENDING PLOT QUAL)

END
```

APPENDIX B
CONTROL OPERATIONS

| OP Code | R | Y |
|---|---|---|
| 0    4 | 5    8 | 9    17 |

TRU — Transfer Unconditionally (OP CODE 00)

The computer will take the next instruction from the location in memory specified by Y and R.
Operating time: 1 microsecond.

TRN — Transfer on Accumulator Negative (OP CODE 01)

The sign bit of the Accumulator is sensed. If it is negative (1), control is transferred to the memory location specified by Y and R. If the Accumulator sign is positive (0), the computer will take the next instruction in sequence.

Operating time: 1 microsecond.

TRZ — Transfer on Accumulator Zero (OP CODE 02)

The contents of the Accumulator are tested for a zero value. The sign bit is not tested. If the contents of the Accumulator are zero, control is transferred to the memory location specified by Y and R. If the contents of the Accumulator are not zero, the computer will take the next sequential instruction.
Operating time: 1 microsecond.

TOF — Transfer on Overflow (OP CODE 03)

If the Overflow Indicator is on, the indicator is turned off and the computer takes the next instruction from the memory location specified by Y and R. If the Overflow Indicator is off, the computer takes the next instruction in sequence.
Operating time: 1 microsecond.

TSX — Transfer and Set Return Address in Index Register 12 (OP CODE 12)

The contents of the program counter plus one are placed in index register 12 of the specified index register bank. The computer will then take its next instruction from the memory location specified by Y and R. The value placed into the index register represents the memory location immediately following the location of this TSX instruction.

The transfer portion of the Transfer and Set Index instruction may utilize all of the Indexing options.
Operating time: 2 microseconds.

| OP Code | R | Y |
|---|---|---|
| 0    4 | 5    8 | 9    17 |

CMA — Compare Algebraic (OP CODE 30)

The contents of the Accumulator are algebraically compared with the contents of the memory word at the location specified by Y and R. Two Compare Indicators, High, and Low, are treated as follows: If the Accumulator is lower, the Low Indicator is turned on and the other off. If the Accumulator is higher, the High Indicator is turned on and the other off. If they are equal, both are turned on. For the purposes of this instruction + zero is greater than − zero, $+377777_8$ is the highest number, and $-377777_8$ is the lowest number.

Only the execution of another CMA or CML instruction or a PAI will alter these indicators.
Operating time: 2 microseconds.

CML — Compare Logical (OP CODE 31)

The entire contents of the Accumulator, including sign, are logically compared with the contents of the memory word at the location specified by Y and R. Two Compare Indicators, High and Low, are treated as follows: If the Accumulator is lower, the Low Indicator is turned on and the other off. If the Accumulator is higher, the High Indicator is turned on and the other off. If they are equal, both are turned on. For the purposes of this instruction 0 is the lowest number and $777777_8$ is the highest number.

Only the execution of another CMA, or PAI instruction will alter these indicators.
Operating time: 2 microseconds.

TRE — Transfer Equal (OP CODE 05)

If both Compare Indicators are on, the computer takes the next instruction from the memory location specified by Y and R. If either Compare Indicator is off, the computer takes the next instruction in sequence. The execution of this instruction will not alter the state of the Compare Indicators.
Operating time: 1 microsecond.
TRH — Transfer High (OP CODE 06)

If only the High Compare Indicator is on, the computer takes the next instruction from the memory location specified by Y and R. If the High Compare Indicator is off, the computer takes the next instruction in sequence. The execution of this instruction will not alter the state of the Compare Indicators.
Operating time: 1 microsecond.
TRL — Transfer Low (OP CODE 07)

If only the Low Compare Indicator is on, the computer takes the next instruction from the memory location specified by Y and R. If the Low Compare Indicator is off, the computer takes the next instruction in sequence. The execution of this instruction will not alter the state of the Compare Indicators.
Operating time: 1 microsecond.
LCK — Lock

| 14 | N | 4 | N |
|---|---|---|---|
| 0 | 4 5 | 8 9 11 | 12 17 |

In a dual processor system, the value N is placed in the Lock Register of processor A. The number is then compared with the contents of the Lock Register of processor B. If equal, the Lock Register of processor A is reset and the computer will take the next instruction in sequence. If unequal, one instruction is skipped. In any case, the Lock Register and instruction sequence of processor B is unchanged. If both processors execute a LCK instruction with the same value at the same time the processor having executive control (Indicator 7 on) at that time completes execution of the LCK instruction 0.25 microseconds before the other processor. If identical instruction loops are used (a LCK instruction followed by a transfer back to the LCK instruction), the processor having executive control will normally set its Lock Register first. Since a clock update cycle, an interrupt, or a memory conflict may lengthen the instruction loop for the processor having executive control, it is possible for the other processor to set its Lock Register first.
Operating time: 1.5 microseconds for skip or indicator 7 on, otherwise 1.75 microseconds.
ULK — Unlock

| 14 | 0 | 0 | 0 |
|---|---|---|---|
| 0 | 4 5 | 8 9 11 | 12 17 |

The Lock Register of the processor is reset.
Operating time: 1.5 microseconds.
ARITHMETIC OPERATIONS

| OP Code | R | Y |
|---|---|---|
| 0 4 | 5 8 | 9 17 |

ADD — Add (OP CODE 22)

The contents of the memory location specified by Y and R are algebraically added to the contents of the Accumulator. The result is placed in the Accumulator. The Over-flow Indicator will be set (turned on) if an overflow occurs. If the result is zero, the sign of the result is the original sign of the Accumulator.
Operating time: 2 microseconds.
SUB — Subtract (OP CODE 23)

The contents of the memory location specified by Y and R are algebraically subtracted from the contents of the Accumulator. The result is placed in the Accumulator. The Overflow Indicator will be turned on if an overflow occurs. If the result is zero, the sign of the result is the original sign of the Accumulator.
Operating time: 2 microseconds.
MLY — Multiply (OP CODE 24)

The contents of the memory location specified by Y and R are multiplied by the contents of the Accumulator. The product, which is a double length word, appears in the combined Accumulator and Q Register. The high order bits are in the Accumulator and the low order bits are in the Q Register. The sign of the product is in the sign bits of both the Accumulator and Q Register. Overflow is not possible. The initial value of the Q Register does not affect the result of this instruction.
Operating time: 3.5 microseconds.
DIV — Divide (OP CODE 25)

The double-length dividend in the combined Accumulator and Q Register is divided by the contents of the memory location specified by Y and R. The sign of the dividend is the sign of the Accumulator. The single-length quotient is in the Accumulator with the appropriate sign, and the remainder is the Q Register with the sign of the dividend. The divisor must be greater in magnitude than the higher-order half of the dividend. If it is not, the division does not take place and the Divide Check Indicator is turned on; the Accumulator and Q Register remain unchanged, and the computer takes the next sequential instruction.
Operating time:
 6.25 microseconds;
 2.25 microseconds if the division does not take place.

DPA — Double Precision Add (OP CODE 04)

The double-length contents of Y + 1 and Y are algebraically added to the double-length word in the combined Accumulator and Q Register. Y + 1 contains the high-order bits of the double-length operand and Y contains the low-order bits. These two words must have the same sign. The double-length sum is left in the Accumulator and Q Register with the high-order bits in the Accumulator and the low-order bits in the Q Register. The Accumulator and Q Register must have the same sign. The Overflow Indicator will be turned on if an overflow occurs out of the Accumulator. If the result is zero in both registers, the sign of the result is the original sign of the Accumulator.
Operating time: 3.25 or 3.5 microseconds.
SQR — Square Root

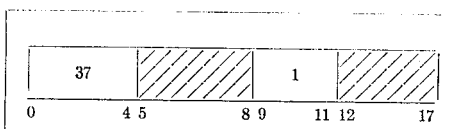

The single-length square root of the double-length argument in the combined Accumulator and Q Register is put in the Accumulator. The contents of the Q Register are destroyed. If the sign of the argument is negative (sign of the Accumulator), the square root is not performed and the Divide Check Indicator is turned on; the Accumulator and Q Register remain unchanged, and the computer takes the next sequential instruction. The binary point for this instruction is assumed to be located between $A_o$ and $A_1$ or between any other A even and odd bit.
Operating time:
 9 microseconds;
 1 microsecond if the square root is not performed.

WORD TRANSMISSION OPERATIONS

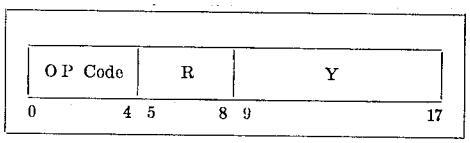

CLA — Clear and Add (OP CODE 20)
The contents of the memory location specified by Y and R replace the contents of the Accumulator.
Operating time: 2 microseconds.

STR — Store Accumulator (OP CODE 26)
The contents of the Accumulator are stored in the memory location specified by Y and R. The contents of the Accumulator remain unchanged.
Operating time: 2 mircoseconds.

LDQ — Load Q Register (OP CODE 21)
The contents of the memory location specified by Y and R replace the contents of the Q Register.
Operating time: 2 microseconds.

STQ — Store Q Register (OP CODE 27)
The contents of the Q Register are stored in the memory location specified by Y and R. The contents of the Q Register remain unchanged.
Operating time: 2 microseconds.

INDEX REGISTER OPERATIONS

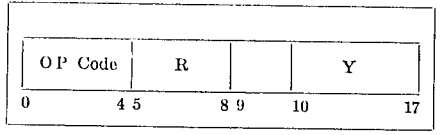

INX — Increment Index (OP CODE 10) (Bit 9 = 1)
The Y field is added to the contents of the Index Register specified by R. If R = 0 or 13, no operation will result. If R = 14 or 15, the computer will add the 17 bit $Y^1$ field of the memory location specified by Y to Index Register 1 if $R^1$ is a one. Otherwise no operation will result.
Operating time:
 1 microsecond if R = 0 or 13;
 3 microseconds if R = 1 through 12;
 2 microseconds if R = 14 and $R^1 = 0$;
 4 microseconds if R = 14 and $R^1 = 1$;
 2.25 microseconds if R = 15 and $R^1 = 0$;
 4.25 microseconds if R = 15 and $R^1 = 1$.

DCX — Decrement Index (OP CODE 10) (Bit 9 = 0)
The Y field is subtracted from the contents of the index register specified by R. If R = 0 or 13, no operation will result. If R = 14 or 15, the computer will subtract the 17 bits of the $Y^1$ field of the memory location specified by Y from index register 1 if $R^1$ is a one. Otherwise no operation will result.
Operating time:
 1 microsecond if R = 0 or 13;
 3 microseconds if R = 1 through 12;
 2 microseconds if R = 14 and $R^1 = 0$;
 4 microseconds if R = 14 and $R^1 = 1$;
 2.25 microseconds if R = 15 and $R^1 = 0$;
 4.25 microseconds if R = 15 and $R^1 = 1$.

TRX — Transfer on Index (OP CODE 13)
If the contents of the Index Register specified by R is zero, the computer takes the next sequential instruction. If the contents of the Index Register specified by R is not equal to zero, the contents are decremented by one and the computer takes its next instruction from the memory location specified by Y which is always relative. If R = 14 or 15, the computer will use the 17-bit indirect address and Index Register 1 if $R^1$ is a one. If R = 0 or 13, no operation will result and the computer takes the next sequential instruction.
Operating time:
 3 microseconds for transfer;
 2 microseconds for no transfer;
 1 microsecond for R = 0 or 13;
 2 microseconds for R = 14 or 15 and $R^1 = 0$;
 4 microseconds for (transfer) or 3 microseconds (no transfer) for R = 14 or 15 and $R^1 = 1$.

SXH — Skip on Index High (OP CODE 11)
The contents of the Index Register specified by R are compared to the number in the Y field. If the contents of the Index Register are greater than the value of Y, one instruction is skipped; otherwise, the computer will take the next sequential instruction. If R = 14 or 15, the computer will use the 17-bit indirect address and Index Register 1 if $R^1$ is a one. If R = 0 or 13, no operation will result and the computer takes the next sequential instruction.
Operation time:
 2 microseconds;
 1 microsecond for R = 0 or 13;
 2 microseconds for R = 14 or 15 and $R^1 = 0$;
 3 microseconds for R = 14 or 15 and $R^1 = 1$.

LOGICAL OPERATIONS

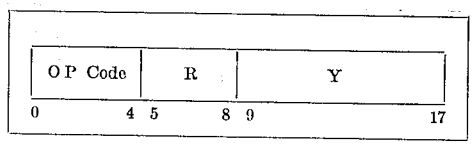

LGA — Logical Add (OP CODE 32)
Bits of the Accumulator corresponding to 1's in the contents of the memory location specified by Y and R are set to 1. All other bits remain unchanged. This is the "Inclusive OR" function.
Operating time: 2 microseconds.
LGM — Logical Multiply (OP CODE 33)

When corresponding bits of the Accumulator and the contents of the memory location specified by Y and R are both 1's those bits in the Accumulator will remain 1. All other bits in the Accumulator will be set to zero. This is the "AND" function.
Operating time: 2 microseconds.
LGC — Logical Complement (OP CODE 34)

Bits in the Accumulator corresponding to 1's in the contents of the memory location specified by Y and R are inverted. All other bits remain unchanged. This is the "Exclusive OR" function.
Operating time: 2 microseconds.
CGC — Convert Gray Code (OP CODE 35)

The contents of the memory location specified by Y and R are converted from Gray Code to sign and magnitude and the result is placed in the Accumulator.
Operating time: 6 microseconds.

SHIFT OPERATIONS

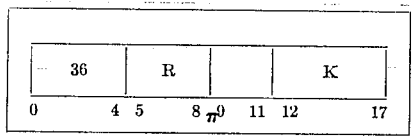

LSA — Left Shift Accumulator (Bits 9–11 = 1)

The contents of the Accumulator are shifted left the number of bits specified by K, Modulo $2^6$. The sign bit is unchanged. Zeros are shifted into the least significant bit; bits shifted out of the most significant bit are lost and will cause an overflow if equal to 1. An overflow will turn on the Overflow Indicator.
Operating time: $1.5 + 0.25 (n - 4)$ microseconds where $n$ is the number in K.* (* Time is 1.5 microseconds for $n \leq 4$; use formula for $n > 4$.)
LSB — Left Shift Both (Accumulator and Q Register) (Bits 9–11 = 3)

The double-length word in the combined Accumulator and Q Register is shifted left the number of bits specified by K, Modulo $2^6$. The sign bit of the Q Register is unchanged and is always copied into the sign bit of the Accumulator. Zeros are shifted into the least-significant bit of the Q Register. Bits shifted out of the most-significant bit (sign not included) of the Accumulator are lost and will cause an overflow if equal to 1. An overflow will turn on the Overflow Indicator.
Operating time: $1.5 + 0.25 (n - 4)$ microseconds.* (* Time is 1.5 microseconds for $n \leq 4$; use formula for $n > 4$.)
RSA — Right Shift Accumulator (Bits 9–11 = 0)

The contents of the Accumulator are shifted right the number of bits specified by K, Modulo $2^6$. The sign bit is unchanged. Zeros are shifted into the most-significant bit and bits shifted out of the least-significant bit are lost. Overflow cannot occur.
Operating time: $1.5 + 0.25 (n - 4)$ microseconds.* (* Time is 1.5 microseconds for $n \leq 4$; use formula for $n > 4$.)
RSB — Right Shift Both (Accumulator and Q Register) (Bits 9–11 = 4)

The double-length word in the combined Accumulator and Q Register is shifted right the number of bits specified by K, Modulo $2^6$. The sign bit of the Accumulator is unchanged and is copied always into the sign bit of the Q Register. Zeros are shifted into the most-significant bit of the Accumulator. Bits shifted out of the least-significant bit of the Accumulator are shifted into the most-significant bit (sign not included) of the Q Register. Bits shifted out of the least-significant bit of the Q Register are lost. Overflow cannot occur.
Operating time: $1.5 + 0.25 (n - 4)$ microseconds.* (* Time is 1.5 microseconds for $n \leq 4$; use formula for $n > 4$.)
RRA — Right Rotate Accumulator (Bits 9–11 = 5)

The entire contents of the Accumulator are shifted circularly to the right the number of bits specified by K, Modulo $2^6$. The sign bit is included in the shift. Bits shifted out of the least-significant bit are shifted into the sign bit. Overflow cannot occur.
Operating time: $1.5 + 0.25 (n - 4)$ microseconds.* (*Time is 1.5 microseconds for $n \leq 4$; use formula for $n > 4$.)

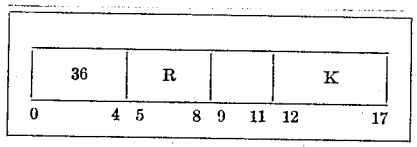

RRQ — Right Rotate Q Register (Bits 9–11 = 6)

This instruction is similar to Right Rotate Accumulator, except that the Q Register is shifted.
Operating time: $1.5 + 0.25 (n - 4)$ microseconds.* (*Time is 1.5 microseconds for $n \leq 4$; use formula for $n > 4$.)
LRB — Left Rotate Both (Accumulator and Q Register) (Bits 9–11 = 2)

The double-length logical word in the combined Accumulator and Q Register is shifted circularly to the left the number of bits specified by K, Module $2^6$. The sign bits are included in the shift. Bits shifted out of the sign bit of the Accumulator are shifted into the least significant bit of the Q Register. Bits shifted out of the sign bit of the Q Register are shifted into the least significant bit of the Accumulator. Overflow cannot occur.
Operating time: $1.5 + 0.25 (n - 4)$ microseconds.* (* Time is 1.5 microseconds for $n \leq 4$; use formula for $n > 4$.)
RRB — Right Rotate Both (Accumulator and Q Register) Parity Generation (Bits 9–11 = 7)

The double-length logical word in the combined Accumulator and Q Register is shifted circularly to the right the number of bits specified by K, Modulo $2^6$. The sign bits are included in the shift. Bits shifted out of the least-significant bit of the Q Register are shifted into the sign bit of the Accumulator. Bits shifted out of the least-significant bit of the Accumulator are shifted into the sign bit of the Q Register. Overflow cannot occur. During the execution of this instruction the ring sum of the bits shifted out of Q17 into the sign bit of the Accumulator is set into Sense Indicator 2. The effect of this is to generate the parity of the field of bits shifted. If odd, Sense Indicator 2 is inverted, and if even, Sense Indicator 2 is not inverted. Sense Indicator 2 should be reset by the program since the sense indicator is not automatically reset before execution of the instruction.

Operating time: 1.5 + 0.25 (n − 4) microseconds.*
(*Time is 1.5 microseconds for n ≤ 4; use formula for n > 4.)

NOTE: Indirect addressing is not allowed for any of the above shift operations. Indexing adds 0.75 microseconds to the specified shift operating time.

OPERATIONS ON ACCUMULATOR AND Q REGISTER

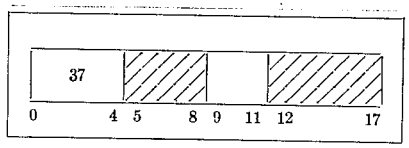

SAP — Set Accumulator Positive (Bits 9–11 = 0)
The sign bit of the Accumulator is set to zero (positive).
Operating time: 1 microsecond.
CSA — Change Sign of Accumulator (Bits 9–11 = 4)
The sign bit of the Accumulator is inverted.
Operating time: 1 microsecond.
XCA - Exchange Accumulator and Q Register (Bits 9–11 = 3)
The contents of the Accumulator and Q Register, including the sign bits, are exchanged.
Operating time: 1 microsecond.
CPA — Two's Complement Accumulator (Bits 9–11 = 5)
If the sign of the Accumulator is negative, the contents of the Accumulator, excluding sign, are replaced with two's complement of that number. The sign remains unchanged. If the sign of the Accumulator is positive, the Accumulator remains unchanged and the computer takes the next instruction in sequence.
Operating time: 1 microsecond.

OPERATIONS ON INDICATORS AND SWITCHES

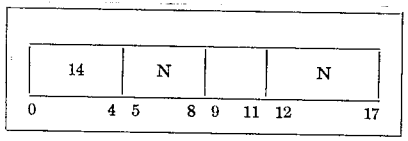

SEI — Set Indicators (Bits 9–11 = 2)
The indicators specified by a 1-bit in the corresponding position in the N fields are set (1). All other indicators remain unchanged. Each of the 10 bits in the N field corresponds to one of the 10 indicators.
Operating time: 1.5 microseconds.
REI — Reset Indicators (Bits 9–11 = 3)
This instruction is similar to Set Indicators, except that the indicators specified by a 1-bit in the corresponding position of the N fields are reset (0).
Operating time: 1.5 microseconds.
SKI — Skip on Indicators (Bits 9–11 = 1)
If all indicators specified by 1 bits in the N fields are on (1), one instruction is skipped. If any of the specified indicators are off (0), the next instruction in sequence is taken. Each of the 10 bits in the N fields corresponds to one of the 10 indicators.
Operating time: 1.5 microseconds.

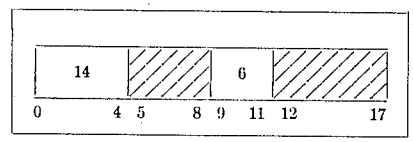

PIA — Place Indicators in Accumulator (Bits 9–11 = 6)
The contents of the Sense Indicators plus the two High-Low Indicators and the Overflow Indicator are placed in the Accumulator as shown below. The remaining bits of the Accumulator are cleared.

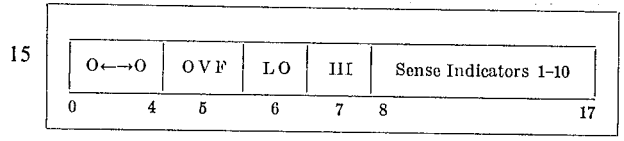

(Note: Both High and Low Indicators on denotes equal.)
Operating time: 1.5 microseconds.

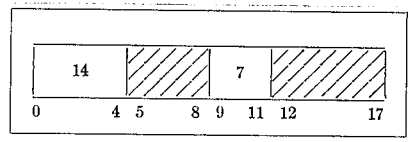

PAI — Place Accumulator in Indicators (Bits 9–11 = 7)
The 13 least significant bits of the Accumulator are used to set or reset the sense indicators plus the two High-Low Indicators and the Overflow Indicator. Indicators 1, 3 and 7 are not changed by the instruction.
The position of bits in the Accumulator is shown under the PIA (Place Indicators in Accumulator) instruction.
Operating time: 1.5 microseconds.

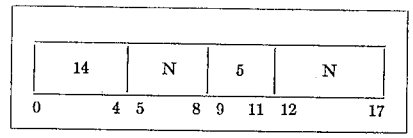

SKW — Skip on Switches (Bits 9–11 = 5)
If all the switches specified by 1 bits in the N fields are on, one instruction is skipped. If any of the specified switches are off, the next instruction in sequence is taken. Each of the 10 bits in the N fields corresponds to one of the 10 switches.
Operating time: 1.5 microseconds.

BUFFERED INPUT/OUTPUT

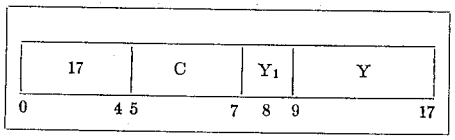

EXF — External Function
If $Y_1 = 0$, the contents of the memory word specified by the absolute value of Y, are sent via the Input/Output Module to the device on the appropriate channel. If $Y_1 = 1$, the contents of the memory word specified by the program counter plus the value of Y are sent. C shall be coded 0 through 7, corresponding to one of the eight channels. Code 0 corresponds to the highest priority channel.
Operating time: 2 microseconds.

CONSOLE INPUT/OUTPUT INSTRUCTIONS

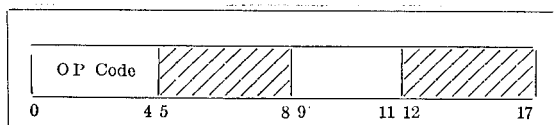

TWA — Input Typewriter Activates (OP CODE 15) (Bits 9-11 = 6)

The Input Typewriter Interlock and the Typewriter Activate Light are turned on; the Console Not Busy Indicator is turned off. This will activate the typewriter to allow inputs from the typewriter keys. No operation will occur if the Console Not Busy Indicator is off previous to this instruction, and the computer will continue with the next instruction in sequence.
Operating time: 1 microsecond.
TWF — Input Typewriter Off (OP CODE 15) (Bits 9-11 = 7)

The Input Typewriter Interlock and the Typewriter Activate Light are turned off; the Console Not Busy Indicator is turned on. This instruction will inhibit any attempt to input from the typewriter keys.
Operating time: 1 microsecond.
OTW — Output to Typewriter (OP CODE 16) (Bits 9-11 = 3)

The BCD character in the least significant 6 bits of the Q Register is output to the typewriter through the console Buffer Register. The computer continues with the next instruction in sequence immediately after the character in the Q Register is placed in the Console Buffer Register. The Console Not Busy Indicator is turned off and Output Typewriter Interlock is turned on, and remain so until the character has been typed. No operation will occur if the Console Not Busy Indicator is off previous to this instruction, and the computer will continue with the next instruction in sequence.
Operating time: 1 microsecond.
IPC — Input from Console (OP CODE 16) (Bits 9-11 = 0)

If the Tape Level Switch on the Processor Control Panel is set to 6, the least significant 6 bits of the Console Buffer Register are placed in the least significant 6 bits of the Q Register. Bit positions 0 through 11 of the Q Register are not altered. If the Tape Level Switch is set to 7, the least significant 7 bits of the Console Buffer Register are placed in the least significant 7 bits of the Q Register. Bit positions 0 through 10 of the Q Register are not altered. The contents of the Q Register are normally saved and restored by console input interrupt subroutines.
Operating time: 1 microsecond.
CTA — Console Tape Advance (OP CODE 15) (Bits 9-11 = 1)

The clutch of the Paper Tape Reader is energized which initiates forward motion of the Tape Reader is initiated. The tape will advance at the rate of 500 characters per second. The Tape Reader Interlock is turned on and the Console Not Busy Indicator is turned off. No operation will occur if the Console Not Busy Indicator is off previous to this instruction, and the computer will continue with the next instruction in sequence.
Operating time: 1 microsecond.
CTS — Console Tape Stop (OP CODE 15) (Bits 9-11 = 2)

The clutch of the Paper Tape Reader is de-energized and the forward motion of the tape is stopped. The Tape Reader Interlock is turned off and the Console Not Busy Indicator is turned on. To insure that the tape stops in position to read the next input frame, this instruction must be executed within 100 microseconds after the last tape input interrupt.
Operating time: 1 microsecond.
CTR — Console Tape Rewind (OP CODE 15) (Bits 9-11 = 3)

The tape is rewound onto the supply reel until a start-of-reel frame (a punch in the 7th channel with even parity) is encountered. The tape will stop before the frame preceding the start-of-reel frame. There will be a program interrupt upon completion of the rewind. No operation will occur if the Console Not Busy Indicator is off previous to this instruction, and the computer will continue with the next instruction in sequence.
Operating time: 1 microsecond.
PMO — Punch Motor On (OP CODE 15) (Bits 9-11 = 4)

The Tape Punch Motor will be turned on. At least one second must elapse before executing an output to the Tape Punch.
Operating time: 1 microsecond.
PMF — Punch Motor Off (OP CODE 15) (Bits 9-11 = 5)

The Tape Punch Motor will be turned off.
Operating time: 1 microsecond.
OPA — Output 6 Bits to Tape Punch (OP CODE 16) (Bits 9-11 = 1)

The least significant 6 bits of the Q Register are output to the Tape Punch through the Console Buffer Register. The computer continues with the next instruction in sequence immediately after the 6 bits in the Q Register are placed in the Console Buffer Register. The Console Not Busy Indicator is turned off and the Tape Output Interlock is turned on and remain so until the frame has been punched. No operation will occur if the Console Not Busy Indicator is off previous to this instruction, and the computer will continue with the next instruction in sequence.
Operating time: 1 microsecond.
OPB — Output 7 Bits to Tape Punch (OP CODE 16) (Bits 9-11 = 2) This instruction is similar to OPA (Output 6 Bits to Tape Punch) except that the least significant 7 bits in the Q Register are output to the Tape Punch through the Console Buffer Register.
Operating time: 1 microsecond.

APPENDIX C

METHOD OF PROCESSING THE HM-4118 ASSEMBLY PROGRAM

The HM-4118 Assembly Program (HAP-18M) is a subsystem of the HM-4118 software system that affords a means of assembling HM-4118 assembly language programs on the computer. It is intended primarily as an aid to the programmer coding in HM-4118 language.

The HAP-18M is the HM-4118 computer program which converts HM-4118 assembly language punched on standard tab cards into HM-4118 machine code. The assembler program recognizes and converts mnemonic codes, symbol labels, and operands into machine language instructions or data words. The assembler also recognizes and operates under the control of a set of pseudo operations. The pseudo operations allow the programmer to control memory allocation, define symbols, enter data words, control listings, define macro operations, and provide overall control of the program assembly process. The program produces error listings, side-by-side listings of the symbolic and the machine language code, symbol tables, and relocatable binary tapes for the HM-4118.

The assembler program is loaded in low core memory to assemble another program by executing two passes through the source program. The assembler performs all functions necessary to organize the program by operating on the input data, one line at a time. The new program is assembled and outputted on punched or magnetic tape. The new program is not placed in memory during assembly, thus, it may be assigned memory locations that are also used by the assembler program.

First Pass Through the Source Program (Pass I)

During the first pass, the assembler constructs symbol and macro tables, checks format, and compiles errors. Symbols that appear as labels in the location field, and symbols that appear in the variable field of operation codes, are identified and placed in the symbol table. A location symbol is identified by assigning it the value of the memory location that it represents or the value to which it is equated. Operation codes, excluding all pseudo operations except variable field data (VFD), are checked for symbols and proper format in the variable field for the purpose of compiling error messages. When a macro (MAC) operation is processed, the macro name is placed in the macro name table and defined by the relative location of that macro's skelton, parameter, and line count when this data becomes available. Symbols that appear in the variable field of a macro operation are parameters. As each line following a macro operation is entered into the macro skeleton table, each symbol is checked to see if it is present in the parameter table. If found there, it is assigned that parameter number. If the symbol is not in the parameter table, it is entered, unchanged, into the skeleton table. When an error is detected, the statement in which the error occured, and the error flag, are printed after the statement is processed. At the end of Pass I, all undefined symbols are assigned locations beginning with the next memory location above the highest location used by the programmer. These symbols and the addresses they were assigned are printed out.

Second Pass Through the Source Program (Pass II)

The final program assembly occurs during Pass II processing. The assembler reads each statement, (one at a time) interpreting the mnemonic operation codes and symbolic operands and expressions, and converting them into machine language. Data-generating pseudo operations are performed and the data generated is printed out. A literal table is constructed during Pass II with each literal assigned a memory location within the memory block specified by the programmer. As each statement is interpreted and assembled, the program listing, data generated, and comments are printed out and recorded on punched of magnetic tape. At the end of Pass II, a list of all symbols and literals used is printed out and recorded on punched or magnetic tape.

Literal Table

A literal consists of a unique machine language (binary) number used in a program. The literal table is assigned to a block of memory locations specified by the programmer. The literal table is made accessible for index register addressing from any point in memory. This is accomplished by assigning the address of the beginning of the literal table to one of the index registers. This particular index register has the same assignment in all banks and is specified by use of the LTL pseudo operations. The LTL pseudo operation must be performed prior to the first use of a literal in a program. A literal is a unique binary number that is derived with the assembler decodes an operand. The operand may be octal, decimal, a constant, a 6-bit alphanumeric code, or an ASCII code. When the assembler encounters a literal, it obtains the equivalent binary number and surveys the literal table for another occurrence of the same number. If a duplicate exists, the location of the duplicate in literal table is also assigned to this literal. If this is the first occurrence of this specific literal, it is assigned the next available location in the literal table. No duplications are allowed in the literal table. A literal is accessed during program processing by certain general instruction words. The R-subfield in the variable field of the instruction word specifies the index register that contains the literal table address. The Y-subfield in the variable field of the instruction word specifies which literal in the table to use. The number of bits available to the Y-field limits the total number of literals to 512 ($1000_8$).

Memory Location Assignment

The assembler program provides three software counters: (1) main counter, (2) scratch counter, and (3) relocation counter. Memory locations are assigned by the assembler interpreting the location field and assigning values obtained from one of the three counters to the contents of the location field. If column 1 is blank, the location field is assumed to be blank, and that line is assigned to the next higher available memory location in either scratch pad or main memory, depending upon the portion of memory in which the preceding line(s) were placed. If column 1 contains a number the label is interpreted as a constant that designates the memory location to which the instruction or data will be assigned. The constant starts with column 1 and continues to the first blank column (up to six characters). If the constant is greater than $777_8$, the main counter is set to the value of the constant and following instructions, or data, are assigned sequentially higher main memory locations. If the constant equals $777_8$, or less, the scratch counter is set equal to that value, and following instructions, or data, are assigned sequentially higher scratch pad locations. If column 1 contains an alphabetic character, the location field is interpreted as a symbol, or label, and is placed in the memory location specified for that symbol in the symbol table generated during Pass I.

THE HAP-18M LANGUAGE AND PSEUDO OPERATIONS

The HAP-18M symbolic assembly language permits the use of alphanumeric symbols to represent memory locations and operation code mnemonics to represent the equivalent numeric operation codes. Further programming flexibility is afforded by the use of pseudo operations.

HAP-18M Symbolic Assembly Language

Characteristics of the HAP-18M language are described in the following paragraphs.

Symbols

HAP-18M symbols consist of six or less alphanumeric characters with the first character being alphabetic. An asterisk (*) may be substituted for a symbol in an arithmetic expression in an instruction variable field. If the asterisk appears as a substitute for a term, that term is assigned the current value of the location counter during assembly. A line that begins with an asterisk is defined as being entirely in the comments field. Symbols may be used to define memory locations.

Constants

All HAP-18M constants are considered decimal integers except for those used in operands of switch instructions, in Boolean expressions, and in certain data generated during pseudo operations. Constants that are not decimal integers are considered octal integers. If an octal integer is used where it could be interpreted as decimal, the octal integer must be followed by the letter B (Boolean) to indicate that it is an octal integer.

Memory Nomenclature

Nearly all of the memory locations from $0_8$ through $212_8$ have been assigned to specific functions such as interrupt entrance register, index registers, etc. These locations are referred to as assigned memory.

The assembler program uses memory address 0 through $777_8$ (first 512 decimal locations) for scratch pad memory. When developing an operational program, the locations $213_8$ through $777_8$ should be utilized for storage of data that is used frequently because these locations can be addressed directly from any location in memory and thus accessed in a minimum time.

The memory locations with addresses greater than $777_8$ are referred to as main memory.

Expressions

An arithmetic or Boolean expression is any meaningful, parenthesis-free combination of symbols, constants, and operators appearing in the variable field of an instruction. The facing table shows the allowable operators and their definitions. The value of an expression is obtained by performing each multiplication (*) and division (/) operation as it occurs from left to right. The expression is evaluated a second time, performing the addition (+) and subtraction (−) operations.

When evaluating a / operation in an arithmetic expression, only the quotient is used. In a Boolean expression, A/B is evaluated as A*(/B).

The above expressions will be evaluated as integers using 17 bits and two's complement arithmetic.

Pseudo operations

A list of pseudo operations available to the programmer for additional flexibility is listed on the facing page. A functional list of the pseudo operations is given in Appendix E.

OPERATORS AND DEFINITIONS

| Symbol | Arithmetic Definition | Boolean Definition |
|---|---|---|
| + | Addition | Inclusive OR |
| − | Subtract | Exclusive OR |
| * | Multiplication | AND |
| / | Division | Complement |

PROGRAMMER OPERATIONS PROVIDED BY PSEUDO OPERATIONS

Controlling memory allocation
Defining or relating symbols
Forming data
Defining macro operations
Specifying output and control listings
Controlling assembly processes

PROGRAMMING AND PROCESSING THE COMPUTER INSTRUCTIONS

A statement or line on the program coding sheet that defines a computer instruction is processed by the assembler program to generate a program instruction word in machine language and assign it a memory location.

The computer instructions are programmed and processed by the assembler according to operation and variable field formats defined in the following paragraphs.

General Instructions

General instructions must have entries in the operation field and the variable field. Each of the subfields in the variable field may contain a symbol, constant, or arithmetic expression. This group of instructions uses no operation code augmentors and may use absolute or relative addressing. All instructions that may utilize literals are included in this group.

The characters in the variable field are arranged with the Y-subfield first, separated by a comma from the R-subfield. If an asterisk appears in column 12 of the operation field, the assembler program assigns the correct R value for indirect addressing. If one of the index registers is to be directly specified, the R-subfield must be equal to a value of 1 through 12 ($14_8$). Any expression or symbol may be used in the R-subfield, provided the value represented is less than 13. A value greater than 12 results in an error flag. Indirect addressing cannot be specified by writing 14 ($16_8$) or 15 ($17_8$) in the R-subfield. Indirect addressing can only be specified by an asterisk in column 12. When developing a TRX or SXH instruction, the R-subfield must not be equal to zero; if the R-subfield is equal to zero for these instructions, the assembler program generates an error flag.

Shift Instructions

Shift instructions consist of an operation field, and a variable field with a K-subfield and an R-subfield. The variable field may contain a symbol, constant, or arithmetic expression. The characters in the first subfield of the variable field provide the K-subfield, which speci-

PROGRAM CODING FORM

PREPARED BY _____  DATE _____

PHONE _____  PROBLEM NO. _____  PAGE ___ OF ___

| LOCATION (LABEL) 1   5 | OP CODE 10   15 | VARIABLE AND COMMENTS FIELD 20  25  30  35  40  45  50  55  60  65  70  72 | SEQ NO. 80 |
|---|---|---|---|
| 1 |  | RSA  4 |  |  |
| 2 |  | RSA  2   5 |  |  |
| 3 |  | SEI  525 |  |  |
| 4 |  | REI  525 |  |  |
| 5 |  | SAP |  |  |
| 6 |  |  |  |  |

NOTES

1. LINE 1: SHIFT THE A REGISTER RIGHT 4 PLACES
2. LINE 2: SHIFT THE A REGISTER RIGHT THE NUMBER OF PLACES INDICATED BY THE CONTENTS OF INDEX REGISTER 6, +2
3. LINE 3: SET THOSE INDICATORS WITH A ONE IN THE CORRESPONDING POSITION OF THE BOOLEAN EXPRESSION DEFINED BY $525_8$
4. LINE 4: RESET THOSE INDICATORS WITH A ONE IN THE CORRESPONDING POSITION OF THE BOOLEAN EXPRESSION DEFINED BY $525_8$
5. LINE 5: SET THE A REGISTER SIGN BIT POSITIVE

Examples of Computer Instructions fies the shift count. The second subfield begins in the column immediately following the first comma in the variable field and is the R-subfield. The R-subfield specifies an index register. If the R-subfield is zero, (not characters in the subfield), the K-subfield shift count is not changed. If the R-subfield is 1 through 12 (14₈), the contents of the specified index register are added to the K-subfield when the instruction is executed, and the resultant sum is the shift count. The R-subfield may not be set equal to 13 (15₈), 14 (16₈), or 15 (17₈). Notice that the K-subfield may be defined by a label or symbol that decodes into as many as 17 bits. In any case, only the six least significant bits are used. This convention also applies when the contents of an index register are added to the K-subfield.

Indicator and Switch Instructions

These instruction words consist of an operation field and variable field. The instruction is decoded by the assembler from the mnemonic codes in the operation and variable field. The variable field contains a symbol, constant, or Boolean expression that defines the required 10-bit N-field. For these instructions constants are assumed to be octal. Each of the 10 bits corresponds to one of the indicators or switches. If the variable field characters decode into more than 10 bits, only the 10 least significant bits are used.

Operations on A and Q Registers and Console I/O Instructions

Operations on the accumulator and Q register and the console I/O instructions require an entry only in the operation field. The machine instruction is decoded from the mnemonic code in the operation field. This group of computer instructions includes all of those that never have a variable field.

PROVIDING GREATER FLEXIBILITY IN THE ADDRESSING FUNCTION

The combination of the subfields in the variable field can define the type of addressing or instruct the assembler to assign a type of addressing for the operation.

Since the 18-bit general instruction word requires 5 bits to specify the operation code, only 13 bits are available to indicate operand addresses. This limitation would permit direct addressing in the instruction word itself of only 8,192 addresses. To avoid such a limitation, the computer provides index and indirect addressing options that permit accessing of any memory location from any instruction location. These options divide the addressing indicator bits into two fields. One field (the R-field) indicates the type of addressing to be performed and the other field (the Y-field) provides basic information for the addressing function. The R-field can indicate four basic methods of addressing, Absolute Addressing (Scratch Pad), Absolute Addressing (Indexed), Relative Addressing, and Indirect Addressing.

Absolute-Scratch Pad

This type of addressing is limited to accessing memory locations 0 through 777₈. These locations provide easily accessible storage for frequently used data. A aboslute address in scratch pad memory is designated on the coding form when the R-subfield in the variable field is zero. When this entry is made, the Y-subfield designates the absolute address for that operand.

Aboslute Addressing-Indexed

For indexed addressing, the R-field is used in conjunction with sense indicators F5 and F6 to modify the base address indicated in the Y-field. There are four groups of 12 addresses in memory that are reserved for index registers. The word position within the group is specified by an R-field in the instruction word equal to 1 through 12 (14₈). Sense indicators F5 and F6 identify the group of bank of registers. By combining the R-field and the configuration of F5 and F6, the absolute memory location for the index register is defined for the addressing function. Then the contents of the specified index register are added algebraically to the contents of the Y-subfield to define the actual memory location of the operand.

Relative Addressing

The assembler program develops a relative address for the instruction when the operand word is located within +255 or −256 addresses of the location of the instruction being generated. If the operand is located out of this range (beyond +255 or −256 addresses), an address must be generated by using indirect addressing. If the operand address is within range, the assembler will develop a Y-field to add to or subtract from the contents of the program counter for the relative address of the operand. The programmer must know that the required operand lies within range. If the operand is not within range, an error flag is set.

A relative address can be entered directly on the coding form by placing an asterisk in column 13 followed by a + or − operator and a number. This convention instructs the assembler to develop an address relative to the address of the instruction being performed.

In general, when a label is used in the variable field, the assembler will first determine if it can be reached by absolute addressing. If not, relative addressing is checked. If neither type of addressing can reach the indicated location, an error flag is generated.

Indirect Addressing

When the desired operand is beyond the range of absolute or relative addressing, the assembler must be instructed to indirectly address the operand. The assembler cannot generate indirect address words itself. This is achieved by entering an asterisk in column 12 on the coding form and entering a scratch pad address or symbolic address that contains the actual memory address or a further indexed address for the operand.

In the illustrated example of indirect addressing, the following conditions apply: If bit 0 in AAK2 (which must be previously set by the programmer) is a one, the contents of index register 1 (which must be set previously by the programmer) is algebraically added to the contents of AAK2. This sum defines the actual operand address when bit 0 of the index register 1 is zero. However, a further indexing level is available to the programmer. By previously setting bit 0 of index register 1 and bit 0 of AAK2 to one, the contents of the summed address are treated as containing another address that contains the actual address for the operand. An example is shown in the table.

EXAMPLE OF INDIRECT ADDRESSING WITH INDEXING OPTIONS
(Instruction is TRU* AAK2)

| Address | Contents | |
|---|---|---|
| AAK2 | $400337_H$ | bit 0=1 indexed address |
| add. INDEX 1 | $400007_H$ | bit 0=1 indirect address |
| | $346_H$ | |
| $346_H$ | $401000_H$ | bit 0=1 indexed address |
| add. INDEX 1 | $400007_H$ | bit 0=1 indirect address |
| | $1007_H$ | |
| $1007_8$ | $024212_8$ | bit 0=0 effective address | bled, the operator must select the assembler from among these utility programs. Selection involves the operator providing information in answer to data requests which are controlled by the monitor program, another of the utility programs.

The monitor program performs as an executive program for the utility programs and controls overall operation during compilation or modification of programs. The monitor program provides interface with the operator through the console channel keyboard. Operator input requests are analyzed by the monitor program and action is initiated for processing. If the program required to process the request is not in memory, the

PROGRAM CODING FORM

92882 = 102

Prepared by_____ Date_____

Phone_____ Problem No._____ Page____ Of____

| Line | Location (label) 1-8 | Op code 9-12 | Variable and comments field 13-37 |
|---|---|---|---|
| 1 | | C L A | 1 0 0 |
| 2 | | A D D | 1 0 . 1 2 |
| 3 | | I N X | 7 . 4 |
| 4 | | M L Y | A A 0 5 |
| 5 | | T R U | . + 5 |
| 6 | | C L A . | A A K 2 |
| 7 | | | |

Variable and comments field 38-72, SEQ NO. 80

NOTES:
1. Line 1:
   Absolute addressing. Clear the A register and add the contents of address 100.
2. Line 2:
   Indexed addressing. Take the contents of index register 12 and add 10. The sum is the address of the number that will be added to the A register contents.
3. Line 3: Indexed addressing.
   Increment index register 4 by 7.
4. Line 4: Relative addressing.
   Conditions:
      1. Instruction is located in 10000.
      2. AAOT is located in 10255.
   Results:
      In the final computer word, the Y-field will contain +255 ($377_3$) and the R field will contain 13 ($15_3$).
5. Line 5: Relative addressing.
   Conditions:
      1. Present instruction address is 10005.
      2. Transfer is required to address 10010. The operator must know that the next required address is located in address 10010.
   Results:
      In the final computer word, the Y-field will contain 5 and the R-field will contain 13 ($15_3$).
6. Line 6:
   Indirect addressing. Clear and add the contents of the memory location specified by the contents of the address designated by symbol AAK2.

Examples of addressing. Four basic methods of addressing are indicated by the R-field.

SUMMARY OF PROGRAM CONTROL REQUIREMENTS

The program control requirements are fulfilled by the operator furnishing information in answer to typed data messages each time a program coded in symbolic language is to be assembled.

The HM-4118 Assembly Program (assembler) is one of a group of component programs (utility programs) comprising the Utility Library Tape. Therefore, when a program coded in symbolic language is to be assembled, the operator must select the assembler from among these utility programs.

monitor program loads it from the Utility Library Tape and then transfers control to the proper portion of the newly loaded program for execution of the requested action. Upon completion of processing, control is returned to the monitor program in readiness for subsequent requests.

The monitor program notifies the operator that it is ready for input by typing the message ENTER REQUEST. The operator then enters a request code which, if he is requesting the assembler, will be ASSEM, followed by a space.

Transfer of control to the assembler is indicated to the operator by the message "HM-4118 ASSEMBLY PROGRAM" being typed. (See facing table.) At this point, there are still several parameters which must be furnished by the operator prior to execution of the assembly process. These parameters, which are entered one by one in response to typed messages, involve the program name, process mode, input mode, list mode, output mode, and COMID tape name. These messages are described as follows:

Program Name — the program name (six or more alphanumeric characters) is placed in a 2-word storage area for later usage.

Process Mode — this entry specifies whether the assembly is to be a normal or a system macro assembly.

Input Mode — the input mode indicates the type of symbolic input (i.e. punched or magnetic tape, or punched cards).

List Mode — the list mode indicates whether or not a listing is desired.

Output Mode — the output mode specifies the type of output desired.

COMID Tape Name — the COMID tape name is comprised of six or less alphanumeric characters and is used to identify the COMID tape being written or read.

After the operator has entered a parameter at the keyboard, the termination of the parameter is indicated by entering a space. An erroneous entry can be cancelled by entering a slash (/). A zero or no parameter can be entered by a space. For a COMID assembly, a zero is entered in the output mode parameter. After entering all parameters, printout will be as shown in the following table, together with sample operator entries.

SAMPLE ASSEMBLY ENTRY PARAMETER PRINTOUT

| Printout | Operator Entry |
|---|---|
| HM-4118 ASSEMBLY PROGRAM | .... |
| ENTER PROGRAM NAME | SKA010 |
| ENTER PROCESS MODE, 0 FOR SYSTEM MACRO, 1 FOR NORMAL ASSEMBLY | 1 |
| ENTER INPUT MODE, 1 FOR MT, 2 FOR PT, 3 FOR CR INPUT | 1 |
| ENTER LIST MODE, 0 FOR NO LIST, 1 FOR LIST | 1 |
| ENTER OUTPUT MODE, 0 FOR NONE, 1 FOR MT, 2 FOR PT | 1 |
| ENTER COMID NAME | OPS200 |
| ENTER COMID I/O MODE, 1 FOR MT, 2 FOR PT | 1 |

DESCRIPTION OF INPUT FORMATS

A symbolic instruction, or line, consists of four major divisions: location field, operation field, variable field, and comments field.

The location field may contain a symbol by which other instructions can refer to this location. The operation field contains the mnemonic operation code. The variable field normally contains the operand of the instruction. The comments field exists for the convenience of the programmer and does not affect the assembly process.

Location Field

The contents of the location field, also called the label field, may be a symbol, constant, or blank. The function of the location field is to specify the memory location of the instruction on this line. Memory locations 0 through $212_8$ have preassigned specific functions such as index registers, interrupt entrance register, etc. and are not available to the programmer for any other purpose. The assembler uses addresses 0 through $777_8$ for scratch pad memory. When developing an operational program, the locations $213_8$ through $777_8$ should be used for storage of data that is frequently used because these locations can be addressed directly from any location in memory and thus accessed in a minimum time.

Location Field Symbols

When a symbol appears in the location field, that symbol's (or label's) unique function is to define a specific memory location. Symbols are normally assigned a value derived from the main counter, and are addresses greater than $777_8$. If a symbol is to be assigned a memory location in scratch pad memory, it is assigned a value derived from the scratch counter and is denoted by adding a "comma S" (,S) at the end of the symbol. The instruction data generated by the remainder of the line on which the symbol appears is placed in the memory location specified by the symbol. Unless the symbol is defined otherwise by the use of an EQU or other pseudo operation, the address assigned for the symbol is the next sequential address in main memory or in scratch pad memory.

Location Field Constants

A constant in the location field indicates the storage location for the instruction or data generated by that line. Constants are assumed to be decimal numbers unless the number has a suffix B, in which case it is read as octal. If the constant is less than 512 ($1000_8$), the scratch counter is set its' value, if it is greater than scratch pad memory location numbers, the main counter is set.

Blank Location Fields

If the location field is blank, the instruction, or data generated on that line, is assigned the next higher available location in either scratch pad or main memory, depending upon whether the preceding line was assigned to scratch pad or main memory.

Operation Field

The operation field will contain an operation code mnemonic a pseudo operation code, or a macro operation code. If the operation code is followed by an asterisk (*), that instruction is to use an indirect address.

Variable Field

The variable field may be blank or contain one or more subfields which are separated by commas. The number of subfields within the variable field is dependent upon the operation code. The formats used by the various classes of instructions are given in Table 1. If the programmer specifies the R (index) field for an instruction, the assembler will interpret the Y-field as absolute or relative depending on the value of R. Table 2 shows the fields for the various values of R. If no R subfield is present, the assembler will generate a 0 or 13 for R, depending on the location of the Y subfield (in scratch pad or main memory). If an asterisk (*) is placed after the operation code and no R field is present, indirect addressing is assumed and the assembler will generate a 14 or 15, depending on the value of the Y subfield.

The value assigned to the Y subfield, for general instructions specifying absolute addressing, is formed by using the least significant nine bits of the final result of the arithmetic expression appearing in the Y-subfield. The value assigned to the Y-subfield, for general instructions specifying relative addressing, is formed by subtracting the current value of the specified location counter from the final value of the arithmetic expression appearing in the Y-subfield. If the result is greater than +255 or less than −256, an error flag is set. Otherwise, if the result is positive, the least significant eight bits are placed in the Y field of the instruction. If the result is negative, the least significant eight bits of the two's complement of the number are placed in the Y field of the instruction.

The value given to K for shift Instructions is the least significant 6 bits of the final result of the arithmetic expression appearing in the K subfield. The value given to C is the I/O channel number. The format of the variable field of the various pseudo-operations are described in the sections which discuss the pseudo-operations.

Comments Field

The programmer may write notes or any information desired into the comments field. The assembler does not process this field but retains the comments for later printout as a side-by-side listing after Pass II. Additionally, when the first column in the location field contains the operator *, the entire line is printed out as a comment and does not appear in the final assembled program. If the line is blank after the *, an asterisk will be printed in the first column and a space will result for that line in the final printout.

TABLE 1

FORMAT FOR VARIABLE FIELD INSTRUCTIONS

| Class of Instruction | Format |
|---|---|
| General Instructions | Y, R |
| Shift Instructions | K, R |
| Indicators and Switch Instructions | N (Octal) |
| Buffered I/O | Y, C |
| Operations on A and Q | Blank |
| Console I/O Instructions | Blank |

TABLE 2

RELATIONSHIP OF Y-FIELD AND INDEX FIELD (R)

| R | Y-Field |
|---|---|
| 0 | Absolute—Scratch Pad |
| 1–12 ($14_8$) | Absolute—Indexed |
| 13 ($15_8$) | Relative |
| 14 ($16_8$) | Indirect/Absolute |
| 15 ($17_8$) | Indirect/Relative |

FORMATTING SUBFIELDS WITHIN VARIABLE FIELDS

When subfields are permitted within variable fields, the subfields must be formatted according to certain rules.

The variable field is left justified and is assigned columns 13 through the first blank column on the program coding form. The number of subfields permitted within the variable field is dependent upon the operation code. Examples of subfields within the variable field are shown on the facing page. When expressions (subfields) are permitted within the variable field, they must be formatted by the programmer according to set rules. If the assembler detects a variable field which violates one or more of these rules, then the statement line containing the error(s) is printed out. The following rules are applicable when formatting expressions within the variable field.

1. Each subfield may contain from 1 to 25 elements, consisting of symbols and/or constants separated by arithmetic or Boolean operators. Each subfield is terminated by a comma and the variable field is terminated by a blank. Each item, including operators, is an element. In the first illustrated example, the variable field has only one subfield, which is ended by the blank in column 19. In the second example, the variable field has two subfields separated by a comma. The variable field is ended by the blank in column 22.
2. For instructions or pseudo operations, SEI, REI, SKI, SKW, and BOL, the variable field is interpreted as a Boolean expression and constants are assumed to be octal. The third illustrated example illustrates a variable field for an SEI instruction.
3. Each symbol must be defined. For symbols used in the BOL, EQU, SSC, SMC, SRC, TBL, ITM, and BSS pseudo operations, the symbol must be defined prior to use.
4. Expressions may not contain parentheses, but will use the +, −, *, and / operators. The expression is evaluated from left to right in two passes. The first pass evaluates the * and / operators, and the second pass evaluates the + and − operators.
5. If the + operator is not preceded by a symbol or constant, it is ignored.
6. If the − operator is not preceded by a symbol or constant in Boolean expressions, an error flag is set.
7. In arithmetic expressions, if the / operator is not preceded by a symbol or constant, an error flag is set. In arithmetic division, only the quotient is retained.
8. In arithmetic operations when the Y-subfield is in 2's complement form, only the low order 8 bits (to −256) are retained.
9. In Boolean operations, only the low order 17 bits are retained.
10. The operand of certain instructions may be a literal. (Literal initialization is described in a previous paragraph.) Literals may be used in the operand field of ADD, CLA, CMA, CML, DIV, LDQ, LGA, LGC, LGM, MLY and SUB. There are five types of literals:
    a. Octal (O)
    b. Decimal (D)

Figure A. Punched Card/Coding Sheet Format. The Variable Field extends from column 13 through the first blank column. Comments filed may use full 72 columns if entire line is a comment (i.e. * in column 1)

KEY:

LINE 1: ASSIGN THE VALUE OF THIS LINE TO MAIN MEMORY ($1000_8$)

LINE 2: ASSIGN THE VALUE OF THIS LINE TO SCRATCH PAD MEMORY (0 TO $1000_8$)
LINE 3: ASSIGN THIS LINE TO MEMORY LOCATION $777_{10}$

LINE 4: ASSIGN THIS LINE TO MEMORY LOCATION $777_8$

LINE 5: TRANSFER UNCONDITIONALLY TO THE ADDRESS SPECIFIED IN THE VARIABLE FIELD
LINE 6: TRANSFER UNCONDITIONALLY TO AN INDIRECT ADDRESS SPECIFIED BY THE WORD LOCATED IN THE ADDRESS SPECIFIED BY THE VARIALBE FIELD

LINE 7: PRINT AN ASTERISK AND PRINT THIS LINE AS A COMMENT DURING FINAL PRINTOUT
LINE 8: PRINT AN ASTERISK AND LEAVE REST OF LINE BLANK ON FINAL PRINTOUT

Figure B. Examples of Input Formats. The first four examples (lines 1–4) are location field formats, the next two (lines 5–6), operation fields, and the last two (lines 7–8), comments fields.

c. Value (V)
d. 6-bit alphanumeric characters (H)
e. ASCII code (A)

Column 13 of the variable field must contain an equal (=) sign (this flags the assembler program that a literal is assigned). Column 14 will contain the type designator, and column 15 will be the first character of the literal. Coding of decimal (D) literals is the same as for the DEC pseudo operation. Six-bit alphanumeric (H) literals allow three or less characters that are left-justified with trailing blanks if less than three characters are used. ASCII (A) literals allow a maximum of two characters with the first character in bits 1 through 8, and the second in bits 10 through 17. Examples of literals are illustrated in lines 4 through 8 of the following table.

SUMMARY OF PSEUDO OPERATIONS

The pseudo operations provided by the HM-4118 assembly program relieve the programmer of the task of coding subroutines for certain operations not included in the HM-4118 machine instruction repertoire.

The pseudo operations provided by the HM-4118 assembly program enable the programmer to specify, by an entry on the program coding form, certain operations not contained in the HM-4118 machine instruction repertoire. Since such operations occur in many programs, this feature relieves the programmer of the task of coding a subroutine when he specifies an operation defined by one of the pseudo operations. A pseudo operation may be used whenever desired in the program, except when a macro operation is being defined. In a macro operation, the GAD, NOP, HLT, or FIN pseudo operation are the only pseudo operations allowed within the macro definition. A pseudo operation is indicated by placing the three-character mnemonic corresponding to the desired operation in the operation field. There are certain restrictions placed on entries in the location field and the variable field; these restrictions are noted when the specific pseudo operations are discussed. The pseudo operations included in the assembler may be used by the programmer to control memory allocation, form data, and to control the output assembly.

Controlling Memory Location

A group of pseudo operations is provided to allow the programmer to control memory allocation. By using these pseudo operations, the programmer can specify the values to be loaded into the assembler main, scratch, or relocation counters. The programmer may also reserve a block of sequential memory address beginning with a specified location. A pseudo operation which allows the programmer to specify the starting address of a literal table is also included within this group.

Entering Data

A second group of pseudo operations is provided which allows the programmer to enter data in a variety of formats. The programmer may enter data in units smaller than a complete computer word by using the variable field data (VFD) pseudo operation. Pseudo operations are provided which allow the programmer to enter decimal data in either a single precision or a double precision format. This group of pseudo operations also includes operations which allow the programmer to enter octal and binary data.

Controlling Output Assembly

The programmer may control the output assembly by using one or more of the pseudo operations included within this group. The normal output assembly consists of printing out a side-by-side listing of the assembled program and data generated, and placing the program on punched or magnetic tape. This output assembly may be varied as desired by the programmer by use of the pseudo operations included within this group.

FUNCTIONAL LIST OF PSEUDO-OPERATIONS

| Pseudo-Operation | Function |
|---|---|
| Control Memory Location | |
| BSS | Block Starting with Symbol |
| LTL | Literal Initialization |
| SMC | Set Main Counter |
| SRC | Set Relocation Counter |
| SSC | Set Scratch Counter |
| BOL | Boolean Equate |
| EQU | Equate |
| Process Variable Field Data | |
| VFD | Variable Field Definition |
| Entering Decimal Data | |
| DEC | Decimal Data, Single Precision |
| DCD | Decimal Data, Double Precision |
| Entering Octal and Binary Coded Data | |
| OCT | Octal Integers |
| BCI | Binary Coded Information |
| BCP | Binary Code for Printer |
| Generating Addresses | |
| GAD | Generate Address |
| Control Output Assembly | |
| EJI | Eject to top of Page |
| SLT | Suppress Listing |
| LST | Resume Listing |
| SDL | Suppress Detail |
| END | End of Assembly |
| WST | Write Symbol/COMID Table |
| RST | Read Symbol/COMID Table |
| CKS | Generate Checksum |
| REL | Relocatable Output |
| ABS | Absolute Output |
| FUL | Full Card |
| NOP | No Operation |
| HLT | Halt |
| Operations on Tables | |
| TBL | Table Definition |
| ITM | Item Definition |
| XTR | Extract an Item |
| RPL | Replace an Item |
| POS | Position Item in Accumulator |
| Macro Generation | Macro Definition |
| MAC | |

PSEUDO OPERATIONS TO CONTROL MEMORY LOCATION

This group of pseudo operations allows the programmer to specify initial memory addresses for both data to be entered into main memory or scratch pad memory and relocatable data.

Certain pseudo operations affect location assignments by operations that set main, scratch, or relocation counter values equal to values contained in the variable field. These pseudo operation codes appear in the operation field and are described individually in the following paragraphs.

SMC (Set Main Counter)

The SMC pseudo operation sets the assembler main counter to the value specified by the variable field. The variable field may contain a symbol, constant, or arithmetic expression that is equal to a value greater than $777_8$ ($512_{10}$). Any symbol used in the variable field must have been previously defined. The location field may be blank or contain a symbol or label that, if present, is assigned to identify the memory location specified by the variable field. If the SMC pseudo operation is not used prior to the first main memory assignment, the assembler will begin assigning memory locations at $1000_8$. The subsequent data and/or instruction words are assigned sequentially higher locations until one of the set counter instructions appear. The SMC pseudo operation should not be used between a REL and an A B S pseudo operation. If the location field contains a symbol, it is assigned the value of the variable field. Constants are not allowed in the location field.

SSC (Set Scratch Counter)

The SSC pseudo operation sets the assembler scratch counter to the value specified by the variable field. The variable field may contain a symbol, constant, or arithmetic expression that is equal to a value less than $1000_8$. Any symbol in the variable field must have been previously defined. The location field may be blank or contain a symbol or label that, if present, is assigned to identify the memory location specified by the variable field. Symbols assigned to scratch pad locations by the SSC pseudo operation do not require the "comma S" (,S) suffix. If the SSC pseudo operation is not used prior to the first scratch pad memory assignment, the assembler will begin assigning memory locations at $213_8$. The subsequent instructions or data words are assigned sequentially higher locations until one of the set counter instructions occur.

SRC (Set Relocation Counter)

The SRC pseudo operation sets the assembler relocatable main memory counter, or relocation counter, to the value specified by the variable field. The variable field may contain a symbol, constant, or arithmetic expression. Any symbol used in the variable field must have been previously defined. The location field may be blank or contain a symbol or label that, if present, is assigned to identify the memory location specified by the variable field. If the SRC pseudo operation is not used prior to the first main memory assignment, the assembler begins assigning memory locations at 000. The subsequent instructions or data words are assigned sequentially higher locations until one of the set counter instructions occur. The assignment to 000 and higher locations is not the final assignment as these would conflict with assigned memory. This pseudo operation allows the programmer to assemble a program sequence that is later relocated (in a unit) to scratch pad or main memory. Actual relocation occurs during object program loading.

BSS (Block Starting with Symbol)

The BSS pseudo operation allows the programmer to reserve a sequential block of memory locations equal to the value of the variable field. The variable field may contain a symbol, constant, of arithmetic expression.

Any symbol used in the variable field must have been previously defined. The block of memory locations being reserved begins with the location at which the BSS pseudo operation occurs.

LTL (Literal Initialization)

The LTL pseudo operation specifies to the assembler the beginning address of the literal table and the literal table base address index register. The variable field of this pseudo operation contains two subfields. The first subfield defines the starting address of the literal table. The second subfield denotes the index register to use. This pseudo operation must be performed before the first use of an instruction that uses a literal.

EQU (EQUate)

The EQU pseudo operation assigns the value of the contents of the variable field to the symbol in the location field. The value equated with the symbol by this operation is placed in the symbol table. The variable field may contain a symbol, cnstant or arithmetic expression. Any symbol used in the variable field must have been previously defined.

BOL (BOoLean Equate)

The BOL pseudo operation is identical to the EQU pseudo operation; however, constants or arithmetic expressions appearing in the variable field are assumed to be octal.

PSEUDO OPERATION FOR PROCESSING VARIABLE FIELD DATA

This pseudo operation allows the programmer to specify data to be entered into the program in field lengths less than a complete computer word.

The assembler provides this pseudo operation to allow the programmer to specify the format and the field length of data to be entered into the program. The programmer may specify octal, decimal, or hollerith (alphanumeric) information as the data to be entered. The programmer may define more than one field each time the pseudo operation is specified so long as the combined length of all fields included does not exceed 18 bits (one computer word).

VFD (Variable Field Definition)

The VFD pseudo operation allows the programmer to enter data in units smaller than a complete computer word (18 bits). The variable field (on the program coding form) contains one or more subfields that are separated by commas and is terminated by a blank. There is one subfield in the variable field for each field of data in the machine word. The format of each subfield is given on the facing page.

Each subfield will specify the type of information to be entered, the number of bits to be used by the subfield and the data to be entered. The first character of each subfield specifies the format. This character will be alphabetic (D, B, or H) to specify decimal, octal, or hollerith data, respectively. The alphabetic character will be followed by a decimal number specifying the number of bits in the subfield of the machine word. The bit count is followed by a slash (/) and then the data to be entered.

Data will be right justified in its subfield. If the amount of data-generated is greater than the number of bits specified, the leading bits are lost and an error printout results. If combined data length of the subfields is less than 18 bits, the data is right justified in the machine word. If the data requires the use of more than 18 bits, the machine word is assigned a value of zero and an error flag printout results.

Examples of the computer data word generated for sample variable fields, using the VFD pseudo operation, are given below.

FORMAT OF VFD

F$n$/X where:
F = format code;
and if:
    F = B = octal
    F = D = decimal
    F = H = alphanumeric
$n$ = decimal integer specifying the number of bits allotted to this subfield
/ = end of bit count
X = symbol, constant or arithmetic expression if F = B or D
    if F = H, it is an alphanumeric symbol
    if F = B, all constants are octal and all expressions are arithmetic

EXAMPLES OF VFD

| Variable Field | Data Word |
| --- | --- |
| B1/1,B14/31600,B3/5 | 716005 |
| B1/1,B8/377,B1/0,B8/357 | 777357 |
| D9/364,D6/02,D3/5 | 364025 |
| H12/T0,B6/21 | 635621 |

PSEUDO OPERATIONS FOR ENTERING DECIMAL DATA

By using these pseudo operations the programmer can specify decimal data to be entered directly into the program.

This group of pseudo operations allows the programmer to enter decimal data directly into the program without converting to a format suitable for storage in binary form. The conversion is provided as one of the functions of these pseudo operations. The types of data which may be entered by the programmer include:
    Decimal integers
    Fixed point numbers (single and double precision)
    Floating point numbers The data words generated are addressed in the same manner as instruction words. Succeeding data words, designated by the presence of more than one subfield, are assigned the next sequentially higher memory locations.

DEC (DECimal Data, Single Precision)

The DEC pseudo operation allows the programmer to enter single precision decimal data into the program. The variable field contains one or more decimal numbers, read from left to right, separated by commas and is terminated by a blank. The decimal numbers are converted to octal equivalents for storage in binary form. The decimal numbers, when converted, are stored in consecutive, increasing memory locations. Each decimal number, if more than one appears, forms a subfield. Two commas in succession are assumed to be the integer zero. Each subfield is decoded using the following coded format:

$$S_N I_N \cdot F_N E S_E V_E B S_B V_B$$

Each component of the subfield is defined in Table 1. Rules for forming the decimal numbers are given on the facing page. Examples of data words generated by the DEC pseudo operation for various subfield values are given in Table 2.

DCD (DeCimal Data, Double Precision)

The DCD pseudo operation allows the programmer to enter decimal, double-precision, or floating-point data into the program. The basic subfield format is the same as for DEC pseudo operation, except certain rules that supplement DEC rules. These are given on the following page. Examples of data words generated by the DCD pseudo operation for various variable field values are given in Table 3.

TABLE 1: DEFINITION OF DEC SUBFIELD COMPONENTS $S_N$ = sign of number (+ or −)
$I_N$ = integer portion of number
· = decimal point
$F_N$ = fractional portion of number
E = beginning of exponent portion indicating multiplication by powers of 10
$S_E$ = sign of exponent
$V_E$ = value of exponent
B = denotes beginning of binary scale factor indicating number of bits allowed for integer portion of number
$S_B$ = sign of scale factor
$V_B$ = value of scale factor

RULES FOR FORMING DECIMAL SUBFIELDS

1. If $S_N$ or $S_E$ is not specified, it is assumed to be positive.
2. If $I_N$ is not specified, there must be a decimal point.
3. If $F_N$ is not specified, the decimal point may be omitted.
4. If a decimal point is present, B and $V_B$ must be specified or the fractional portion of the number is lost.
5. If B is specified, it must be restricted to a value which will allow the most significant bits to be retained.
6. If B is not specified, it is assumed to be 17.
7. The value represented by $I_N$, $F_N$, E, $S_E$, and $V_E$ may not exceed $2^{17} - 1$.
8. The fractional portion of a number is truncated according to the number of bits provided by the scale factor.

TABLE 2

| EXAMPLE OF DEC DATA WORDS GENERATED | |
| --- | --- |
| Variable Field | Data Words |
| 131071,−131071 | 377777 |

TABLE 2-Continued

EXAMPLE OF DEC DATA WORDS GENERATED

| Variable Field | Data Words |
|---|---|
|  | 777777 |
| .512E+3, −512000E−3 | 001000 |
|  | 401000 |
| 512B17, 512B11 | 001000 |
|  | 100000 |
| „1234.567E+1B16 | 000000 |
|  | 060163 |

SUPPLEMENTARY RULES FOR DCD SUBFIELDS

1. Floating-point numbers are denoted by a decimal point, but no scale factor ($BS_B V_B$).
2. If B is specified, it must be restricted to a value that allows the most significant bits to be retained.
3. If a decimal point and B are both omitted, the scale factor is assumed to be 34.
4. Double-precision non-floating-point data is assigned two successive memory locations with the least significant bits placed in the first location.
5. Floating point data is assigned three successive memory locations. The first two locations will contain the mantissa with the least significant bits in the first location. The third location will contain the exponent.

TABLE 3

EXAMPLES OF DCD DATA WORDS

| Variable Field | Data Words |
|---|---|
| 17179869183,−17179869183 | 377777 |
|  | 377777 |
|  | 777777 |
|  | 777777 |
| 512B34,512B17,512B11 | 001000 |
|  | 000000 |
|  | 000000 |
|  | 001000 |
|  | 000000 |
|  | 100000 |
| .512E+3,−512000.E−3 | 000000 |
|  | 200000 |
|  | 000012 |
|  | 400000 |
|  | 600000 |
|  | 000012 |
| „1234.567E+3B25 | 000000 |
|  | 000000 |
|  | 000000 |
|  | 000000 |
|  | 207000 |
|  | 011326 |
| .00512,5.12,512000. | 130431 |
|  | 247613 |
|  | 400007 |
|  | 024364 |
|  | 243656 |
|  | 000003 |
|  | 000000 |
|  | 372000 |
|  | 000023 |
| 1234.567E−512,−1234.5−67E+512 | 026131 |
|  | 255753 |
|  | 403232 |
|  | 622152 |
|  | 610714 |
|  | 003260 |

PSEUDO OPERATIONS FOR ENTERING OCTAL AND BINARY CODED DATA

The programmer may enter octal and binary coded data directly into the program by use of these pseudo operations.

This group of pseudo operations allows the programmer to enter octal data and binary coded data in either ASCII or a 6-bit alphanumeric (hollerith) format directly into the program. Without the availability of these pseudo operations the programmer would be faced with the task of converting the input data to a format suitable for storage in binary form. The data conversion is performed by these pseudo operations prior to storage. The types of data which may be entered by the programmer include:

Octal integers
Alphanumeric codes

The data words generated are addressed in the same manner as instructions. Succeeding data words, subject to the restrictions noted in the discussions of the individual pseudo operations, are assigned to the next sequentially higher memory locations.

OCT (OCTal Integers)

The OCT pseudo operation allows the programmer to enter octal data into the program. The variable field consists of one or more octal constants, read from left to right. Successive octal constants are separated by commas, and terminated by the first blank. Successive subfields are assigned to successive higher memory locations. Each octal constant is right justified when converted to a binary number with leading zeroes. If more than six digits are specified for a number, the leading bits are lost and an error is indicated.

BCI (Binary Coded Information)

The BCI pseudo operation allows the programmer to enter ASCII format binary coded data into the program. The variable field contains characters that are converted into ASCII code. Data words, consisting of two of the ASCII 7-bit codes, plus one odd parity bit character per code, are assigned bits 1 through 8 and 10 through 17 of a memory location. An example is given in Table 1. Characters are decoded, two at a time, and assigned to successively higher memory locations starting with the location of the BCI psuedo operation. If the number of variable field characters is not a multiple of two, trailing zeros are supplied for the last character. The variable field character conversion is terminated by an equal (=) sign. If no equal sign appears, all characters on that line (through column 72) are converted and an error flag is output.

BCP (Binary Code for Printer)

The BCP pseudo operation allows the programmer to enter (in octal format) binary coded data into the program. An example is given in Table 1. The variable field contains characters that are converted into a 6-bit

PROGRAM CODING

PREPARED BY _____     DATE _____

PHONE _____     PROBLEM NO. _____     PAGE _____ OF _____

| LOCATION (LABEL) | OP CODE | VARIABLE AND COMMENTS FIELD | SEQ NO. |
|---|---|---|---|
| 1        5 | 10 | 15    20    25    30    35    40    45    50    55    60    65    70    72 | 80 |
| 1 | BCI | CR00014= | |
| 2 | BCP | TO RETURN TO = | |
| 3 | | | |
| 4 | | | |

NOTES

1. THIS EXAMPLE OF THE BCI PSEUDO OPERATION GENERATES THE FOLLOWING THREE DATA WORDS:
   103122
   117260
   260064

2. THIS EXAMPLE OF THE BCP PSEUDO OPERATION GENERATES THE FOLLOWING DATA WORDS:
   206356
   206144
   636461
   552063
   560000 octal code. Data words consisting of three of the octal-coded characters are assigned to successively higher memory locations starting with the location of the BCP pseudo operation. If the characters do not occur in multiples of three, trailing zeros are supplied. The variable field character conversion is terminated by an equal (=) sign. If no equal sign appears, all characters in that line, (through column 72), are converted and an error flag is output. Appendix E lists the codes used for this pseudo operation.

PSEUDO OPERATION FOR GENERATING ADDRESSES

This pseudo operation allows the programmer to specify the contents of memory locations to be used subsequently in an indirect addressing mode.

This pseudo operation allows the programmer to specify words in the indirectly addressed word format. This means that the programmer can, by a single entry on the program coding form, specify the contents of memory locations which may be used subsequently in an indirect addressing mode. The pseudo operation is treated as a machine instruction by the assembler and may be used, but is not restricted to, macro operations.

GAD (Generate ADdress)

The GAD pseudo operation is recognized by the assembler and may be used in macro operations. When written on the coding form, this pseudo operation will develop the binary equivalent of the alphanumeric term or the address of the label in the variable field and place the results in the address designated in the location field or in the next available memory address if no location field is specified. The variable field is written in two subfields separated by a comma. The first subfield may be a symbol, constant, or arithmetic expression. The second subfield may be a 1 or blank. If the second subfield is blank, the address of the label in the first available field, or the binary equivalent of the alphanumeric term or arithmetic expression is placed in the specified location. If the second subfield is a 1, the contents of index register 1 are added to the binary equivalent to obtain an indexed address when the instruction using the generated address is executed.

PSEUDO OPERATIONS TO CONTROL OUTPUT ASSEMBLY

This group of pseudo operations allows the programmer to control the output assembly as desired.

Output assembly consists of printing out a side-by-side listing of the assembled program and the data generated, and placing the program on punched or magnetic tape. The normal printout operation consists of a heading and page number at the top of each page followed by a blank line that, in turn, is followed by as many as 51 data lines. If a program operation (usually a pseudo or macro operation) generates more than one word, each word is printed on a separate line. The operation columns, for the additional lines, are blank. The output assembly may be varied as desired by the programmer by use of the pseudo operations described in the following paragraphs. Pseudo operations in this group (except CKS, WST, RST, and END) do not appear in the Pass II listing.

EJT (EJecT to Top of Page)

The EJT pseudo operation directs the next line decoded to be printed at the top of the next page, following the heading. If an EJT appears concurrently with an automatic eject (the assembler makes a line count and performs an automatic eject at 51 lines), or an EJT appears with a zero line count, it is ignored.

SLT (Suppress LisTing)

The SLT pseudo operation inhibits a Pass II side-by-side listing until an LST pseudo operation is encountered.

LST (Resume LiSTing)

The LST pseudo operation cancels previously used SLT and SDL pseudo operations and directs normal side-by-side listing to resume.

SDL (Suppress Detail)

The SDL pseudo operation inhibits the printout of additional lines produced by data-generating and macro operations. The first word generated by a coded line and the symbolic statement are printed.

SPC (SPaCe)

The SPC pseudo operation directs the assembler printout to space the side-by-side listing by the number of lines specified in the variable field. The space count in the variable field may be specified by a symbol, constant, arithmetic expression, or a blank. If the variable field is blank, one space is assumed.

END (END of Assembly)

The END pseudo operation indicates to the assembler that the end of the program being assembled has been reached. This pseudo operation contains a variable field in which the start address of the program is entered as a symbol, constant, arithmetic expression, or blank. If the program is being assembled and output on punched tape, the last data word punched is equal to the value of the variable field, and then a stop code is punched. If a magnetic tape output is used, the value of the variable field is the address at which execution of the program is initiated after the program is loaded. If the variable field is blank, address 000 is generated. A symbol in the location field is assigned the value of the location counter under rules specified in the Section on Formats.

WST (Write Symbol/COMID Table) LABEL

The WST pseudo operation directs the assembly to dump the present contents of the symbol/COMID table onto magnetic or punched tape during Pass I. The WST pseudo operation is allowed anywhere in the program. LABEL must be a six-character symbol and identifies the tape.

RST (Read Symbol/COMID Table) LABEL

The RST pseudo operation directs the assembler to read the symbol data from magnetic tape and plate it into the symbol/COMID table of the assembler. The RST pseudo operation must appear before the first use or definition of a unique program symbol. A checksum of the magnetic tape data transfer is made, and an error message is printed out if an error occurs.

CKS (Generate CheckSum)

The CKS pseudo operation directs the assembler to generate a data word that is the logical complement of the data and instruction words generated since the last CKS pseudo operation, or since the first word, whichever occurred last. The execution of this pseudo operation performs an exclusive-or function on the contents of the computer words involved. The octal value of the checksum is printed in the Pass II listing.

REL (RELocatable Output)

The REL pseudo operation directs the assembler to output following lines in a relocatable mode. The REL mode is terminated by an ABS pseudo operation.

ABS (ABSolute Output)

The ABS pseudo operation directs the assembler to print out in the absolute, or normal, mode. Absolute mode is assumed unless a REL or FUL pseudo operation has occurred, and is terminated by the use of either REL or FUL.

FUL (FULl Card)

The FUL pseudo operation directs the assembler to printout during Pass II the following lines without editing or making any address assignment. The first 72 columns of the card are available to the programmer with the restriction that symbols may not be used in the location field. The FUL mode of operation is maintained until terminated by a REL or ABS pseudo operation.

NOP (No OPeration)

The NOP instruction is a pseudo operation that is treated as a computer instruction and may be used in macro operations. The NOP pseudo operation consists of only the mnemonic code (NOP) in the operation field. This instruction generates a transfer to the present location plus one.

HLT (HaLT)

The HLT instruction is a pseudo operation on which the assembler operates as a computer instruction and may be used in macro operations. The HLT instruction consists of only the mnemonic in operation field. This instruction generates a transfer to the present location that results in a program halt at this point.

PSEUDO OPERATIONS TO DEFINE AND MANIPULATE TABLES

There are five pseudo operations which allow the programmer to define and manipulate tables and items.

Five pseudo operations enable the programmer to define tables, define items within the tables, and to manipulate these items; Table Definition (TBL), Item Definition (ITM), Extract on Item (XTR), Replace an Item (RPL), and Position Item in Accumulator (POS).

TBL (TaBLe Definition)

The TBL pseudo operation is written with a symbol in the location field, TBL in the operation field, and four parameter subfields in the variable field. The symbol used in the location field becomes the label, or table name, and is assigned the current value of the main or relocation counter. The counter is incremented from the starting location by the number of words used in the table. The four parameters that appear in the variable field may be a symbol, constant, or arithmetic expression with the restriction that any symbol used must have been defined previously. The four parameter subfields are designated C, T, E, and W. The C (class) subfield appears first and indicates a serial table if equal to 1, or a parallel table if equal to 2. The T (type) subfield appears second and indicates a null type if equal to 0, a rigid type if equal to 1, a variable type if equal to 2, and a cyclic type if equal to 3. The E (entries) subfield appears third and indicates the number of entries within the table, which may range from 1 through 512. The W (words) subfield appears last and indicates the number of words per entry, which may range from 1 through 512.

ITM (ITeM Definition)

The ITM pseudo operation enables the programmer to define the items within a table. This pseudo operation defines from 1 to 18 bits of a word contained in an entry within a table. The ITM pseudo operation is written with a symbol in the location field that becomes the item label or name, ITM in the operation field, and six parameters in the variable field. Each parameter may be a symbol, constant, or arithmetic expression with the restriction that any symbol used must have been defined previously. The parameters are designated, T, L, A, F, S, and B, respectively, for explanatory purposes, and are defined in the table on the facing page.

XTR (EXTRact an Item)

The XTR pseudo operation generates instructions that will obtain an item, position the binary point of the item, and transfer the item into the accumulator. This pseudo operation is written with XTR in the operation field and three parameters designated ITEM NM, XR, and $BP_{acc}$ in the variable field. ITEM NM is defined as the item name or label as it appears in the location field of this item (must have been defined previously), XR as the Index register that has been set, prior to the XTR, equal to the address of the first word of the entry in which this item appears, and the $BP_{acc}$ as the Binary point of the item as it is desired in the accumulator.

RPL (RePLace an Item)

The RPL pseudo operation generates instructions that place an item in the accumulator back into the correct table. The assembler generated instructions determine the placing of the binary point and select the proper data by masking as necessary if this item is a partial word. This pseudo operation is written with RPL in the operation field and three parameters designated ITEM NM, SR, and $BP_{acc}$ in the variable field. For this pseudo operation, ITEM NM is defined as an item name or label as it appears in the location field of this item (must have been defined previously), XR as an index register that has been set, prior to this RPL, equal to the address of the first word of the entry in which this item appears, and $BP_{acc}$ as the Binary point of this item as it appears in the accumulator prior to this RPL. The instructions generated by the assembler to implement the RPL pseudo operation destroy the contents of the Q register. The programmer must save the contents of the Q register before use of the RPL pseudo operation if Q register data is to be retained.

POS (POSition Item in Accumulator)

The POS pseudo operation generates the instructions necessary to shift an item in the accumulator from one binary point position to another. This pseudo operation is written with POS in the operation field and two parameters designated FROM, TO in the variable field. These parameters define the beginning binary point position (FROM) and the final binary point position (TO) according to certain rules: If alphanumeric symbol is used, the value of the symbol is used as the binary point. If a signed number is used, the value of the number is used as the binary point. If a previously defined item is used, the binary point position of this item is used as the binary point in the accumulator. For certain combinations of parameters the XTR, RPL, and POS pseudo operations may cause the overflow indicator (FV) to set. Care must be exercised in using FV for logical control when these operations are used.

DESCRIPTION OF ITEM DEFINITION PARAMETERS

| Parameter | Value | Description |
| --- | --- | --- |
| T (type) | 0 | Null |
|  | 1 | Boolean |
|  | 2 | Octal |
|  | 3 | Integer |
|  | 7 | Decimal |
|  | 11 | Hollerith |
|  | 12 | ASCII 1 character |
|  | 13 | ASCII 2 character |
|  | 14 | IBM Selectric typewriter, 6-bit code |
|  | 15 | Alphanumeric, 6-bit code |
| L (location) | 0–511 | Defines location of this word with respect to first word of the entry. May range from 0 (if first word) to 511 (if last word is maximum loaded entry) |
| A | 0–17 | Defines bit location of first significant bit of this field. |
| F (field size) | 1–18 | Defines number of bits within this item. Includes sign bit |
| S (sign) | 0 | Unsigned |
|  | 1 | Signed |
|  | 2 | Detached |
|  | 3 | Two's complement |
| B (binary point) | −31 to +31 | Defines binary point of this item with respect to left end of word. |

DEFINITION OF MACRO OPERATIONS

Macro operations are special operations which the programmer may want to use in his program but are not contained in the HM-4118 instruction repertoire.

Macro operations provide the programmer with the capability to perform a specific sequence of operations with a single instruction entry on the program coding form. A macro operation may be used throughout the program by placing the specific macro mnemonic in the operation field, and the parameters to be operated on in the variable field. A macro operation is written by placing a three-character alphanumeric label in the location field. The label must have an alphabetic character in position 1, and normally consists of three letters selected by the programmer.

MAC (MACro Definition)

The operation field contains the letters MAC to specify a macro operation. The variable field contains from 0 to 31 parameters that are used in the macro definition. All parameter designators must be symbols only; constants or expressions are not allowed. Each symbol used as a parameter must be used only one time on the line on which it appears, however, normal program symbols and previously used parameter symbols may be used. The lines following the first line of the macro operation consist of one of the computer instructions or a GAD, NOP, HLT, or FIN pseudo operation, which are the only pseudo operations allowed within macro operations. These instructions are written in the operation field with the designated operation being performed on the parameters and program symbols that appear in the variable field of the same line. The parameters must appear on the first line of the MAC pseudo operation and may further define the operation by using operators (+, −, *, or /) between parameters and program symbols.

The MAC pseudo operation is terminated by using the finish (FIN) pseudo operation. During Pass I of the assembly, each macro operation is entered into a macro name table with the location of that macro's skeleton, parameter count, and skeleton line count. A parameter table is constructed by the assembler when the first line of the macro pseudo operation is decoded. As the assembler decodes each line of the macro operation, the line is placed in position in that macro's skeleton table with each symbol checked to verify that it is present in the parameter table. If a symbol appears in the parameter table, it is assigned a parameter number. If a symbol is not present in the parameter table, it is entered into the skeleton table unchanged. Once a macro operation is defined, it may be used by writing the macro's assigned label in the operation field and the values to be operated on in the variable field. When the assembler encounters a macro operation, it inserts the instructions contained in that macro's definition into the program. When the program is printed out during Pass II of the assembly process, macro operations appear with the label of the macro in the operation field and the parameters in the variable field. The lines following correspond with the macro's skeleton and contain the data acquired; however, the operation codes performed within the macro are not printed out.

Macro operations that have been defined are used according to the following rules:
1. The location field may be blank, a constant, or a symbol. Memory location assignment of a macro operation is performed in the same manner as for other program instructions.
2. The operation field contains the name of the macro operation.
3. The variable field contains a symbol, constant, or arithmetic expression in each parameter subfield. These values are substituted for the parameters they replace in the macro operation.
4. An asterisk (*) in the variable field is interpreted as having a value equal to the location of the first instruction generated.
5. Variable field evaluation is normally arithmetic. If an instruction that normally has an octal variable field is used, octal interpretation of a parameter may be directed by placing the letter B immediately following the last character in the parameter.
6. The number of subfields that appear in the variable field is equal to the number of parameters specified for that particular macro operation.

RULES FOR MACRO PROGRAMMING

1. The location field of a macro operation contains the name of the macro being defined.
2. Parameters are defined by symbols only.
3. Parameters must be unique within the line on which they appear.
4. Parameters must be separated by commas.
5. The variable field specifying parameters used by a macro operation is terminated by the first blank column.
6. A symbol used in the macro skeleton which does not appear in the parameter table is interpreted as a normal program symbol.
7. GAD, HLT, NOP, and FIN are the only pseudo operations allowed within macro operations.
8. The location field of each line of a macro skeleton must be blank.
9. Macro definitions are terminated by use of a FIN pseudo operation. (Notice that the FIN pseudo operation is a program flag and is used only to end the macro definition.)
10. A maximum of 50 lines, all following the MAC line, may be used for one macro definition.

EXAMPLES OF TYPICAL MACRO OPERATIONS

These examples are presented to illustrate typical definitions of macro operations.

These examples are provided as illustrations to the programmer of the format to be followed when he is defining a macro operation. The examples, although they could be used in an actual program, are presented as typical macro definitions. The range of macro operations which the programmer may define is limited primarily by the exigencies of a specific program. The first example defines a macro operation which may be used to move a variable number of items from any area of memory to a specific working area. The second example defines a macro operation which is equivalent to a left-shift-Q-register instruction (does not exist as an HM-4118 machine instruction).

Line 1 of FIG. A on the facing page describes a macro operation which may be used to move a variable number of items from any area of memory to a specific working area. This macro operation will use the following three symbols: LOCCNT, the location of the number of items to be moved; INDEX, the index register to be used; AREA, the starting location of the area to be moved. The symbol WORK is used in the macro definition but is not listed as a special symbol. Therefore, it will be treated as a general program symbol and must be defined elsewhere in the program.

The programmer may use the MVW macro operation at any point in the program following the definition. If the number of items is in location MOVE, the starting location of the items to be moved is TABLE +3, and index register 2 is available, the programmer could write the code shown in line 13 of FIG. A. Line 19 is an example of the symbolic representation of the code which is generated. Only the macro instruction line will appear in the side-by-side listing. However, all generated machine instructions will be printed. If a symbol appears in the location field of the macro operation, it is assigned to the first instruction generated by the macro definition.

FIG. B describes an instruction group that is equivalent to a left-shift-Q-register instruction. (This instruction is not available in the computer hardware.) The format for use of the macro is defined the same as for hardware shift instructions. Once the macro definition has been made in the program, the programmer may use the macro whenever a left-shift of the Q-register is desired. The figure shows first, the definition of the macro operation following with a subsequent use of the macro in the program.

What is claimed is:

1. An airborne radar system for searching and tracking airborne targets over large bodies of water comprising a radar system having a search beam with a selected number of dwells using a different one of a selected number of staggered pulse repetition frequencies, PRF's, for each dwell in order to resolve the range ambiguity of targets, said radar system including, antenna means, a radar control unit including buffer means coupled to said antenna means, transmitting means coupled to said radar control unit and to said antenna means, and receiving means including signal processing means coupled to the buffer means of said radar control unit, a computer system coupled to the buffer storage means of said radar control unit for more positive identification of an airborne target for automatic acquisition of the target in a track store of said radar system, including computer means for resolving the range of each primary return of potential targets by correlating returns of said selected number of dwells, computer means for counting the number of returns received for each primary return at a given range in each dwell, said number constituting a count of 1 for the primary target, a count of 2 for the primary return and a first multipath return having one reflection from the surface of said body of water, and a count of 3 for the primary return and a second multipath return having two reflections from said surface, computer means for determining the quality of each potential target as a function of three count numbers of the primary and multipath returns received from said selected number of dwells, and computer means for setting up an entry into an automatic track candidate table of target data for each potential target having a quality equal to or greater than a predetermined minimum, said target data including the PRF of the search dwell having the largest multipath return count number from which the quality is determined.

2. Apparatus as defined in claim 1 wherein said signal processing means comprises a doppler processor to yield relative radial velocity of a target, and wherein said computer means for counting the number of returns received for each primary return at a given range in each dwell includes means for selecting only those returns having substantially the same relative radial velocity.

3. Apparatus as defined in claim 2 wherein said computer means for determining the quality of each target is comprised of computer means for forming a three-digit number from said count numbers in descending order of magnitude, each digit having a value of 0, 1, 2 or 3 depending upon whether in a particular dwell with which the count number is associated there was no primary return, a primary return and no multipath returns, a primary return and a first multipath return, or a primary return, a first multipath return and a second multipath return.

4. Apparatus as defined in claim 3 wherein said predetermined minimum is a function of sea state and slant range of the target from the sensor of said radar system, and said computer means for setting up an entry into an automatic track candidate table includes means for determining said minimum as a function of target slant range and sea state.

5. An airborne radar system used to search for airborne targets over a large body of water and to track targets found, said system comprising radar means having buffer storage means for storing beam reports and beam parameters, a transmitter for transmitting a search and track beam in selected directions, said beam for searching including a plurality of dwells, each dwell consisting of radar pulses transmitted at a unique pulse repetition frequency, PRF, a computing system including input-output means coupled to said buffer storage means, said computing system including computer means for resolving the range ambiguity of each dwell return and including means for identifying returns in different dwells which relate to the same target, means for storing an unambiguous range for each potential target having returns in at least two dwells and for storing an ambiguous range for each potential target having returns in only one dwell, computer means for determining the maximum delay time in terms of range, $\Delta R_{M1}$, for a first multipath return from each potential target where the first multipath return includes a single reflection from the surface of said body of water in the path of a radar pulse from said radar system to the target and return, computer means for determining the presence of a first multipath return for each potential target in each dwell at a range $R_i$ by checking all other returns of the same dwell for a return at a range $R_{iM1}$ which satisfies the condition $R_{iM1} - R_i < \Delta R_{M1}$, and for each first multipath return found determining the presence of a second multipath return for each potential target in each dwell, where the second multipath return includes two reflections from the surface of said body of water, by checking all other returns of the same dwell for a return at a range $R_{iM2} - R_i = 2(R_{iM1} - R_i) \pm tol$, where *tol* is a tolerance value, thereby producing a plot combination count for each potential target of unambiguous or ambiguous range showing the count number of primary and multipath returns received in the three dwells, said count number being zero in two dwells for a potential target of ambiguous range, computer means for correlating each potential target of unambiguous range with all other targets being tracked which are in the same direction as the search beam, and to mark each potential target of unambiguous range which correlates with a target being tracked with an identifying flag, computer means for establishing a plot quality for each potential target from said plot combination count numbers by creating a plot quality number consisting of said count numbers of the potential target for all dwells arranged in descending order of magnitude, computer means for determining a minimum plot quality required as a criterion for automatic acquisition of a target as a function of current sea state and target data comprised of target range, and computer means for determining which potential targets have a plot quality which satisfies said minimum plot quality criterion for automatic acquisition by said radar system into a target track data storing means.

6. Apparatus as defined in claim 5 wherein said radar system includes a radar signal processor coupled to said buffer storage means comprising a doppler processor to yield relative radial velocity of a target, and wherein said computer means for counting the number of returns received for each primary return at a given range in each dwell includes means for selecting only those returns having substantially the same relative radial velocity.

7. Apparatus as defined in claim 6 including computer means, responsive to a determination made for a given target that said minimum plot quality criterion has been satisfied, for setting up an entry into an automatic acquisition track candidate table information which will permit said radar system to automatically acquire said given target.

8. Apparatus as defined in claim 7 wherein said information in said entry into an automatic acquisition track candidate table includes the PRF of the dwell having the highest multipath return count, and further comprising means coupled from said automatic track candidate acquisition table to said buffer storage means for permitting the radar system to automatically initiate acquisition of the target for tracking using that PRF which has the highest probability of providing a verify beam return from said given target.

9. Apparatus as defined in claim 8 including a display means and computer means responsive to a given target processed of ambiguous range for setting up a display of said target in the direction of said radar beam and at said ambiguous range, thereby permitting a radar operator to take steps to manually acquire said given target.

\* \* \* \* \*